US012401268B2

(12) United States Patent
Ferrari Maglia et al.

(10) Patent No.: US 12,401,268 B2
(45) Date of Patent: Aug. 26, 2025

(54) INVERTER DESIGN WITH HIGH SHORT-CIRCUIT FAULT CURRENT CONTRIBUTION

(71) Applicants: UT-BATTELLE, LLC, Oak Ridge, TN (US); UNIVERSITY OF TENNESSEE RESEARCH FOUNDATION, Knoxville, TN (US)

(72) Inventors: Maximiliano Flavio Ferrari Maglia, Knoxville, TN (US); Thomas B. Ollis, Clinton, TN (US); Aditya Sundararajan, Knoxville, TN (US); Guodong Liu, Oak Ridge, TN (US); Mohammed M. Olama, Knoxville, TN (US); Yang Chen, Greensboro, NC (US); Leon M. Tolbert, Knoxville, TN (US)

(73) Assignees: UT-BATTELLE, LLC, Oak Ridge, TN (US); UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 189 days.

(21) Appl. No.: 18/374,281

(22) Filed: Sep. 28, 2023

(65) Prior Publication Data
US 2024/0421704 A1 Dec. 19, 2024

Related U.S. Application Data

(60) Provisional application No. 63/472,840, filed on Jun. 14, 2023.

(51) Int. Cl.
*H02M 1/32* (2007.01)
*H02M 1/12* (2006.01)
*H02M 7/537* (2006.01)

(52) U.S. Cl.
CPC ........... *H02M 1/325* (2021.05); *H02M 1/126* (2013.01); *H02M 1/327* (2021.05); *H02M 7/537* (2013.01)

(58) Field of Classification Search
CPC ...... H02M 1/126; H02M 1/325; H02M 1/327; H02M 7/537
See application file for complete search history.

(56) References Cited

U.S. PATENT DOCUMENTS

| 6,621,183 B1* | 9/2003 | Boys | H02J 7/00309 |
| | | | 307/145 |
| 2013/0156116 A1* | 6/2013 | Sim | H04B 3/54 |
| | | | 375/257 |

(Continued)

OTHER PUBLICATIONS

M. Khederzadeh "Adaptive setting of protective relays in microgrids in grid-connected and autonomous operation," in Proc. IET International Conf. on Developments in Power System Protection, 2012, pp. 1-4.

(Continued)

*Primary Examiner* — Jue Zhang
(74) *Attorney, Agent, or Firm* — Fox Rothschild LLP; Carol E. Thorstad-Forsyth

(57) ABSTRACT

Methods and systems comprising an inverter comprising: a semiconductor-based power module that is overrated by a factor $f_1$ having a value greater than two and configured to receive a DC signal and convert the DC signal into an AC signal; a saturable inductive grid filter configured to filter the AC signal; at least one sensor configured to produce a current measurement and a voltage measurement from the AC signal output from the saturable inductive grid filter; and a processor configured to compute adaptive controller gain values using at least the current measurement and temperature, and cause an adjustment to a gain of an inverter controller in accordance with the adaptive controller gain (Continued)

values to maintain stability when the saturable inductive grid filter saturates at high current operations.

20 Claims, 55 Drawing Sheets

(56) References Cited

U.S. PATENT DOCUMENTS

2015/0364939 A1* 12/2015 Talja ................ H02J 7/345
　　　　　　　　　　　　　　　　　　　320/166
2018/0248474 A1*  8/2018 Nishikawa ........ H02M 7/53873

OTHER PUBLICATIONS

B. P. Bhattarai, B. Bak-Jensen, S. Chaudhary and J. R. Pillai, "An adaptive overcurrent protection in smart distribution grid," 2015 IEEE Eindhoven PowerTech, 2015, pp. 1-6, doi: 10.1109/PTC.2015.7232310.

S. M. Brahma and A. A. Girgis, "Development of adaptive protection scheme for distribution systems with high penetration of distributed generation," IEEE Trans. Power Del., vol. 19, No. 1, pp. 56-63, Jan. 2004.

* cited by examiner

Average model in the abc frame considering nonlinear inductor.

Small signal model block diagram with decoupling terms.

FIG. 7  Bode plot for different inductance values due to core saturation. PI gains calculated using the disclosed adaptive control method. Control is always stable regardless of the available inductance.

FIG. 8  Bode plot for different inductance values due to core saturation. Conventional PI. Control becomes unstable for L=0.3 p.u. with a negative phase margin.

FIG. 9  Step response for different inductance values due to core saturation effect of the ferrite core. L=1.0 p.u=1.3mH. PI gains calculated using the disclosed control.

FIG. 10 Bode plot for different inductance values due to core saturation effect of the ferrite core. L=1.0=1.3mH. Controller gains (Kp=0.8, Ki=7.6). Conventional vector control applied.

FIG. 11 Controller gains for different inductance values caused to core saturation effect of the ferrite core. L=1.0 p.u=1.3mH. PI gains calculated using the Butterworth polynomial.

Experimental results. Conventional PI with constant gains. Inverter becomes unstable at I=25A.

Experimental results. Disclosed adaptive control considering grid filter saturation. Inverter stable for all current setpoints (40A).

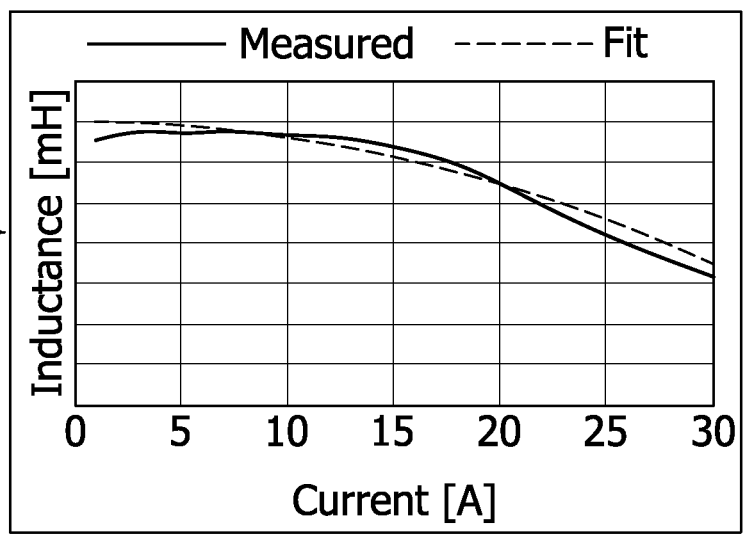
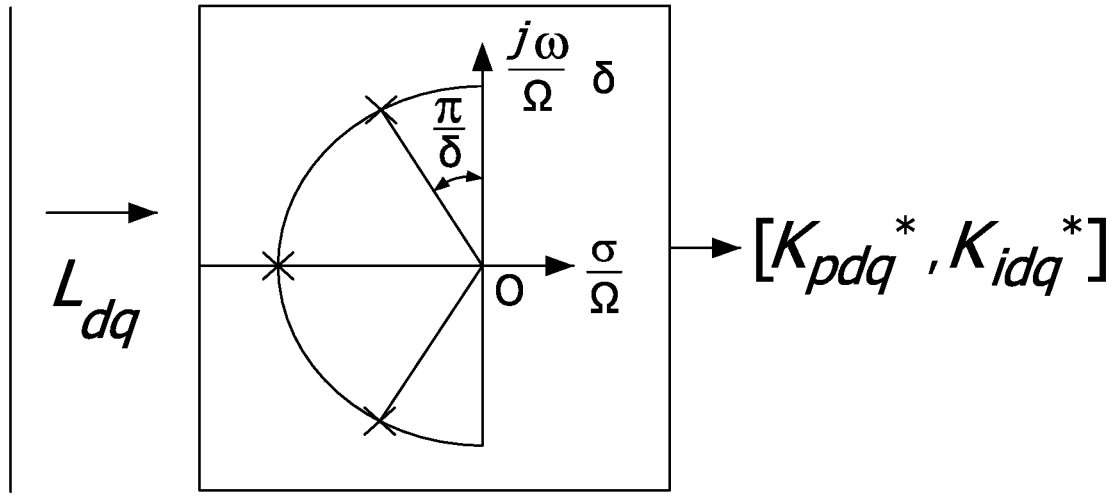
FIG. 14C

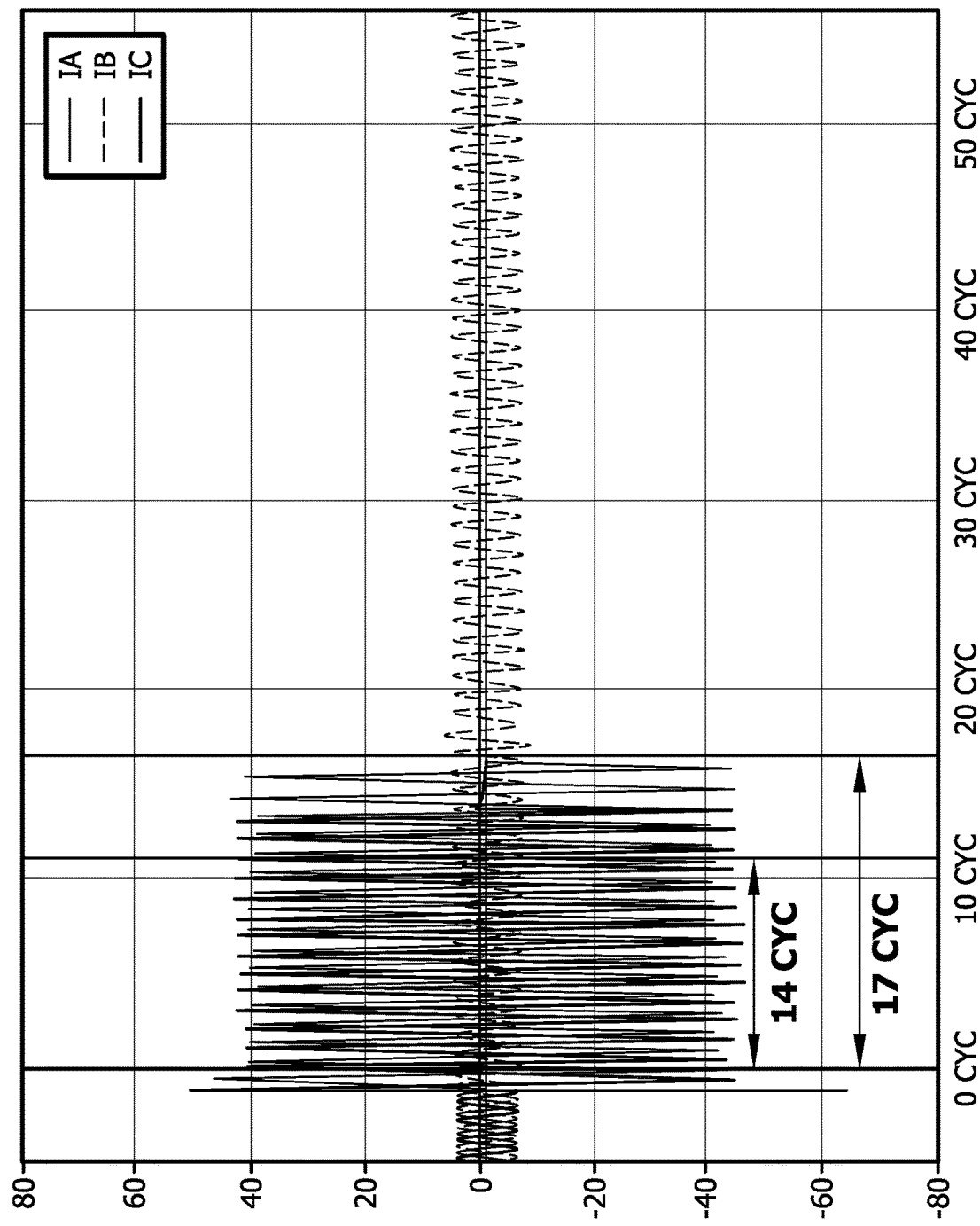

INVERTER DESIGN WITH HIGH SHORT-CIRCUIT FAULT CURRENT CONTRIBUTION

CROSS-REFERENCE TO RELATED APPLICATIONS

This application claims priority to U.S. Provisional Application 63/472,840 filed Jun. 14, 2023, entitled "Inverter Design with High Short-Circuit Fault Current Contribution", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present document relates to electronic circuits. More particularly, the present document concerns inverters with enhanced short-circuit fault current contribution.

BACKGROUND

A microgrid is often used as a local electrical grid that is operable in a grid-connected mode and in an islanded mode. In grid-connected mode, the microgrid is connected to a main grid. In islanded mode, the microgrid is disconnected from the main grid and functions autonomously.

The ability of microgrids to work independently from the main grid makes them a resilient system because they can power local loads when the main grid is unavailable. However, this resilience is in peril if the microgrid is not properly protected during short-circuit faults that occur within its own boundaries. To maintain reliable operation, the protection scheme in a microgrid should be capable of meeting the protection requirements of selectivity, sensitivity and reliability for both grid-connected and islanded modes of operation. However, these requirements are not always possible in today's microgrids because of the limited short-circuit current from inverter-based distributed energy resources, such as photovoltaic (PV) inverters, battery energy storage(ES), and modern wind turbines, such as Type 3 and Type 4.

There is consensus in the industry and in the academic literature that one of the main challenges for protecting microgrids arises from the significant variation in the magnitude of fault current, which drastically changes between the operating modes of the microgrid. For instance, during grid tied operation, the short circuit current ratio of an urban microgrid at the point of common coupling (PCC) is between 10-50 p.u. (the nominal microgrid load current). However, in islanded (off-grid) operation, for a microgrid based on inverter-based generation, the short-circuit current drops drastically to between 1.2-2.0 p.u. Such a large difference makes coordination of existing legacy distribution protection based principally on overcurrent devices very difficult and often unattainable. During islanded (off-grid or stand-alone) operation, the limited short-circuit current generated by inverter-based resources (IBRs) presents several challenges when it comes to deploying standard protective devices for distribution systems based on overcurrent. Conventional protective equipment like reclosers, relays, and fuses may not be well-suited for microgrid protection in such scenarios, primarily because they rely on the magnitude of the fault current, which is often insufficient in microgrids based on renewables. Moreover, conventional overcurrent relays typically cannot function properly for a microgrid because they are incapable of detecting faults and/or performing the coordination between the relays in inverter-based microgrids operated in the islanded mode. The low-current from inverter-based IBRs affects fuses because of their extreme time-inverse current characteristics, hindering their application in islanded microgrids. In certain scenarios, the fuses designed to protect the service laterals may fail to operate during faults. In such instances, the responsibility of isolating the fault falls upon the feeder protection relay or the inverter. Unfortunately, as of now, there isn't a cost-effective technological solution available to replace the function of fuses in these laterals, which essentially serve as the initial protective barrier against faults. This absence of an alternative poses a significant challenge in achieving a high degree of granularity or selectivity in systems characterized by a substantial integration of renewable energy sources, often referred to as IBRs within this document. Although there are protection solutions proposed that do not solely rely on the current magnitude, these methods can be cost-prohibitive as they it requires a relay, sensor network, and medium voltage switchgear to be installed at every node of a protection zone, which may be unfeasible due to the high number of nodes in a microgrid.

SUMMARY OF THE INVENTION

The present document concerns a system comprising an inverter controller and an inverter hardware (e.g., single-phase or multi-phase). The inverter comprises: a semiconductor-based power module that is overrated by a factor $f_1$ having a value greater than two and configured to receive a DC signal and convert the DC signal into an AC signal; a saturable inductive grid filter configured to filter the AC signal; sensor(s) configured to produce a current measurement and a voltage measurement from the AC signal output from the saturable inductive grid filter; and a processor configured to compute adaptive controller gain values using at least the current measurement and temperature, and cause an adjustment to a gain of the inverter controller in accordance with the adaptive controller gain values to maintain stability when the saturable inductive grid filter saturates at high current operation.

The sensor can include, but is not limited to, a current transducer that is overrated by the factor $f_1$. Factor $f_1$ may has a value in a range of two to ten. The semiconductor-based power module can include, but is not limited to, insulated-gate bipolar transistor(s) or a metal oxide semiconductor field-effect transistor.

The system may also comprise: a renewable power source configured to generate the DC signal; and/or a microgrid or distributed energy resource with at least one of a fuse and a protection module connected to an AC output of the inverter. In this scenario, factor $f_1$ may be selected based on short-circuit current needed of the AC signal (or AC current) to allow proper operation of the fuse and/or a legacy protection device during a short circuit event that requires high-current output of an inverter-based distributed energy resource. The fuse is overrated by a factor $f_2$ which is smaller than the factor $f_1$. The system may further comprise a DC-to-DC converter connected between the inverter and a source of the DC signal. The DC-to-DC converter comprises a semiconductor that is overrated by a factor $f_3$ which is smaller than or equal to the factor $f_1$.

The adaptive controller gain values are computed at the processor by: (i) estimating remaining inductance of the saturable inductive grid filter based on the current measurement and a measured temperature of the saturable inductive grid filter; and (ii) inputting the estimated inductance into mathematical algorithm(s); and (iii) solving mathematical equation(s) to obtain the adaptive controller gain values. A first gain value of the adaptive controller gain values is a function of a bandwidth, the estimated inductance of the saturable inductive grid filter, a current sensor gain, a system delay, and the voltage measurement. A second gain value of the adaptive controller gain values is a function of the first gain value, the bandwidth, the estimated inductance of the saturable inductive grid filter, the current sensor gain, the system delay, the voltage measurement, and a resistance of the saturable inductive grid filter. For example, the mathematical algorithm(s) may be defined by the following mathematical equations:

$$K_i = \frac{\omega^3 L_{dq}}{\beta \alpha V_{dc} K^2}$$

$$K_p = \frac{\omega^2 L_{dq}(1 + 2\zeta) + \beta K_i V_{dc} - \alpha r}{\beta \alpha V_{dc}}$$

where $\omega$ represents the bandwidth, $L_{dq}$ represents the estimated inductance of the saturable inductive grid filter, $\beta$ represents the current sensor gain, $\alpha$ represents the system delay, $V_{dc}$ represents the voltage measurement, $\zeta$ and $K$ are both constants, and $r$ represents the resistance of the saturable inductive grid filter.

The present document also concerns a method for operating an electronic circuit. The method comprises: receiving a DC signal by an overrated semiconductor-based power module of an inverter (where the overrated semiconductor-based power module is overrated by a factor $f_1$ having a value greater than two); converting the DC signal into an AC signal at the overrated semiconductor-based power module; filtering the AC signal by a saturable inductive grid filter to obtain a filtered AC signal; receiving the filtered AC signal at a current transducer and a voltage sensor; producing a current measurement at the current transducer and a voltage measurement at the voltage sensor; performing operations, by a processor, to compute adaptive controller gain values using at least the current measurement and temperature; and adjusting a gain of an inverter controller using the adaptive controller gain values to maintain stability when the saturable inductive grid filter saturates at high current operation. The current transducer may be overrated by the factor $f_1$. Factor $f_1$ may have a value in a range of two to ten. The overrated semiconductor-based power module can include, but is not limited to, insulated-gate bipolar transistor(s) or a metal oxide semiconductor field-effect transistor.

The method may also comprise: generating the DC signal by a renewable power source; and/or passing an AC output of the inverter to a fuse or a protection module of a microgrid or distributed energy resource. In this scenario, factor $f_1$ may be selected based on short-circuit current needed of the filtered AC signal (or AC current) to allow or otherwise facilitate proper operation of the fuse or a legacy protection device or module during a short circuit event that requires high-current output of an inverter-based distributed energy resource. The fuse is overrated by a factor $f_2$ which is smaller than the factor $f_1$. The method can further comprise performing DC-to-DC conversion operations using a DC-to-DC converter with a semiconductor that is overrated by a factor $f_3$ which is smaller than the factor $f_1$.

The adaptive controller gain values may be computed at the processor by: (i) estimating remaining inductance of the saturable inductive grid filter based on the current measurement and a measured temperature of the saturable inductive grid filter; and (ii) inputting the estimated inductance into at least one mathematical algorithm; and (iii) solving the at least one mathematical equation to obtain the adaptive controller gain values. A first gain value of the adaptive controller gain values is a function of a bandwidth, the estimated inductance of the saturable inductive grid filter, a current sensor gain, a system delay, and the voltage measurement. A second gain value of the adaptive controller gain values is a function of the first gain value, the bandwidth, the estimated inductance of the saturable inductive grid filter, the current sensor gain, the system delay, the voltage measurement, and a resistance of the saturable inductive grid filter. For example, the mathematical algorithm(s) may be defined by the mathematical equations provided above for obtaining $K_i$ and $K_p$.

BRIEF DESCRIPTION OF THE DRAWINGS

The present solution will be described with reference to the following drawing figures, in which like numerals represent like items throughout the figures.

FIG. 14(C) shows the block diagram of the proposed adaptive control that considers the inductive grid-filter saturation.

FIG. 16(A) results for a power semiconductor rated at 1200V. FIG. 16(B) results for the power semiconductor used in the prototype inverter rated at 600V.

FIGS. 24A-24C (collectively referred to herein as "FIG. 24") provides graphs for event file from SEL 651 (128 samples) which captured the fuse clearing times for the following faults: (A) line to ground faults; (B) line to line faults; and (C) three-phase faults.

DETAILED DESCRIPTION OF THE INVENTION

Figure 1:
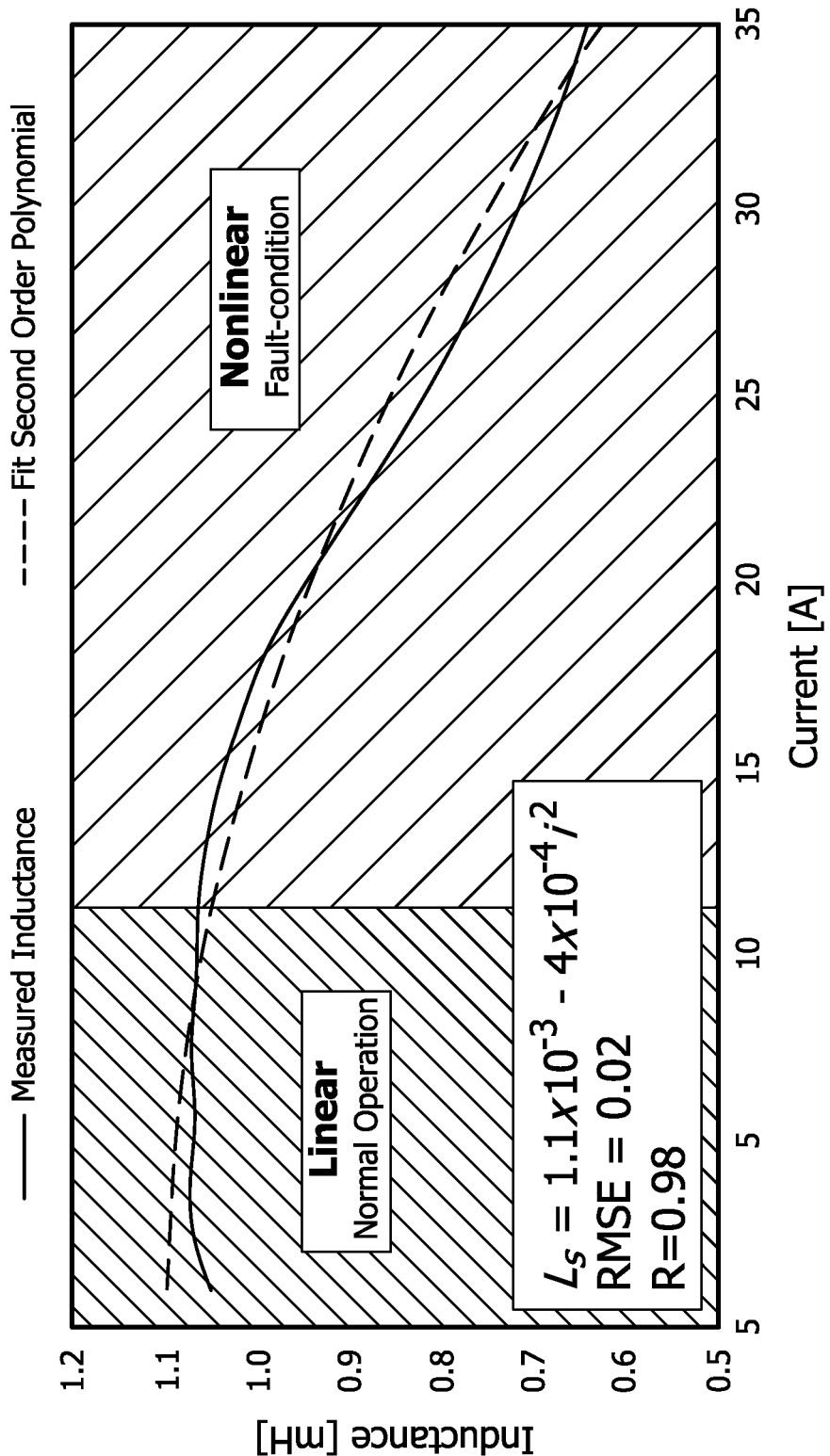
FIG. 1 provides a graph showing experimental characteristics of a non-linear inductor at room temperature using a power choke tester.

To address the challenges of conventional solutions discussed above, the present solution presents innovative hardware and control modifications specifically designed for IBRs. These modifications allow to substantially increase the IBR's short-circuit current capacity. Experimental results demonstrated that increasing the current output from IBRs is technically achievable through overrating the current rating semiconductor device, current transducer, and by adopting an adaptive controller to maintain stability during faults when the inverter operates at high-current.

This work shows that overrating the grid filter to accommodate the overloading condition is not necessary because the fault duration is relatively short. However, at currents that exceed the rated current, the core of the inductive grid filter saturates. This saturation introduces nonlinearities that must be accounted for in the vector control to maintain stable operation. To address this challenge, the present solution also implements a novel control method considering saturable inductors to maintain closed-loop stability during normal operation as well as fault conditions. With the implementation of the proposed adaptive controller, the inductor can maintain its normally rated current, ensuring stable and sinusoidal inverter current output even during high-current operation during faults.

Experiments have conclusively shown that the proposed solution enables inverters to produce high short-circuit currents, enabling the utilization of existing overcurrent protection mechanisms within standalone microgrids powered by renewable energy sources. Furthermore, the proposed solution allows to leverage installed legacy protection in power systems to operate when the participation of renewable energy sources in the power grid increases in magnitude. To address the challenge of protecting power systems in countries with high renewable energy penetration, such as Germany and Denmark, there is a shift towards deploying or repurposing synchronous condensers. Synchronous condensers offer the advantage of providing substantial short-circuit current during faults. However, they come with significant drawbacks, including high installation and maintenance costs, as well as long lead times, often spanning around 30 months for new installations. The proposed inverters with high short-circuit current contribution capabilities is an alternative solution to reduce reliance on synchronous condensers. They can generate substantial short-circuit current levels during electrical faults while also featuring robust design with oversized power modules and advanced control systems. The proposed inverter design with high short-circuit current contribution can provide similar benefits without some of the drawbacks associated with synchronous condensers. As a result, they improve overall grid performance by enhancing voltage and frequency regulation without the need of installing additional units.

The technical advantages of the proposed solution are (i) enables the utilization of affordable overcurrent devices such as fuses, breakers and reclosers in IBR-based power grids; (ii) enables fuse-relay coordination and coordination between primary and backup relays; (iii) provides a cost-effective approach since only the semiconductor and current sensors are oversized, while the rest of the inverter components remain at the designed rated power; (iv) does not require dedicated or additional unit (the ES or PV inverter can be modified to provide the higher fault current); and (v) improves the efficiency of the inverter during normal operation (less than 1.0 p.u.) due to oversizing of the semiconductor while reducing the cooling needs of the inverter.

The present solution includes hardware and control for inverters that convert direct current (DC) into alternating current (AC). Most of the protection methods proposed in literature passively tackle the negative effects caused by the low-fault contribution of IBRs, for instance, by proposing modification in the relay operation such as adaptive relay technologies. However, there are no conventional solutions at the inverter hardware and control level to increase the short-circuit capabilities of inverter based IBRs.

Increasing the current output from IBRs has emerged as a potential remedy for addressing microgrid protection issues. Nevertheless, this approach remains untested primarily due to two prevailing concerns: the perceived high associated costs and the belief that it necessitates overrating all inverter components to achieve the desired short-circuit current, rendering it economically unfeasible. However, this invention shows that only few hardware modifications are required to significatively increase the fault contribution of inverter-based generation. An overrated semiconductor means that its current rating is rated above its real capacity. For example, an inverter that is designed for 10 A at 480V, applying the described modifications, can provide >30 A during short-circuit faults. To achieve this, maintaining the thermal limitation of the semiconductor, specific components of an inverter are identified that may be overrated to significatively increase their short circuit contribution.

An inverter is described herein with increased short-circuit current that enables legacy overcurrent protection in a microgrid. Fuses can effectively protect the microgrid laterals with the disclosed solution. Furthermore, the disclosed inverter allows fuse-relay and relay-to-relay coordination. The impact of the disclosed technologies is significant in industry since overcurrent protection for islanded microgrids is not possible with current commercial inverter technology. Microgrids are commissioned in distribution systems, and this invention allows affordable distribution grade protection to be applied for microgrid applications.

The disclosed technologies can be implemented for both PV and ES inverters (e.g., battery inverters) which makes it different from conventional solutions which require a dedicated or overrated unit (e.g., a flywheel, a supercapacitor, etc.) to provide high current during faults. Increasing the current rating of the semiconductor devices, or power modules, while keeping all other components at rated power, is sufficient to increase the short-circuit contribution of the inverter. Because of the short duration of a fault, the power losses on the passive components (such as the grid filter inductor and inverter DC-link capacitor) are insufficient to cause permanent damage. Experimental results were obtained using fuses and SEL-651 reclosers, demonstrating that the disclosed technologies for increasing the current from inverter-based IBRs enables the use of legacy protection for microgrid protection.

The present solution also addresses key aspects of the control during fault conditions when the grid-filter saturates due to overrated short-circuit current. The control of the inverter is modified for operation at high current because at high currents the grid-filter saturates. If the control does not account for the grid filter saturation, the inverter control will become unstable.

The present solution further includes an adaptive control algorithm that calculates Proportional Integral (PI) control gains considering the inductance saturation which depends on the operating current of the inverter. The disclosed control method maintains stability criteria even when the grid-filter saturates due to the increased fault contribution. Bode plots enclosed show that the control gains using the disclosed method always keep the control stable, maintaining the desired gain margin and gain margins at the desired bandwidth. The proposed adaptive controller is light weight and can be seamlessly implemented into the same digital processor where the inverter control is implemented.

Some of the advantages of the increasing the fault contribution of IBRs using the proposed method are: (i) enables the utilization of affordable, widely available and mature overcurrent devices such as fuses, breakers and reclosers; (ii) enables fuse-relay coordination and coordination between primary and backup relays; (iii) provides a cost-effective approach since only the semiconductor is oversized, while the rest of the inverter components remain at the designed rated power; (iv) does not require dedicated or additional unit (the ES or PV inverter can be modified to provide the higher fault current); and (v) improves the efficiency of the inverter during normal operation due to oversizing of the semiconductor.

The present solution can be used generally in fields such as energy, utilities and/or manufacturing. More specifically, the present solution can be used for enabling energy storage and by PV inverter manufacturers to increase the fault contribution of their inverter equipment. The components identified in the present solution, together with the proposed control, are important advancements towards the enabling current protection for microgrids that operate in both islanded and grid-tied operations. The proposed modifications are cost-effective. Because based on the best estimates available, the power module accounts for only 12% of the inverter cost, the proposed inverter with overrated semiconductor modification would increase the cost of the inverter by 8.7%-10%. This cost is negligible considering that currently the only effective microgrid protection is using differential protection. Differential protection is very expensive, as a reference, a low-end line current differential costs more than double than a high-end directional overcurrent relay. This cost can be offset because increasing the current capacity of the inverter brings several additional benefits, which are crucial for higher integration of inverter based renewable energy into the grid. Low-Voltage Ride through (LVRT): Increasing current capability of semiconductor allows the inverter to inject surplus power to the grid during voltage sags, this improves LVRT capabilities and stables dc-link voltage control at maximum power point (MPP) during sags. Increased voltampere reactive (VAR) support during voltage sags. Increasing current rating of semiconductor and its antiparallel diode allows the inverter to significantly increase the reactive power support the inverter can provide during voltage sags, helping the bulk grid to maintain stability when high penetration of renewables is present. Increased inertial support: Inverters with higher current capability will allow higher inertia in power systems and microgrids with high penetration of inverter-based generation and energy storage (renewable energy such as PV and modern wind turbines, such as Type-3 and Type-4, or any wind turbine that is interfaced with the grid through power electronics).

Inverter Control

It has been shown through experimental results that increasing the current of the inverter only requires the semiconductor and the current sensor to be oversized while the other components remain at their rated power. Oversizing the semiconductor effectively increases the current provided by the inverter enabling the utilization of legacy overcurrent in microgrid operation, which allows coordination with fuses and overcurrent relays. However, at currents higher than the rated currents, the core of the inductive grid filter saturates, which introduces nonlinearities that must be accounted for in the vector control for stable operation. From a control design, the nominal inductance is one of the most important specifications. The inductance determines the poles of the system which are required to effectively tune the integral and proportional gains. Although the grid filter can be designed for this overloading current, this will result in a bulky and costly filter. On the other hand, the nonlinearity of the inductor affects the stability of the system and the bandwidth of the controller.

Nonlinear Inductor Modelling

In nonlinear inductors, the flux increment per current increment rapidly decreases as the operating current magnitude increases. This phenomenon is called saturation of the magnetic core. In FIG. 1, a graph is provided showing the corresponding inductance-current characteristics of three inductors-two inductors with a ferrite core and a third inductor with a silicon steel core. The graph plots experimental characteristics of a non-linear inductor at room temperature using a DPG10 power choke tester.

The two ferrite inductors were chosen with different saturation points (5 A and 10 A). The inductor rated at 5 A is used to illustrate the effects of deep saturation if the inverter is designed to provide more than 3× of current, something that is achieved by further increasing the size of the inverter's semiconductor. The short-circuit could be further increased (>3.0. p.u.) by further overrating the semiconductor current rating.

The silicon steel and ferrite cores can be used because they are typically found in power electronic applications. Ferrite cores are utilized for higher frequency applications because they have lower losses at high frequency. However, their core saturates at lower flux density. Silicon steel cores do suffer from circulating currents in the core which makes them lossy at high frequencies. However, this effect can be reduced by laminating the core. Steel cores are typically found in inverters with low switching frequencies to be installed in the ground. The cores were characterized using a DPG10 power choke tester.

As shown in FIG. 1, the available inductance decreases as the magnitude of the current increases. The inductance of the ferrite core rated at 5 A drastically drops until it reaches 0.38 mH at 30 A, which is about 30% of the initial inductance. The ferrite core rated at 10 A reduces its inductance to 0.8 mH at 30 A, which corresponds to 60% of the initial inductance. The laminated steel core inductor rated at 10 A maintains 80% of its nominal value at 30 A. However, notice that this core is nonlinear even at current lower than 5 A.

Adaptive Current Control Considering the Core Saturation of the Grid Filter

Figure 2:
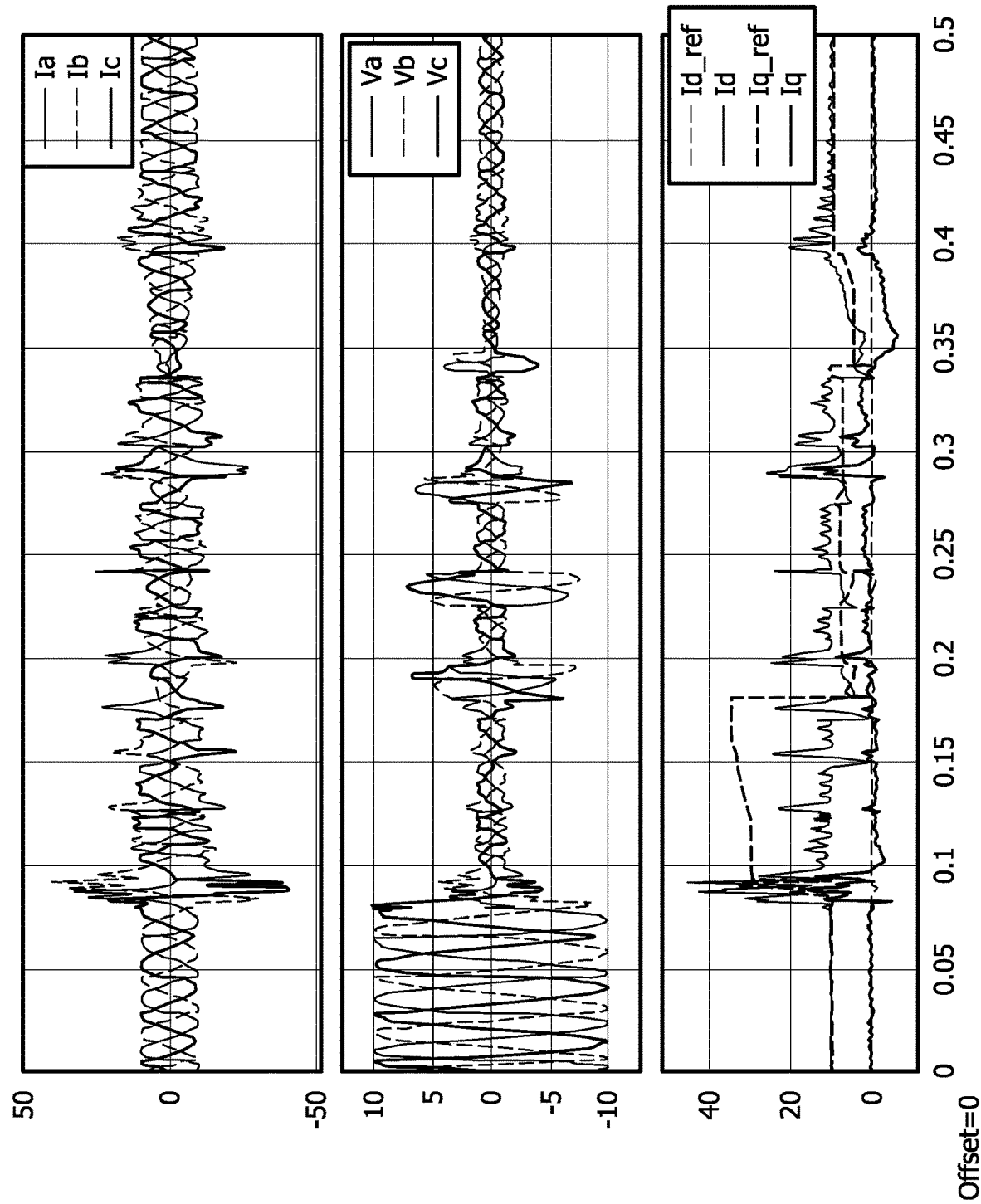
FIG. 2 provides graphs showing unstable behavior of conventional vector control that does not consider saturation of the inductive grid filter and experimental results of a closed loop control.

FIG. 2 provides graphs showing that saturation of the grid filter causes instabilities in the current closed loop control. Although it is possible to design a converter with an inductor that does not saturate (e.g., considering the overloading conditions), this would make the line filter bulky and costly. On the other hand, it is desirable to control the fault current in closed loop control to prevent the semiconductors from exceeding their thermal limit. For these reasons, the inductor is not overrated, but instead, designed to have a current control that accounts for the nonlinearities of the inductor during fault conditions.

Figure 3:
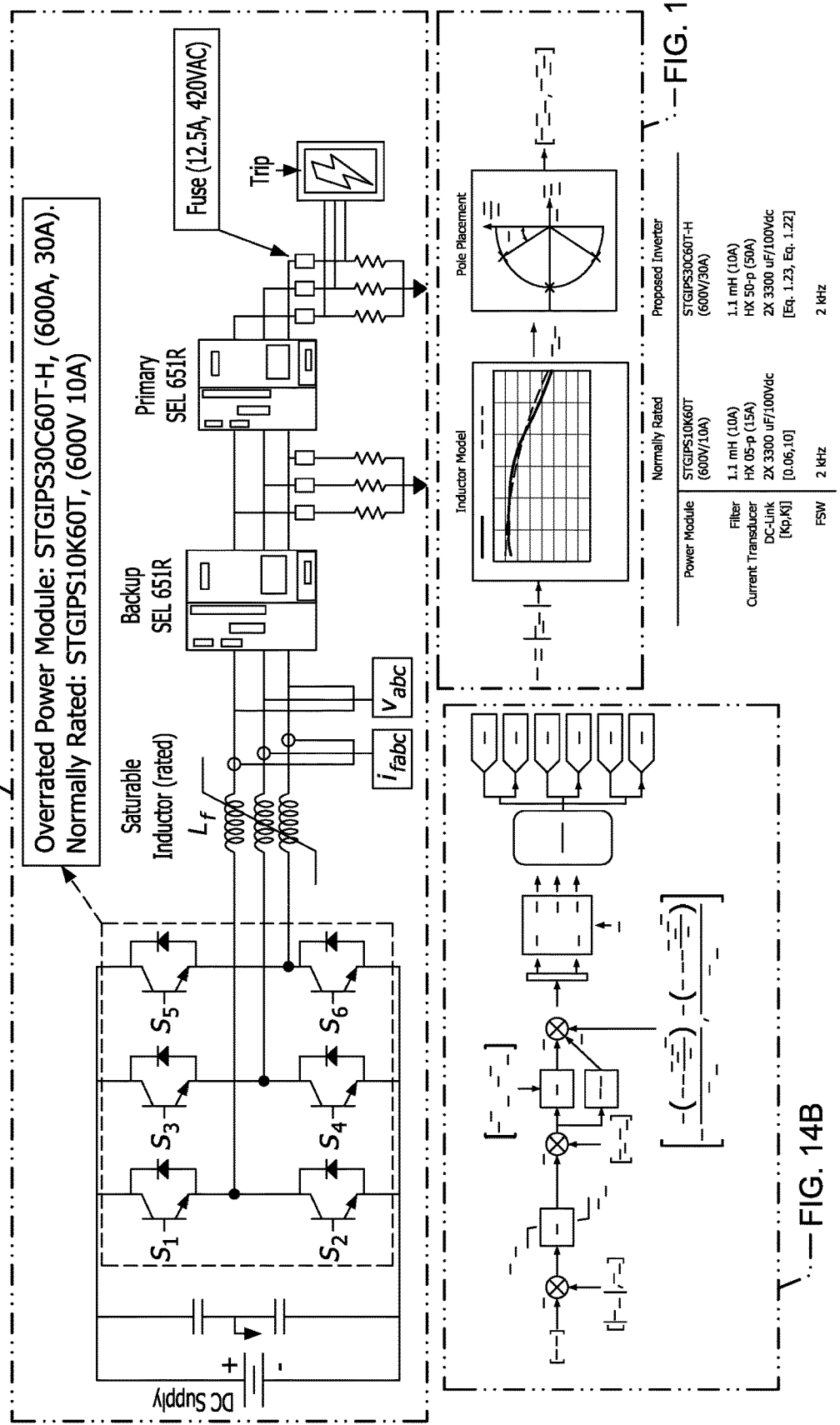
FIG. 3 provides illustrations that are useful for understanding current control to adapt controller gains based on the operating point of an inverter and an inductor temperature.

FIG. 3 shows a control configured to enable stability of the control loops for normal and high current operation. The control is described in the next two sections. In the next section, a signal model of the inverter is described considering the core saturation to analytically obtain the decoupling terms. In the next-to-next section, a control method is described to adapt the control gains based on the operation point of the inverter. This control method is required since the point of operation drastically changes when the inverter operates at higher currents, and it is very important to retune the PI with the correct gains to prevent severe oscillations or instabilities when the inductor present deep saturation.

Modelling and Model Validation of Nonlinear Inductors

A model of the nonlinear inductor is established to introduce the core saturation in the closed loop current control. Mathematical equation (1) describes the nonlinear inductor in a polynomial form.

$$L_s = L_o + L_2 i^2 + L_4 i^4 \qquad (1)$$

where i is the instantaneous current flowing through the inductor (i=I sin ωt+δ), $L_o$ is the inductance at zero current, and Ln is a constant term that can be adjusted to fit the saturation characteristics of the inductor. The small signal model of the three-phase inverter was derived considering the nonlinearities of the inductor. The flux linkage λ in a three-phase converter can be described by the following mathematical equation (2).

$$\lambda_{abc} = L_{abc} i_{abc} \qquad (2)$$

The current controller for the three-phase inverter is implemented in the synchronous reference frame. Then, the inductor matrix in abc-frame needs to be transferred to the dqo-frame. Replacing the inductance estimated by mathematical equation (1) in mathematical equation (2).

$$\lambda_{abc} = L_{abc} i_{abc} = \begin{bmatrix} L_o + L_o + L_2 i^2 + L_4 i^4 & 0 & 0 \\ 0 & L_o + L_2 i^2 + L_4 i^4 & 0 \\ 0 & 0 & L_o + L_2 i^2 + L_4 i^4 \end{bmatrix} \quad (3)$$

where $i_a = I \sin(\theta)$, $i_b = I \sin(\theta + 2/3\pi)$ and $i_c = I \sin(\theta + 2/3\pi)$. The Park-Clarke transformation matrix and its relationship between the abc-frame inductor matrix and the dq-frame inductor matrix are shown in mathematical equation (4).

$$T_{abc/dqo} = \sqrt{\frac{2}{3}} \begin{bmatrix} \cos\theta & \cos(\theta - 2/3\pi) & \cos(\theta + 2/3\pi) \\ -\sin\theta & -\sin(\theta - 2/3\pi) & -\sin(\theta + 2/3\pi) \\ \sqrt{\frac{1}{2}} & \sqrt{\frac{1}{2}} & \sqrt{\frac{1}{2}} \end{bmatrix} \quad (4)$$

Its inverse is shown below by mathematical equation (5).

$$T_{abc/dqo}^{-1} = T_{dqo/abc} = \sqrt{\frac{2}{3}} \begin{bmatrix} \cos\theta & -\sin\theta & \sqrt{\frac{1}{2}} \\ \cos(\theta - 2/3\pi) & -\sin(\theta - 2/3\pi) & \sqrt{\frac{1}{2}} \\ \cos(\theta + 2/3\pi) & -\sin(\theta + 2/3\pi) & \sqrt{\frac{1}{2}} \end{bmatrix} \quad (5)$$

The elements of the abc-frame inductor matrix in mathematical equation (3) are nonlinear and relate to the instantaneous current flowing through the inductor. To linearize the mathematical equations, the following assumptions are made. First, is that the three-phase current is balanced without zero sequence component. Secondly, the currents contain only positive sequence fundamental frequency components. Replacing mathematical equations (3)-(5) into mathematical equation (2) yields mathematical equation (6).

$$\lambda_{abc} = T_{abc/dq} L_{abc} T_{dq/abc} i_{dq} \quad (6)$$

By solving mathematical equation (6), the equivalent flux linkage can be further simplified by adopting a second-order polynomial that provides an excellent approximation defined by mathematical equations (7) and (8).

$$\lambda_d = i_d * (L_o + 3 * L_2 I^2/4) \quad (7)$$

$$\lambda_d = i_q * (L_o + L_2 I^2/4) \quad (8)$$

Mathematical equations (7) and (8) show that there are no coupling terms between the direct and quadrature axis components. The equivalent d-axis inductance is only related to $3*L_2 I^2/4 + L_o$ and the q-axis equivalent inductance to $L_o + L_2 I^2/4$. The next section will apply this approximated inductance in the dq synchronous reverence control of a three-phase power converter.

Now that the equivalent flux linkage to the core saturation has been calculated, the next step is to include its effects in the current control of the energy storage inverter. To do so, the average model of the three-phase inverter is used as shown in FIG. 4.

The inductor voltage is related with flux linkage for a three-phase inductor as shown by below mathematical equation (9).

$$v_{abc} = \frac{d}{dt}\lambda_{abc} = L_{abc}\frac{d}{dt}i_{abc} \quad (9)$$

Figure 4:
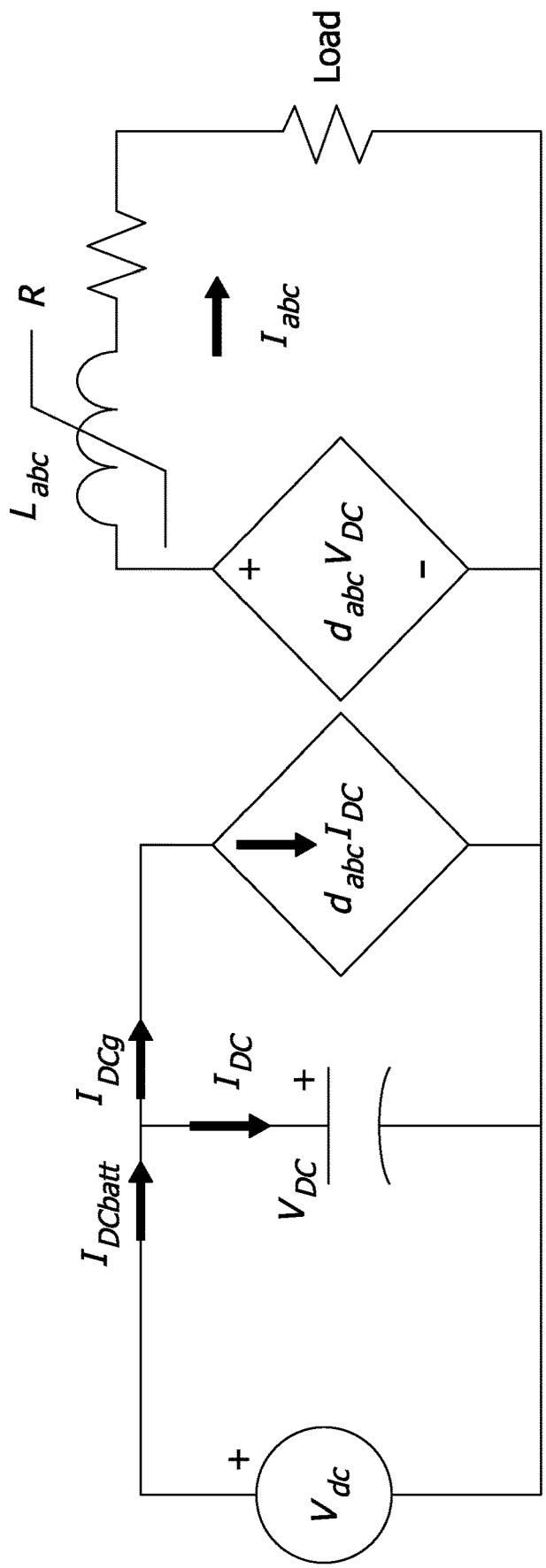
FIG. 4 provides a circuit diagram for an average model in an abc frame considering nonlinear inductor.

Based on the circuit of FIG. 4, the following mathematical equation (10) can be written.

$$\frac{d}{dt}(\lambda_{abc}) = -ri_{abc} - d_{abc} v_{dc} \quad (10)$$

Expressing in the dq frame provides mathematical equation (11).

$$\frac{d}{dt}(T_{dq/abc}\lambda_{dq}) = -rT_{dq/abc}i_{dq} - T_{dq/abc}d_{dq}v_{dc} \quad (11)$$

where $T_{dq/abc}$ is the inverse Park-Clarke transformation. Expanding the derivative product provides mathematical equation (12).

$$\frac{d}{dt}(T_{dq/abc})\lambda_{dq} + T_{dq/abc}\frac{d}{dt}\lambda_{dq} = -rT_{dq/abc}i_{dq} - T_{dq/abc}d_{dq}v_{dc} \quad (12)$$

Multiplying both sides by $T_{abc/dq}$ provides mathematical equation (13).

$$T_{abc/dq}\frac{d}{dt}(T_{dq/abc})\lambda_{dq} + T_{abc/dq}T_{dq/abc}\frac{d}{dt}\lambda_{dq} = -rT_{abc/dq}T_{dq/abc}i_{dq} - T_{abc/dq}T_{dq/abc}d_{dq}v_{dc} \quad (13)$$

where $$T_{abc/dq}T_{dq/abc} = \text{is} \begin{bmatrix} 1 & 0 \\ 0 & 1 \end{bmatrix}, \text{ and } T_{abc/dq}(d/dt)(T_{dq/abc}) = \begin{bmatrix} 0 & -\omega \\ \omega & 0 \end{bmatrix}$$

which yields mathematical equation (14).

$$\begin{bmatrix} 0 & -\omega \\ \omega & 0 \end{bmatrix}\lambda_{dq} + \frac{d}{dt}\lambda_{dq} = -ri_{dq} - d_{dq}v_{dc} \quad (14)$$

Considering mathematical equations (7)-(8), the flux linkage for a second order polynomial for the nonlinear inductor is shown by mathematical equation (15).

$$\tilde{\lambda}_{dq} = \begin{bmatrix} Lo + 3\dfrac{L_2 I^2}{4} & 0 \\ 0 & Lo + \dfrac{L_2 I^2}{4} \end{bmatrix} \begin{bmatrix} \tilde{\imath}_d \\ \tilde{\imath}_q \end{bmatrix} \quad (15)$$

Mathematical equation (15) shows that the d and q channels are coupled. To linearize mathematical equation (15), the decoupling terms are introduced in FIG. 5. Thanks to the decoupling terms, the resulting transfer function is a first order with a pole defined by the point of operation and the passive elements of the grid filter. The following mathematical equations (16) and (17) show that the nonlinear inductance influences the poles of the current control and the decoupling terms.

$$\tilde{\imath}_d = \dfrac{\partial_d V_{dc}}{(sL_d + r)} = \dfrac{\partial_d V_{dc}}{\left(s\left(Lo + 3\dfrac{L_2 I^2}{4}\right) + r\right)} \quad (16)$$

$$\tilde{\imath}_q = \dfrac{\partial_q V_{dc}}{(sL_q + r)} = \dfrac{\partial_q V_{dc}}{\left(s\left(Lo + \dfrac{L_2 I^2}{4}\right) + r\right)} \quad (17)$$

The current controllers are designed by utilizing the open loop transfer function shown in mathematical equation (18) and (19).

$$T_{id} = \beta_d G_{cd} G_{PWM} \dfrac{V_{dc}}{\left(s\left(Lo + 3\dfrac{L_2 I^2}{4}\right) + r\right)} \quad (18)$$

$$T_{iq} = \beta_q G_{cq} G_{PWM} \dfrac{V_{dc}}{\left(s\left(Lo + \dfrac{L_2 I^2}{4}\right) + r\right)} \quad (19)$$

where $$G_{PWMi} = \dfrac{1}{2V_{pp}}\left(e^{-s(1-D)T_s} + e^{-s(D)T_s}\right),$$

corresponds to a small signal model of the delay produced by its implementation and the sampling and data processing are considered. $\beta_{di}$, $\beta_{qi}$ are the gains associated with the sensing of the currents. $G_{cdql}$ is the transfer functions of the current controllers, which will be addressed in the next section. Notice that the core saturation introduces a pole that depends on the operation point of the inverter and the fit constant $L_2$.

Disclosed Adaptive Control Considering Grid-Filter Saturation

It was described above that the inductor core saturation modifies the poles of the current transfer function, reducing both the phase and gain margins of the system. If the PI controller does not account for these changes, the control will oscillate or become unstable when the inverter operates at higher current. The gains can be calculated based on the worst-case scenario by only considering the pole introduced by the lowest inductance caused by the core saturation. This would yield controller gains that are too slow when the inverter operates during normal conditions. A manual process is not good especially when the inverter operation point can change drastically due to the nonlinearity of the grid filter. Next, a method is described to calculate the control gains to enable stability for a wide range of operating conditions, including normal operation when the inductor is considered linear, and when the inverter operates at high current causing the inductor core to saturate. Choosing the appropriate control gains is key to obtaining stable operation when the inductor starts to saturate, and good tracking performance during currents under the saturation point.

Figure 6:
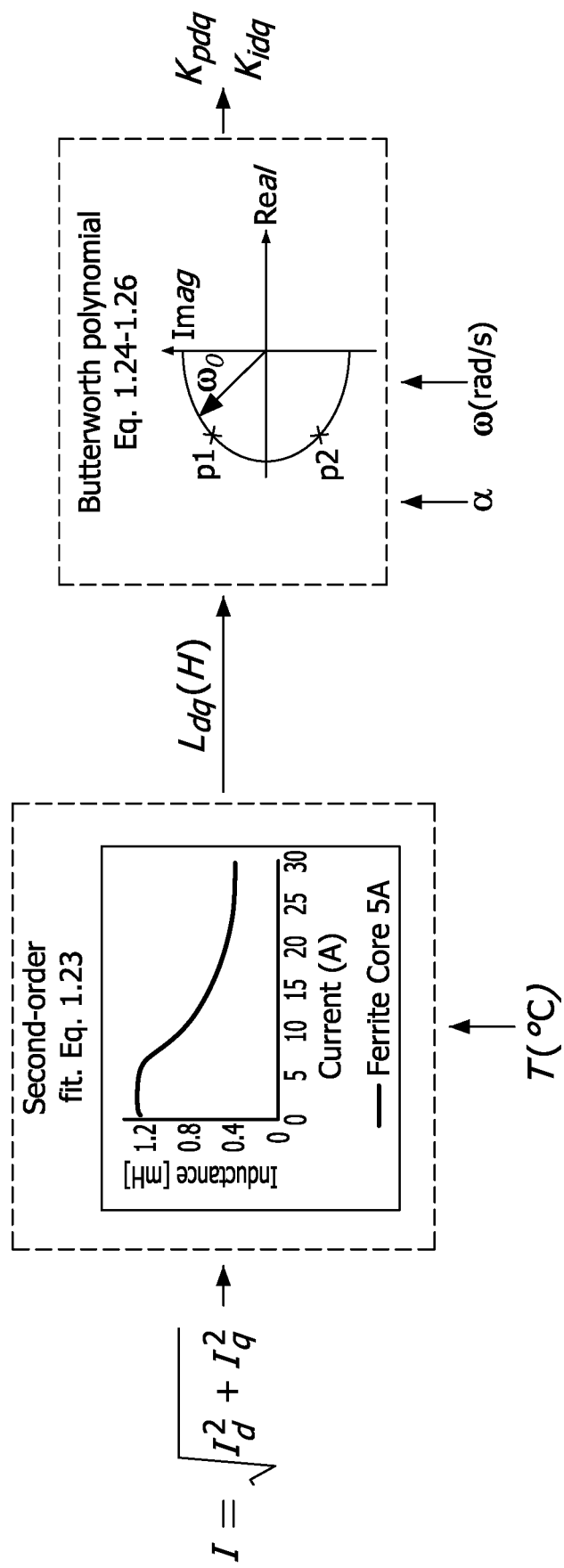
FIG. 6 provides an illustration that is useful for understanding an online calculation of Proportional Integral (PI) controller gains.

The disclosed method includes adaptively adjusting the integral and proportionally considering the operating point of the inverter, as shown in FIG. 6.

The disclosed method considers as input the inverter current $I_{dq}$ and the grid filter temperature T. Based on these parameters, the fit equation of the nonlinear inductor is used to calculate the inductance for the d-channel and q-channel for the given operating point. The equivalent inductance for the d-channel is determined using mathematical equation (23). Then, the Butterworth polynomial is used to optimize the closed loop eigenvalue locations. This method locates the eigenvalues uniformly in the left-half s-plane on a circle with radius $\omega_o$, with its center at the origin. The Butterworth polynomial receives as inputs the inductance value $L_{dq}$, the system delay $\alpha$, and the desired bandwidth for the current controller $\omega$, which is typically eight to ten times smaller than the switching frequency. The Butterworth polynomial block provides as output the gains of the proportional and integral controller that make the system stable at the desired bandwidth and operating point. The third order Butterworth polynomial can be expressed by mathematical equation (20).

$$s^3 + (1 + 2\zeta)\omega s^2 + (1 + 2\zeta)\omega^2 s + \omega^3 \quad (20)$$

where $\omega_o$ is the bandwidth of the current controller, which is set ten times lower than the switching frequency, and $\zeta$ is a constant that influences the damping response. The time delay is captured by a first order Padé approximation, where $\alpha = 0.5\ Ts$ and $Ts$ is the maximum delay time.

$$e^{-s(D)T_s} \approx \dfrac{1 - \alpha s}{1 + \alpha s} \quad (21)$$

The closed loop transfer function for the current control is obtained in mathematical equation (22) using the current open loop transfer function of mathematical equations (18)-(19) and the delay approximation of mathematical equation (21).

$$G_{id} = \dfrac{(V_{dc}(\alpha - s) * (K_i + K_p s))}{s^3 L_{dq} + s^2 r + s\alpha r - s\beta K_i V_{dc} + s^2 L_{dq}\alpha - s^2 \beta K_p V_{dc} + s\beta K_p \alpha V_{dc} + K_i \beta \alpha V_{dc}} \quad (22)$$

where the d-channel and q-channel inductor depend on the point of operation, $$L_{dq} = \begin{bmatrix} 3Lo + L_2 I^2/4 \\ L_2 I^2/4 + Lo \end{bmatrix} \quad (23)$$

where $\beta$ is the current sensor gain, and the inductance for the d and q channels is estimated. The inductances depend on the operating current of the inverter I, which equals to $$I = \sqrt{I_d^2 + I_q^2}.$$

Comparing the coefficients of the Butterworth polynomial of mathematical equation (20) with the denominator of the closed-loop transfer function of mathematical equation (22), mathematical equations (24) and (25) are obtained.

$$K_i = \frac{\omega^3 L_{dq}}{\beta \alpha V_{dc} K^2} \quad (24)$$

$$K_p = \frac{\omega^2 L_{dq}(1 + 2\varsigma) + \beta K_i V_{dc} - \alpha r}{\beta \alpha V_{dc}} \quad (25)$$

Mathematical equations (24) and (25) together with the fit mathematical equation (23) can be implemented directly on the same microprocessor of the inverter to adaptively adjust the gains considering the operating conditions of the inverter and the saturation of the grid filter. The microprocessor can include, but is not limited to, a digital signal processor (DSP) and/or a field programmable gate array (FPGA). This control is critical to maintain the stability of the inverter during faults, where the inverter provides 3.0 p.u. of current.

Figure 7:
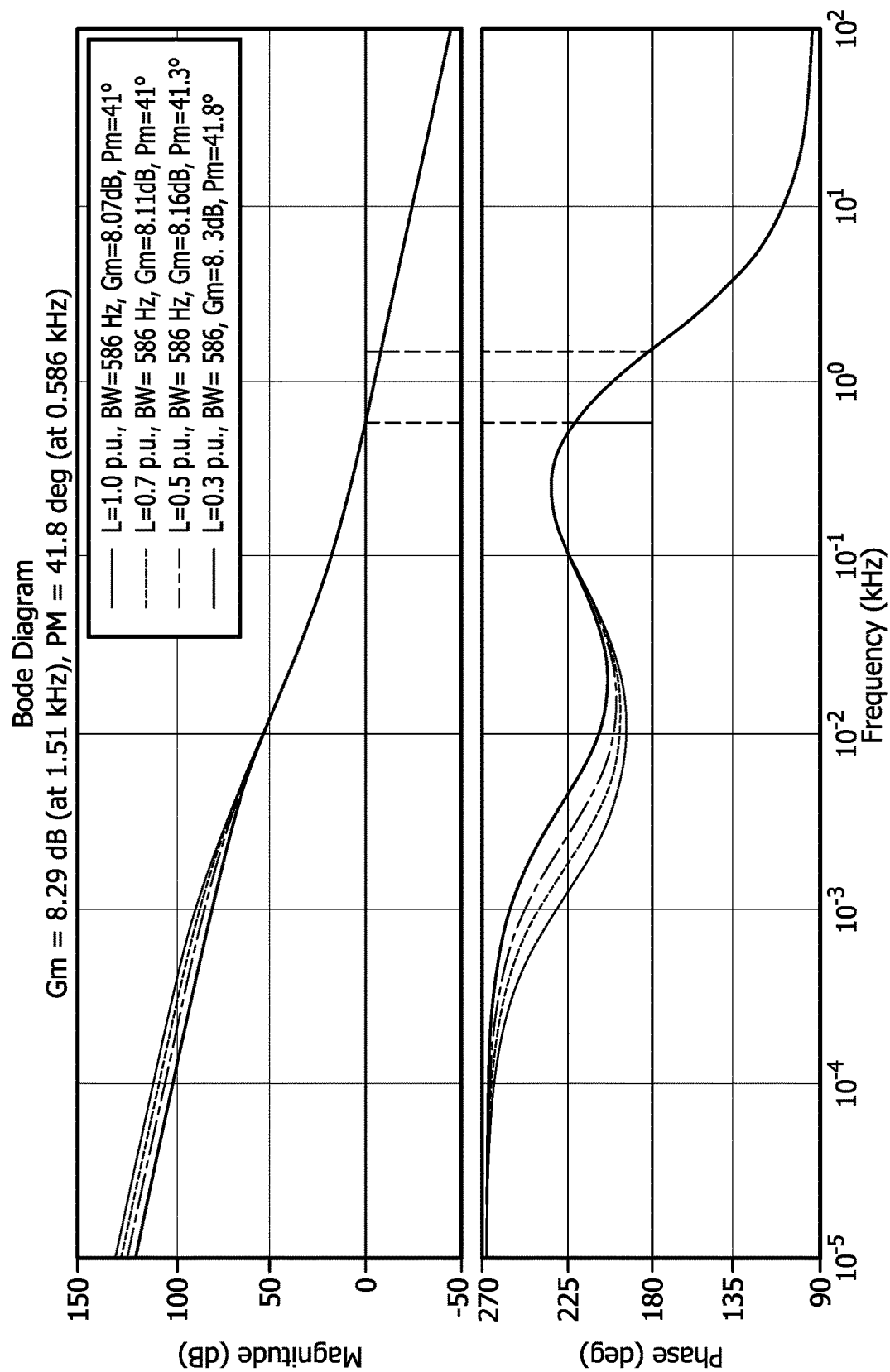
FIG. 7 provides Bode plots for different inductance values due to core saturation. PI gains are calculated using the disclosed adaptive control methods. Proposed adaptive control maintains same stability metrics (phase, gain margin, and bandwidth) for different inductance values. Inductance value depends on the saturation of the inductor core caused by high-current operation. Plot shows that the control is stable regardless of available inductance.

FIG. 7 shows a Bode plot which considers the core saturation where the inductance drops of the ferrite core from 1.0 p.u. to 0.3 p.u.

Figure 8:
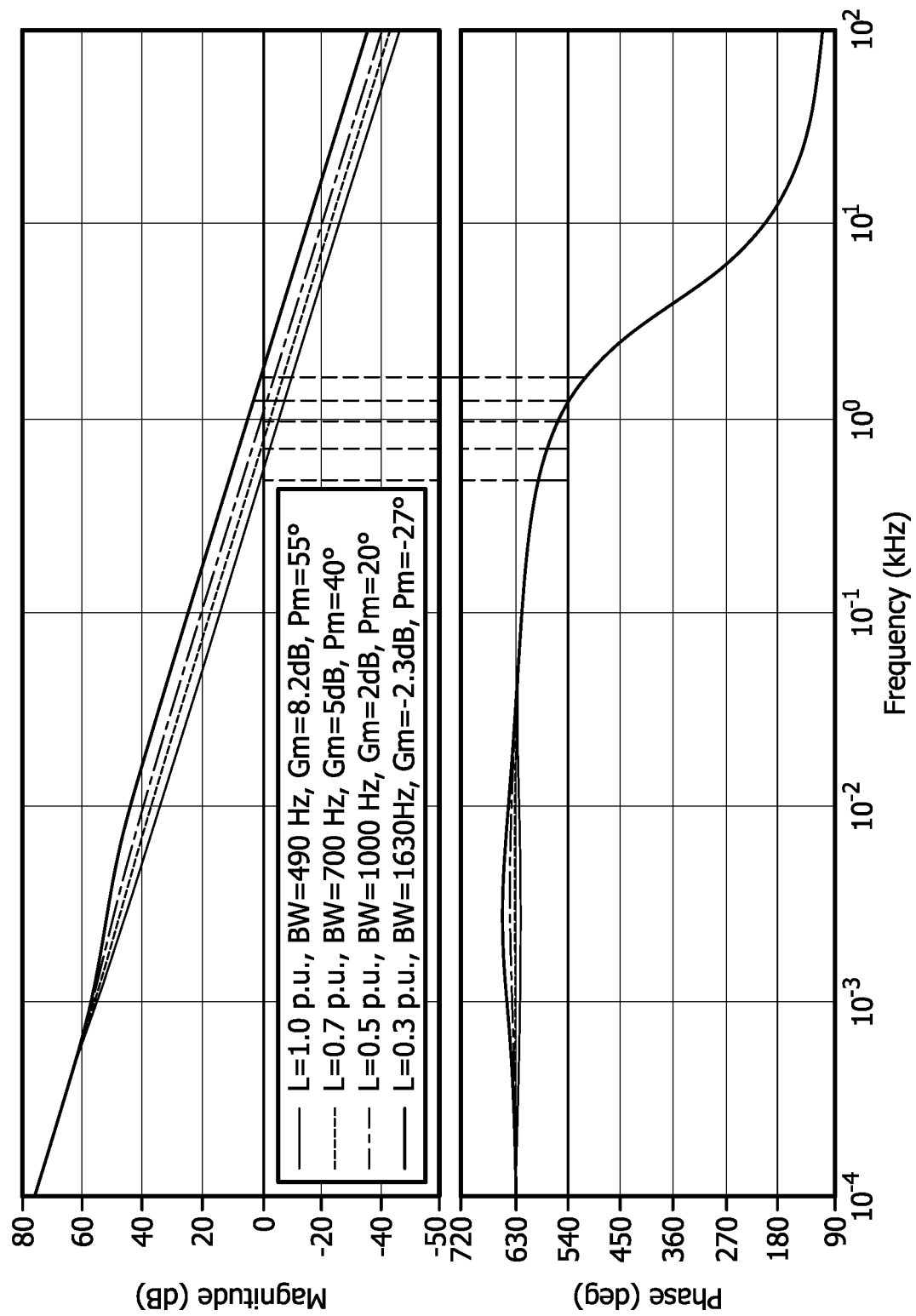
FIG. 8 provides Bode plots for different inductance values due to core saturation. This plot uses a conventional PI controller that does not consider inductor saturation. Control becomes unstable for L=0.3 p.u. with a negative phase margin.

The constant $\varsigma$ in the mathematical equations (24) and (26) is set to one and the bandwidth of the controller to $\omega=2\pi 600$ rad/s. FIG. 7 shows the clear advantages of the disclosed method, which guarantees the phase margin greater than 40 degrees, the gain margin above 8 dB, for all operating points including when the core is deeply saturated (e.g., at L=0.3 p.u.). As a comparison, FIG. 8 shows a conventional vector control applied to a converter for which the grid-filter saturates. With the conventional control, the phase and gain margins changed when the inductor started to saturate until the control finally becomes unstable for L=0.3 p.u.

Figure 9:
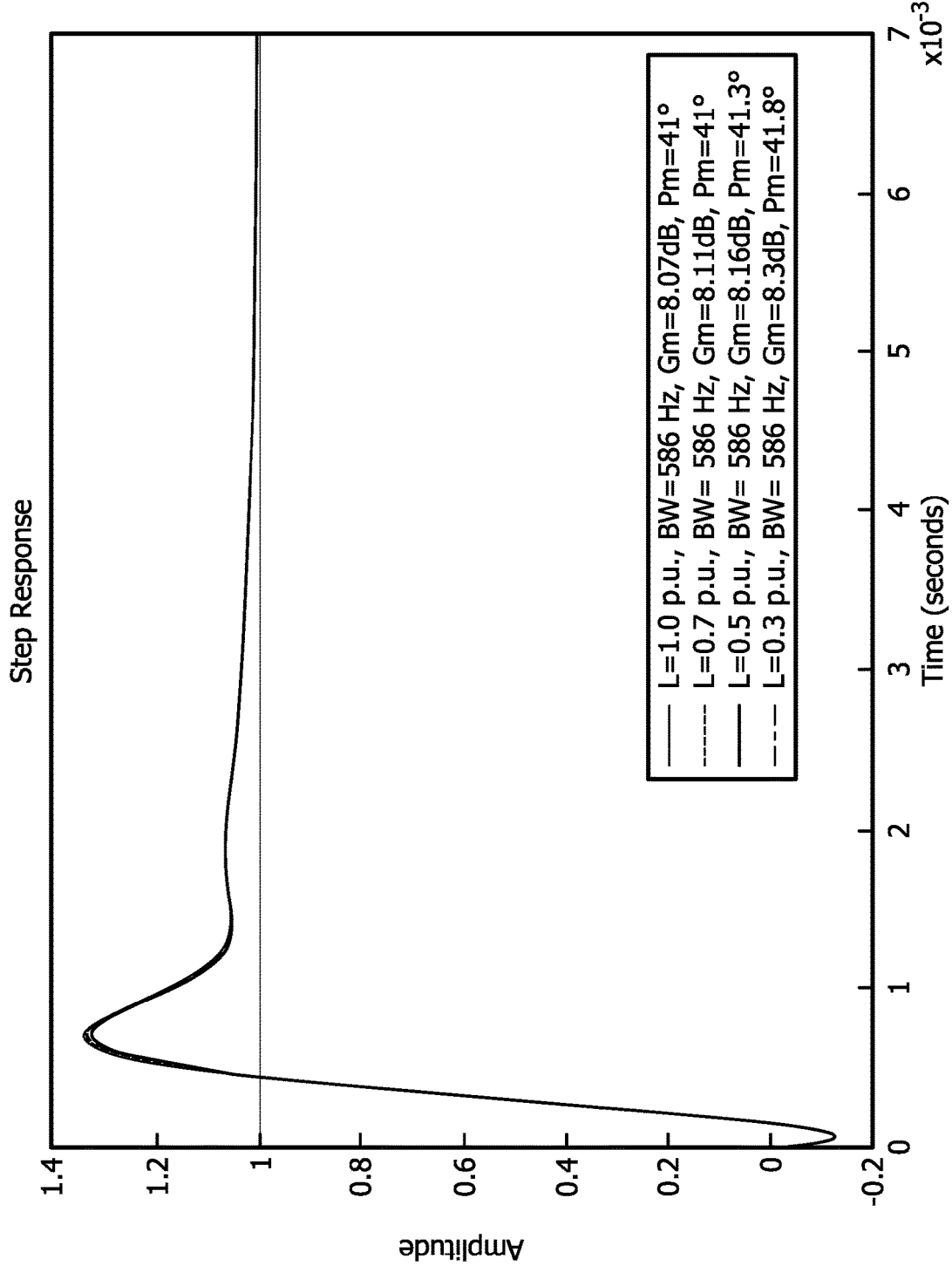
FIG. 9 provides a graph showing step response for different inductance values due to core saturation effect of the ferrite core. L=10 p.u.=1.3 mH. PI gains calculated using the disclosed control.
Figure 10:
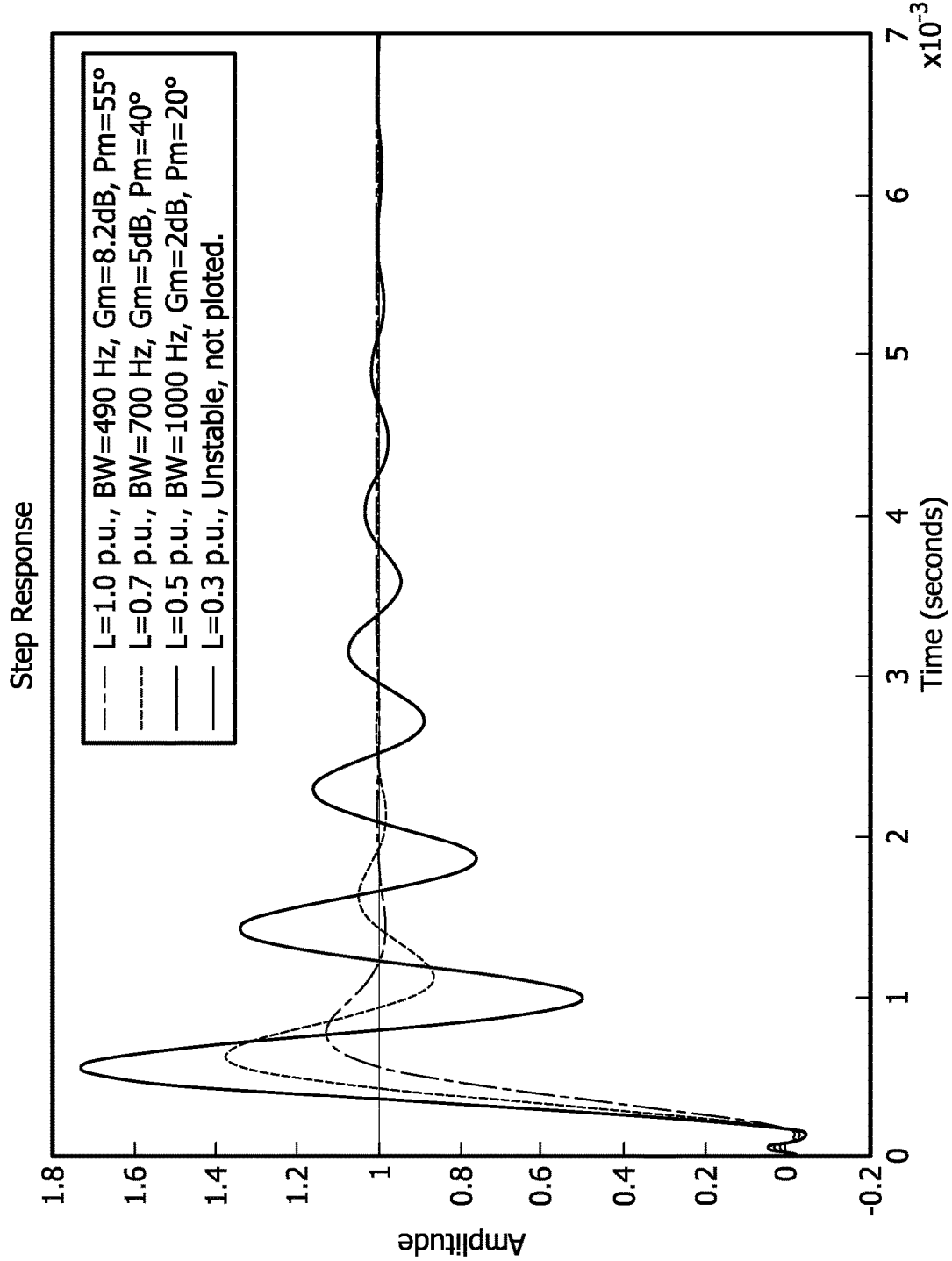
FIG. 10 provides a graph showing step response for different inductance values due to core saturation effect of the ferrite core. L=10 p.u.=1.3 mH. Conventional vector control applied.

FIG. 9 shows a step response of the open-loop current control using the disclosed method. FIG. 10 shows the step response using a conventional control with Proportional Integral (PI) with fixed gain. For this test, the core saturation reduces the inductance from 1.0 p.u to 0.3 p.u. Without the disclosed controller, the step response shows severe overshoots and oscillations. The results for L=0.3 were not included for the conventional PI control since the system became unstable. Another advantage of the disclosed method is that the system can be more damped by manipulating the constant $\varsigma$ and the constant K=[$K_p$, $K_i$].

Figure 11:
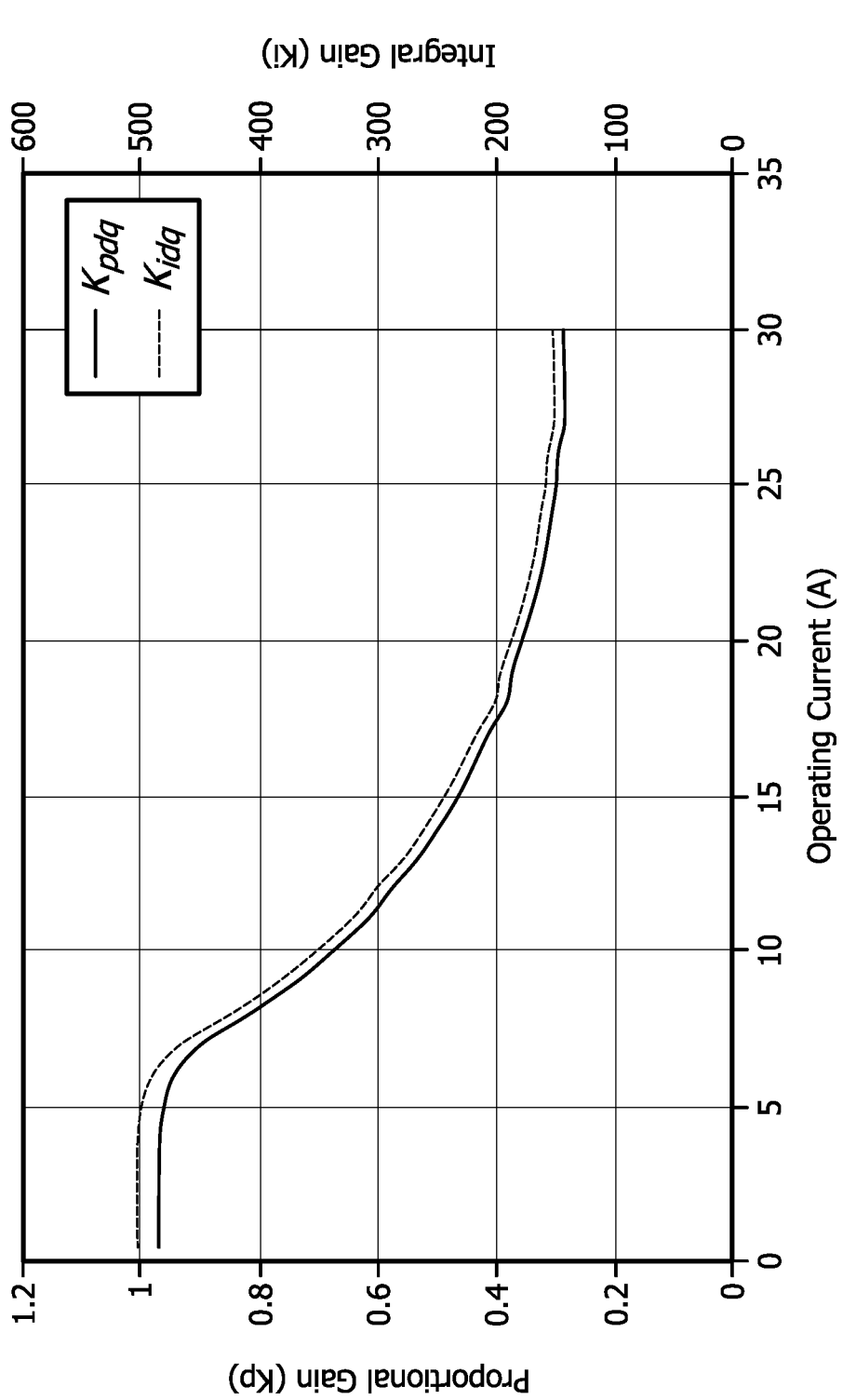
FIG. 11 provides a graph showing disclosed controller gain values (Kpdq* and Kidq*) caused to core saturation effect of the ferrite core. L=10 p.u.=1.3 mH. PI gains calculated using the Butterworth polynomial.
Figure 12:
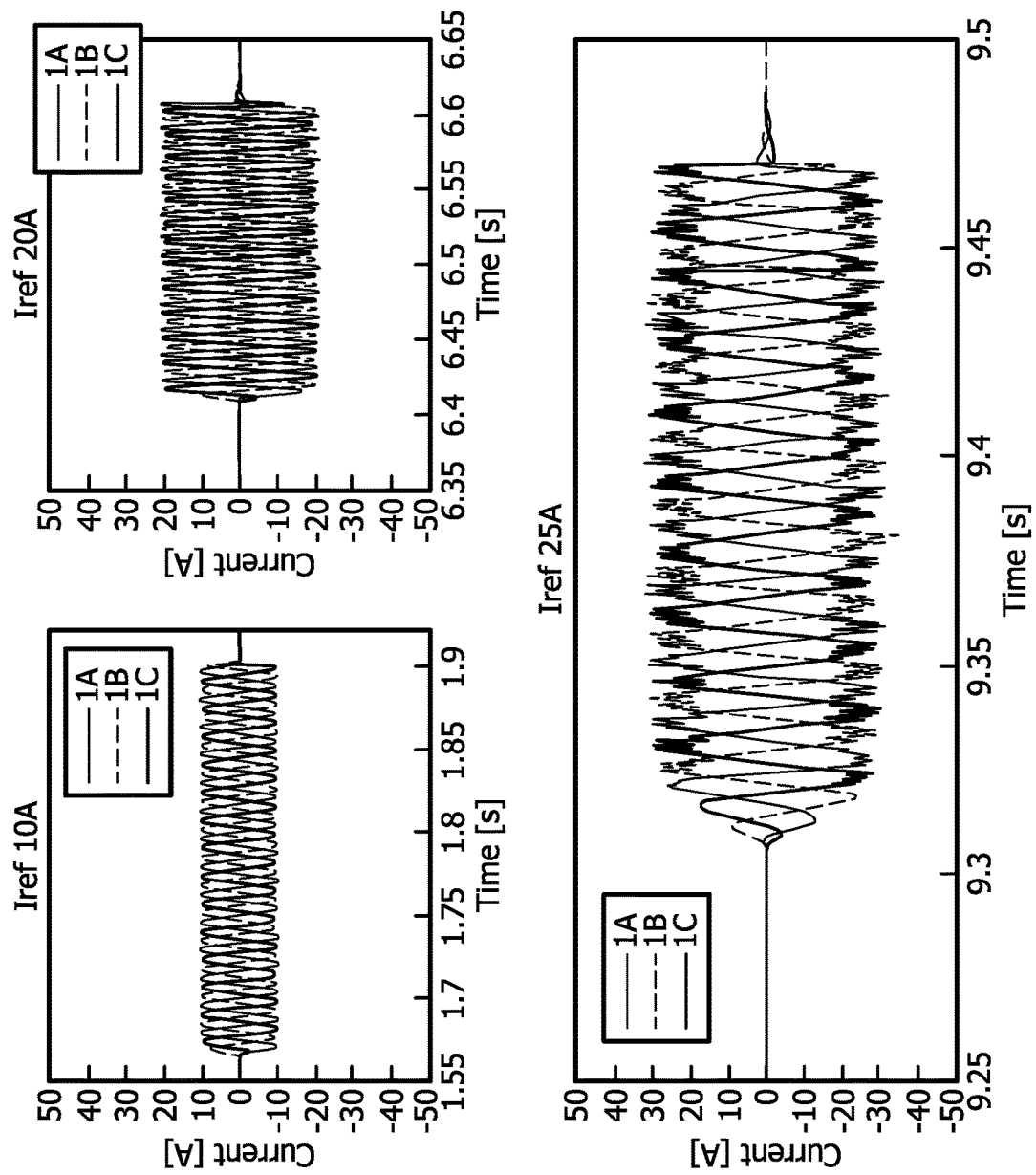
FIG. 12 provides graphs shown experimental results. Conventional PI with constant gains. Inverter control starts oscillating due to the reduced inductance and fixed PI gains of conventional control at I=25 A.
Figure 13:
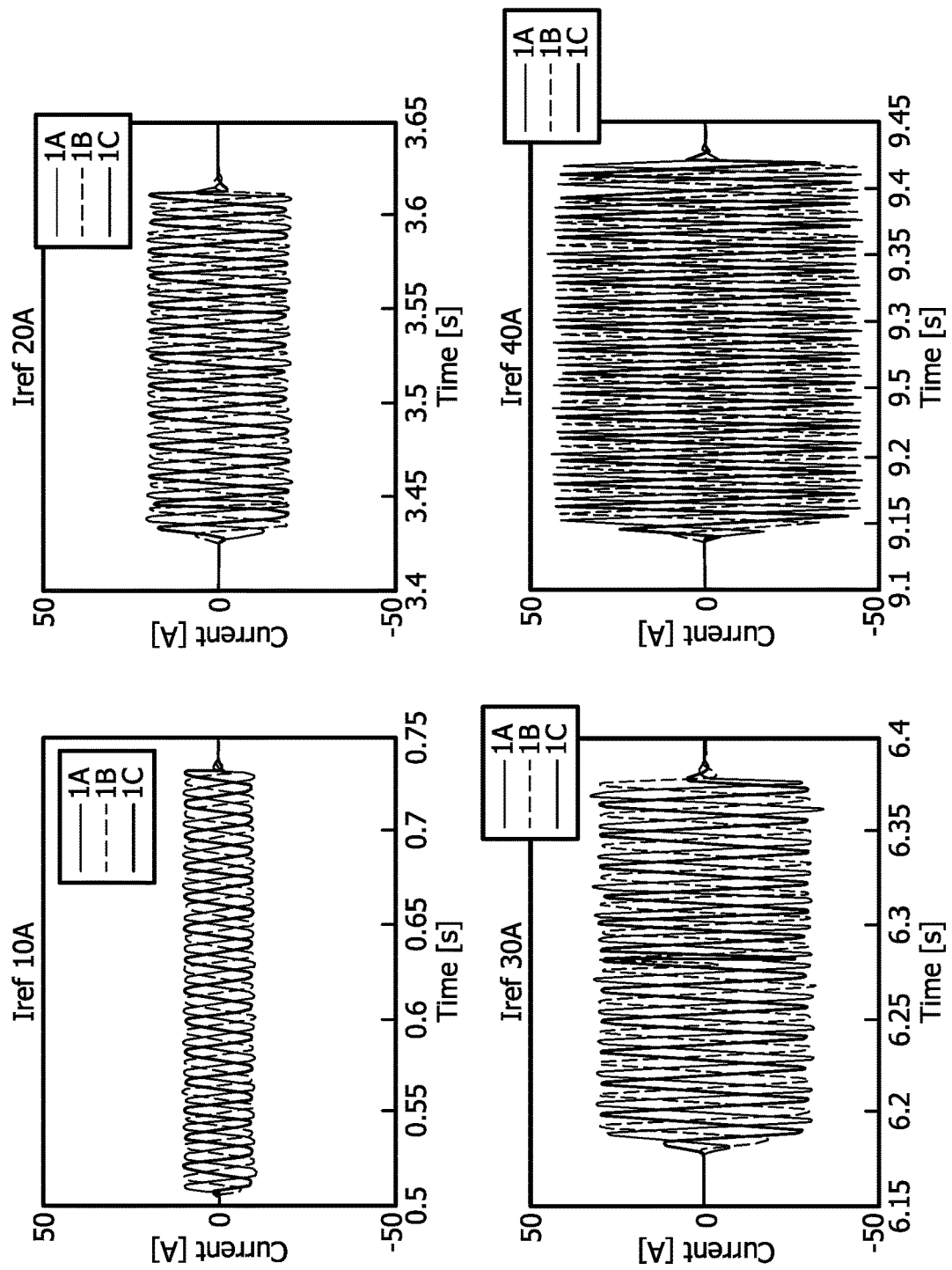
FIG. 13 provides experimental results. Disclosed adaptive control considering grid filter saturation. Inverter stable for all current setpoints (40 A).

FIG. 11 shows how the proportional and integral gains of the control are calculated depending on the operating current of the inverter. Notice that for the linear operation region of the inductor the gains are constant, as the core saturates, the gains are modified to maintain the desired phase and gain margin at the given controller bandwidth. Experimental results described below compare the conventional PI control with fixed gains against the disclosed adaptive method to calculate the controller gains. As shown in FIG. 12, using a conventional approach the inverter currents are stable when the inverter is providing 25 A (2.5 p.u.). Beyond this current, the inverter becomes unstable which can lead to a catastrophic fault of the inverter. The experimental results using the disclosed method are shown in FIG. 13.

The disclosed method to adaptively adjust the controller gain can keep the inverter currents stable for currents up to 40 A when the grid filter is deeply saturated. The disclosed method was implemented directly on the microprocessor of the inverter. The disclosed method is an online process and is currently adjusting the controllers gain depending on the operating point of the inverter and the corresponding inductor saturation.

Three-Phase Inverter Design with Enhanced Short-Circuit Fault Current Contribution to Enable Legacy Overcurrent Protection for Islanded Microgrids There is broad consensus among researchers and industry practitioners that one of the main challenges of protecting inverter-based microgrids operating in islanded mode is caused by the relatively small fault contribution of IBRs. IBRs typically control their short-circuit contribution close to their rated current, which is insufficient to reliably protect microgrids using legacy distribution overcurrent protection. Hardware and control modifications are described herein to increase the current contribution from a three-phase inverter with the objective of enabling the use of legacy overcurrent protection for islanded systems and achieving fuse-relay and relay-to-relay coordination. The control challenges with saturable inductors are addressed herein. A method is described to adapt the control gains to maintain the stability criteria during both normal operation and fault events. The disclosed hardware and control modifications effectively increased the current contribution of the inverter, which allows the adoption of conventional overcurrent protective devices for inverter-based microgrids in islanded operation.

Although microgrids are commissioned at the distribution level, available protective devices for distribution, including reclosers, relays and fuses are not suitable for microgrid protection due to the dependence of these devices on the magnitude of the fault current. In microgrids, the short-circuit current magnitude drastically changes between grid-tied operation and islanded operation. During grid-tied operation, the short circuit current ratio is between 10-50 p.u. During islanded operation, the short-circuit current capacity is significantly limited due to the relatively small IBRs installed in the microgrid, which reduces the available short-circuit current between 1.2-2.0 p.u. Such a large difference makes coordination of existing distribution protection difficult and often unattainable. Fuses are particularly affected because of their time-current inverse characteristics. In some cases, fuses protecting the laterals will not melt for faults during islanded operation.

The issues of low short circuit current and high variability between operating modes have created the need for microgrids to start using protective devices that are not dependent solely on the current magnitude. To date, line current differential protection is the most effective commercially available solution to overcome the challenges of protecting microgrids during islanded operation. However, line differential protection is a very expensive solution because: it requires high bandwidth; it requires synchronized communication; and a relay should be installed at every node of a protection zone, which may be unfeasible due to the high number of nodes in a microgrid. Lastly, line current differential relays are typically equipped with backup directional overcurrent relays, which are insensitive to low fault currents. Adaptive protection, which is an online process that modifies the protective device settings to reflect changes in system conditions, is a required technique when using overcurrent relays in microgrids. This method can be implemented using a centralized, decentralized or hybrid approaches. Adaptive protection methods are expected to be used in microgrids in the future but require the construction of extensive and robust communication networks. Furthermore, relay manufacturers would need to incorporate online reprogramming of the relay settings to fully exploit the advantages of adaptive protection. Other suggested methods are based on advance signal processing and artificial intelligence (AI). These schemes extract information about the fault signatures to train an AI-based scheme to distinguish and identify the fault. However, these methods have the drawback of requiring large datasets for training purposes which are typically unavailable. Other conventional methods propose to modify the control loops of the inverter to inject predefined harmonics into the microgrid during the fault condition. Although this method can assist the protection devices to identify and detect the fault in the feeder, it does not solve the challenge of the fuses, which are the first line of defense to protect the laterals against short circuits. Other approaches use traveling wave approach. However, these methods require high sampling frequency (at least 256 kHz) and may not be applicable for microgrids with short distribution lines.

The conventional methods for microgrid protection have not led to date to a cost-effective, commercially available relay that effectively tackles the challenges of microgrid protection. To address this problem, the root problem has been tacked by the present solution and the fault contribution of the inverter has been increased which allows leveraging overcurrent protection to protect microgrids assets. The advantages of increasing the fault contribution using the disclosed method are that it: 1) enables the utilization of affordable conventional overcurrent devices such as fuses, breakers and reclosers; 2) enables fuse-relay coordination, and coordination between primary and backup relays; 3) is cost-effective because only a few components have to be overrated while the rest of the inverter components remain at the designed rated power; 4) requires no dedicated or additional unit because an energy storage system (ESS) or PV inverter can be modified to provide the higher fault current. Finally, thermal simulations show that inverter with an overrated device presents lower losses and lower thermal requirements during normal operating conditions. Hardware and control modifications are described herein to significantly increase the short-circuit fault contribution of a two-level, three-phase energy storage inverter, which is the basic topology widely used for three-phase IBRs.

Most of the protection methods proposed in literature passively tackle the negative effects caused by the low-fault contribution of IBRs. However, conventional solutions do not increase the short-circuit capabilities of IBRs. The disclosed technologies can be implemented in an energy storage inverter or PV inverters, which makes it different from solutions previously proposed in literature, which require a dedicated unit, such as a synchronous condensers, to provide high current during faults.

Few modifications are required in the inverter to significantly increase its' short-circuit capabilities to enable the use of legacy overcurrent protection in inverter-based microgrids. Because the overcurrent protection acts on the order of cycles, the inverter components must withstand the high-fault current for a short period of time, which limits the stress in the grid-filter and DC-link capacitor.

Of the inverter components, it was found the semiconductor and the current transducer should be overrated to account for higher currents. The power module should be oversized to remain in its safe operation temperature during the faulted condition (for silicon, that temperature is typically 150° C.). From an economic point of view, this approach is cost-effective, since for the same manufacturer of an insulated-gate bipolar transistor (IGBT) module, for every doubling of cost the nominal current triples. Because the power module accounts for 12% of the inverter cost, the disclosed inverter with overrated semiconductor modification would increase the cost of the inverter by 8.7%. Other modifications include the current transducer because it is necessary to measure higher currents to maintain control through the current controller during faults.

Additional modifications are made in the control to maintain stability when the grid-filter saturates due to the high current operation. The core saturation decreases the available inductance as a function of the current, so this reduced inductance impacts the stability of the current control loops. For this reason, the gains of the current control must be adjusted to account for the reduced inductance and maintain stability during faults. An online method is described which is based on the Butterworth polynomial that calculates the controller gains considering saturable inductors. This method maintains the closed-loop stability of the current control for both normal operation and fault conditions. With the disclosed inverter design, utilities may be able to reuse their existing distribution protection assets based on overcurrent to reliably protect inverter-based microgrids in islanded mode.

Figure 14A:
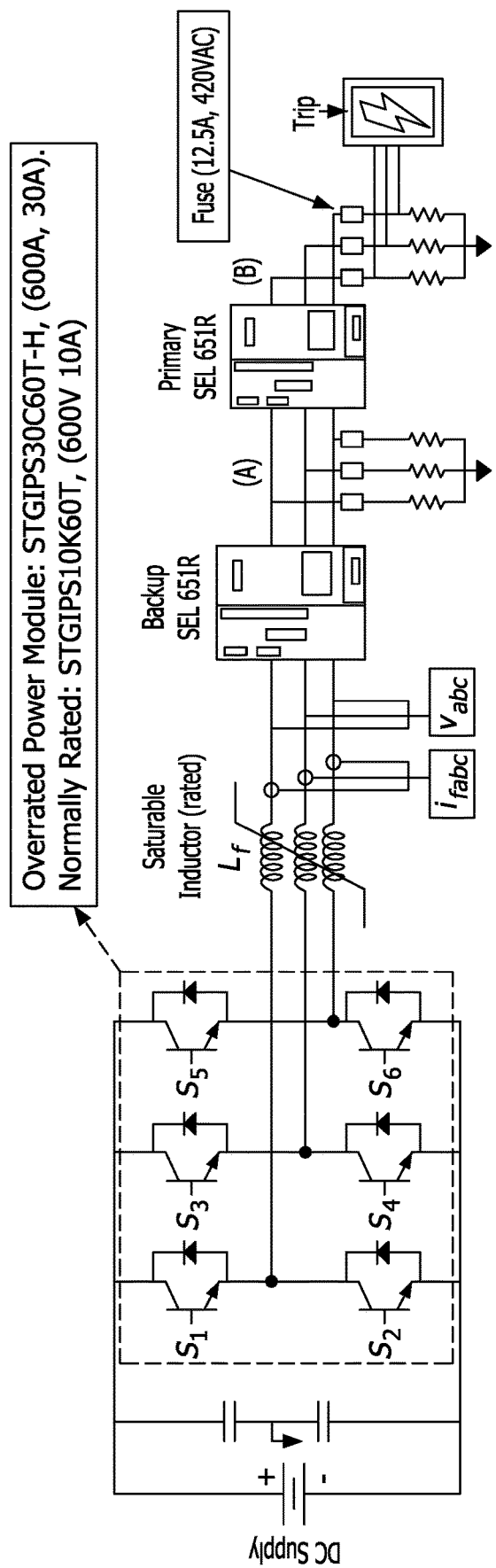
FIG. 14(A) provides illustrations that are useful for understanding an experimental setup for evaluating AC faults in three-phase inverters. Experimental validation was conducted using commercially available SEL 651 relays using overcurrent elements and fuses at the end of the line.
Figure 14B:
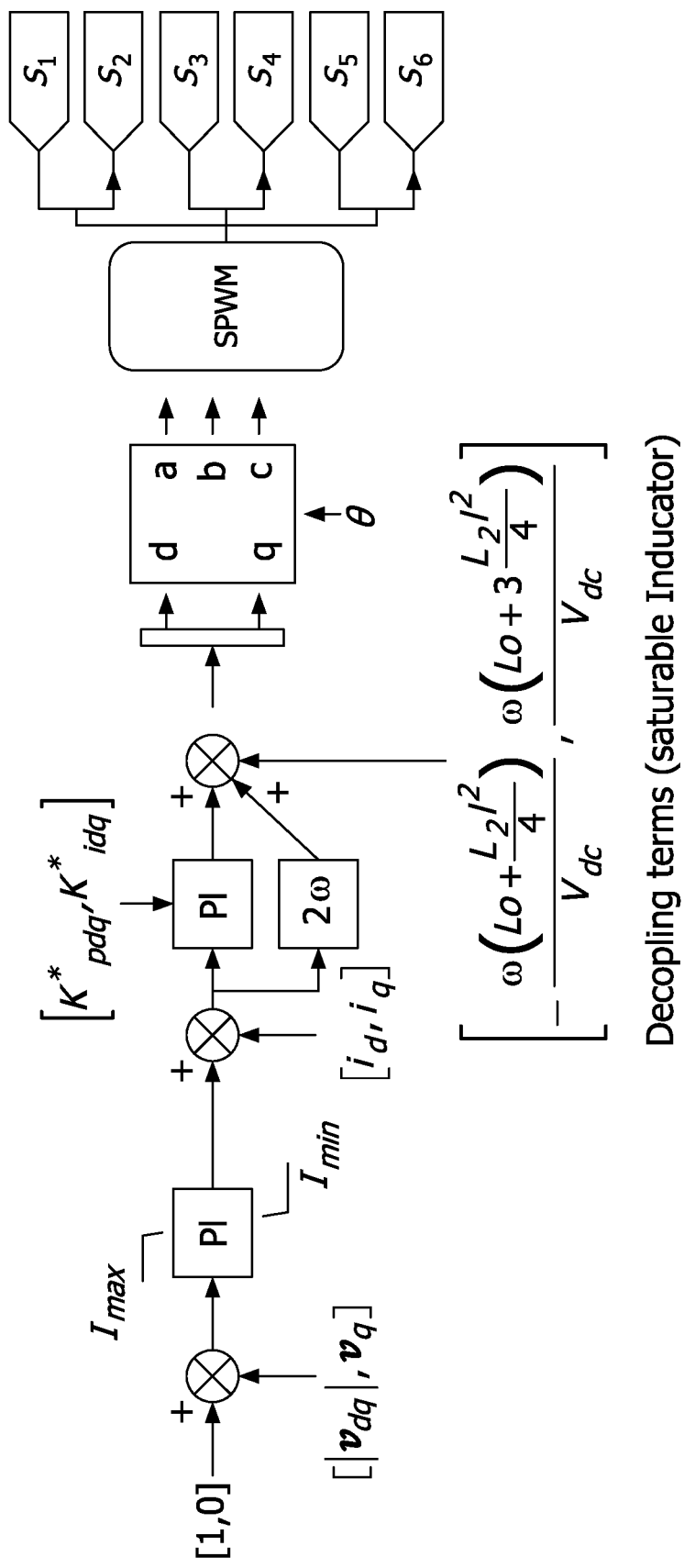
FIG. 14(B) shows the decoupling terms considering grid-filter saturation, as well as controller gains Kpdq* and Kidq* calculated through the adaptive control.

FIGS. 14A-14C provide illustrations of a testbed topology 1400. The testbed topology 1400 is useful for evaluating AC faults in three-phase inverters. The testbed topology 1400 employs rated device (STGIPS10K60T, 600V/10 A), overrated device (STGIPS30C60T-H, 600V, 30 A), and 1mH-10 A inductive grid filter.

Testbed topology 1400 includes a two-level battery storage inverter, a primary protection module and backup protection module, a fuse at the end of the circuit which is overrated to 125% of the full load current (e.g., from 10 A to 12.5 A). The primary and backup protection modules include SEL 651 reclosers. For this inverter prototype, the power module was overrated while the other components remained at their rated power. The TCC for the primary relay, backup relay, and fuses are presented in FIG. 15.

Figure 15:
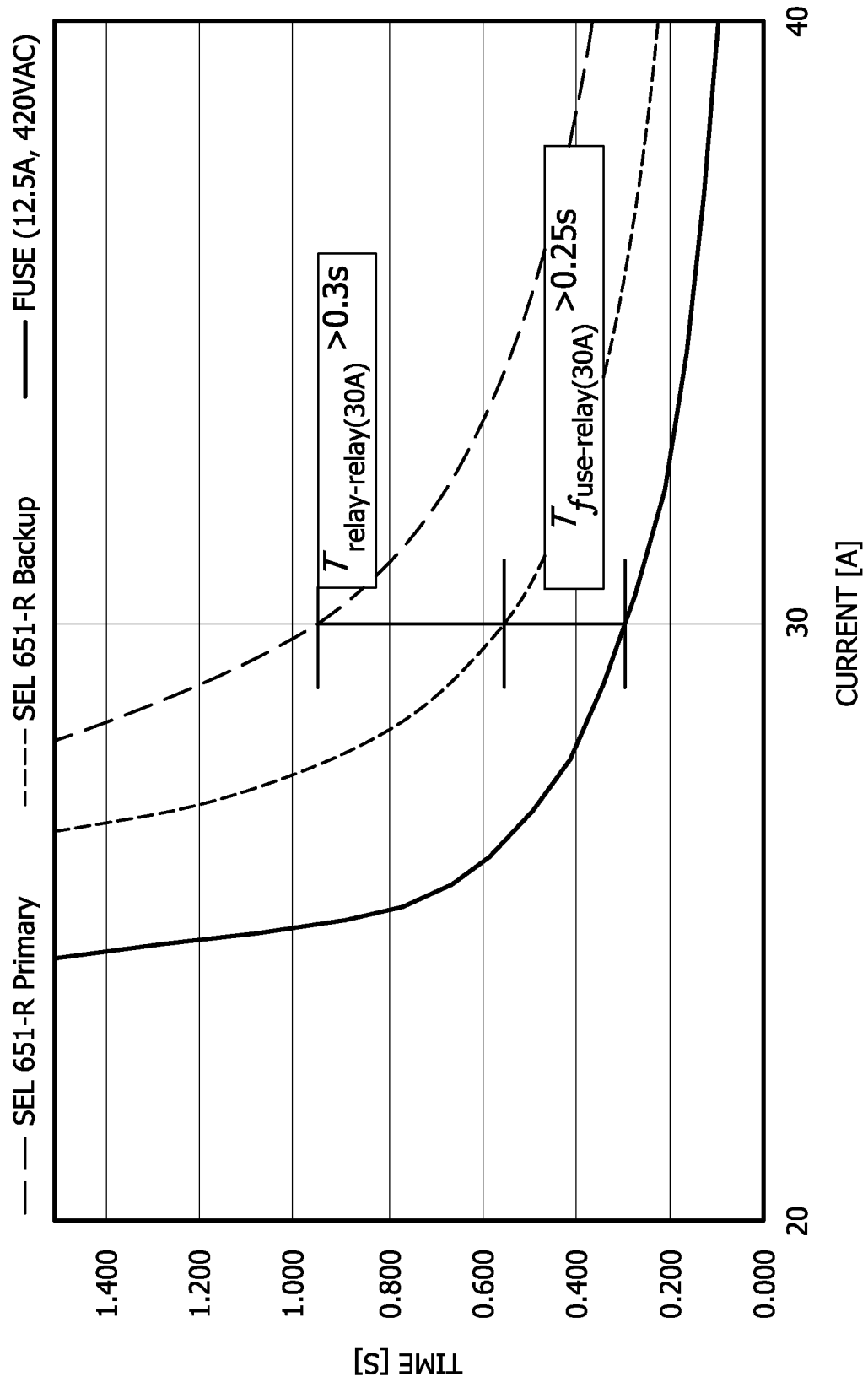
FIG. 15 provides a graph showing time current curves (TCC) for a 12.5 A fuse. Load 10 A, fuse overrated 25% as typical for protection. SEL 651R used as primary and backup relay. Primary and backup relay use u5 curves. CT ratio=50.

To maintain coordination, the grading time is greater than 0.25 seconds. Referring again to FIG. 14, control contributions of the disclosed technologies allow the inverter to maintain stability when the core of the grid filter saturates. The disclosed control adjusts the proportional and integral gains based on the available inductance of the grid filter. The Butterworth polynomial is adopted to optimize the closed loop eigenvalue locations. FIG. 15 also includes decoupling terms for the current control required to decouple the d-axis and q-axis channels considering the saturation of nonlinear inductive grid filters. A resonant controller was used to control the negative sequence currents present during line-to-line (LL) and line-to-ground (LG) faults.

Power Losses in Three-Level Inverter

Figure 16A:
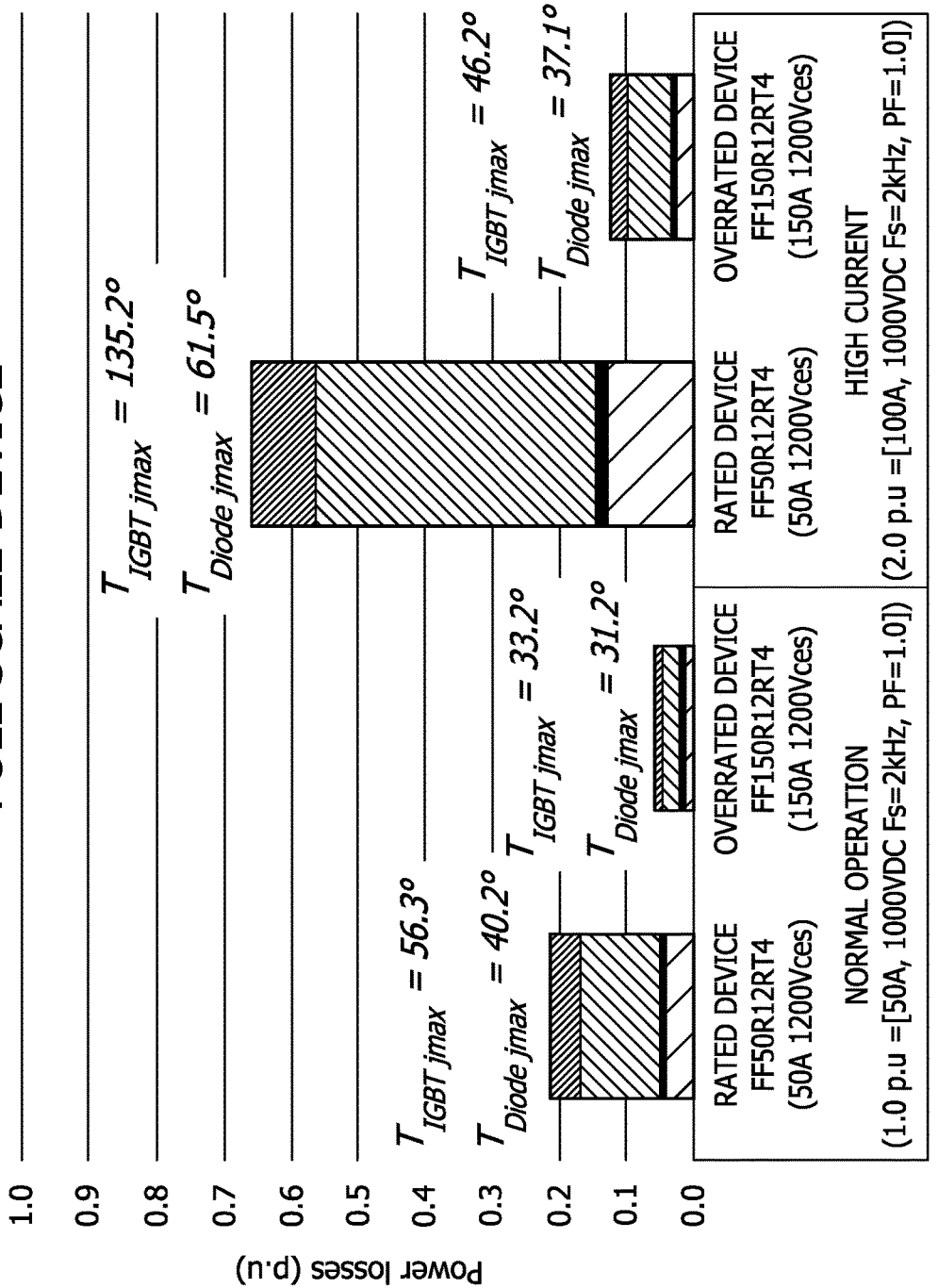
FIGS. 16A-16B (collectively referred to herein as "FIG. 16") provides graphs showing a hardware prototype power losses comparison for a rated device and an overrated device.
Figure 16B:
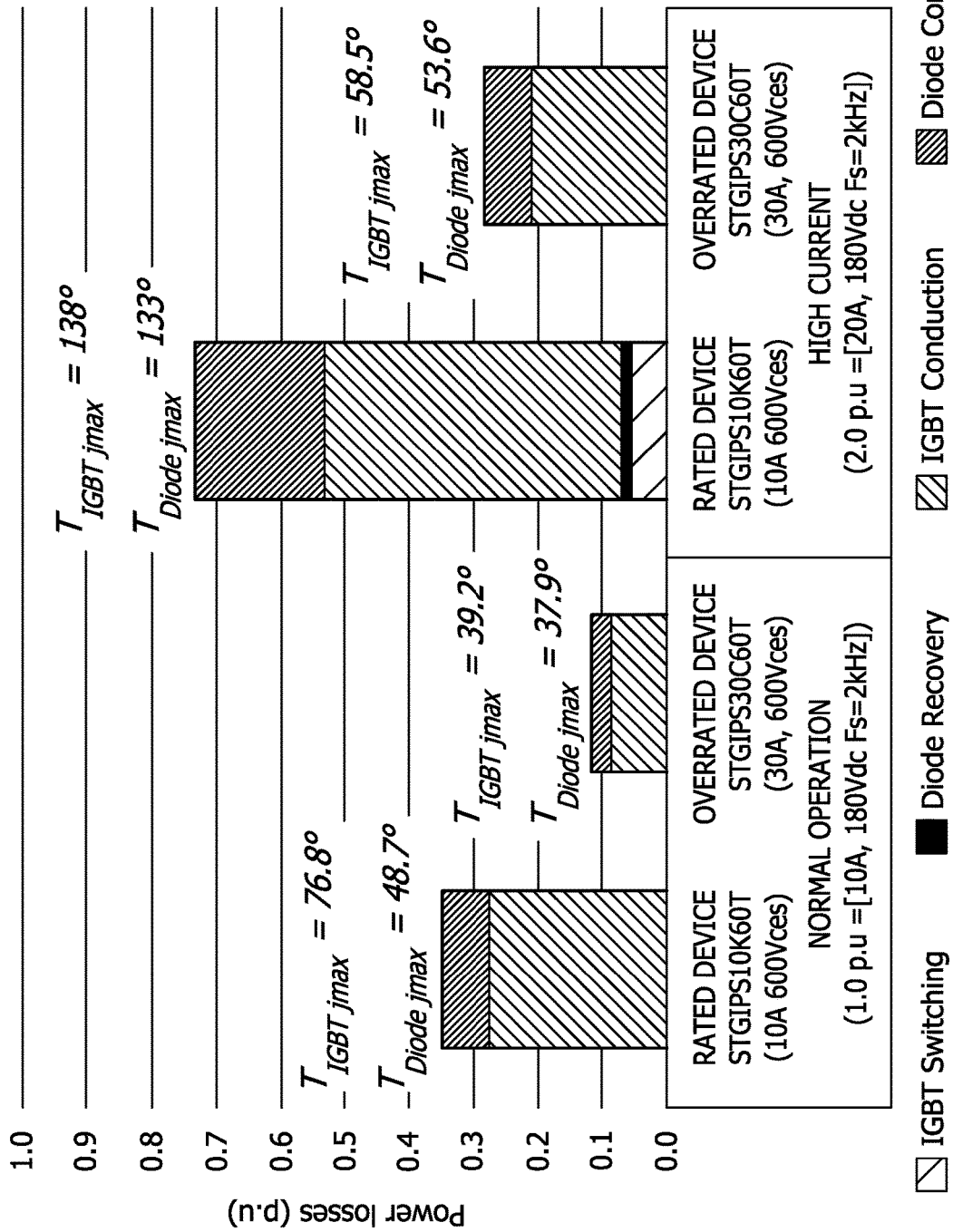

FIG. 16 shows the power losses in p.u. for the rated and overrated device for high current operation (2.0 p.u.) and at normal operation (1.0 p.u.). The rated device for the prototype inverter is a 10 A, 600V device, and the overrated device has rating of 30 A, 600V. Both devices come in the same package 25-pin SDIP. As shown, the overrated device has lower switching and conduction losses for both high current and normal operation. The lower losses, combined with the better thermal characteristic of the overrated module, significantly reduces the temperature in the junction for a current of 2.0 p.u. At rated current operation (1.0 p.u.), the overrated device also has lower IGBT and diode junction temperatures. In other words, during normal operation the overrated device improves the efficiency of the inverter and reduces the cooling requirements of the inverter, which is an added benefit of oversizing the semiconductor. To demonstrate the scalability of the disclosed method, the same graph includes a comparison for devices used in larger scale inverters: rated device (50 A, 1200V) and overrated device (150 A, 1200V). Both devices come in the same 34 mm package. Similarly, for these devices, the overrated device runs more efficiently during normal operation and the maximum temperature and losses are lower at high current operation.

Control with Saturable Inductors

The previous section showed that the semiconductor is overrated to remain under the safety margin during high current operation during faults. The grid filter, on the other hand, does not have to be overrated because short duration of the fault condition is not sufficient to damage the copper windings. Although the grid filter can be designed for this overloading current (e.g., 3 p.u.), this will make the filter very bulky and costly. For this reason, the inductor is kept at its rated current to provide a cost-effective solution to increase the fault contribution of inverters. The experimental porotype used for this research kept the saturable inductor rated at 1.0. p.u, (or 10 A), which is the rated capacity of the inverter unit. However, the inductor could be oversized to accommodate the overloaded condition, or to prevent very deep saturation.

Nonlinear Inductor Modelling

At currents higher than the rated current, the core of the inductive grid filter saturates, which introduces nonlinearities that must be accounted for in the vector control for stable operation. From a control design point of view, the nominal inductance is one of the most important specifications because it determines the poles of the system. This section will show that neglecting the inductor saturation in the vector control will introduce severe oscillation in the inverter currents during faults where the inverter operates at high currents.

Mathematical equation (26) describes the nonlinear inductor in a polynomial form. i is the instantaneous current flowing through the inductor (i=I sin ωt+δ). $L_o$ is the inductance at zero current. Ln is a constant term that can be adjusted to fit the saturation characteristics of the inductor.

$$L_S = L_o + L_2 i^2 + L_4 i^4 \quad (26)$$

Figure 17:
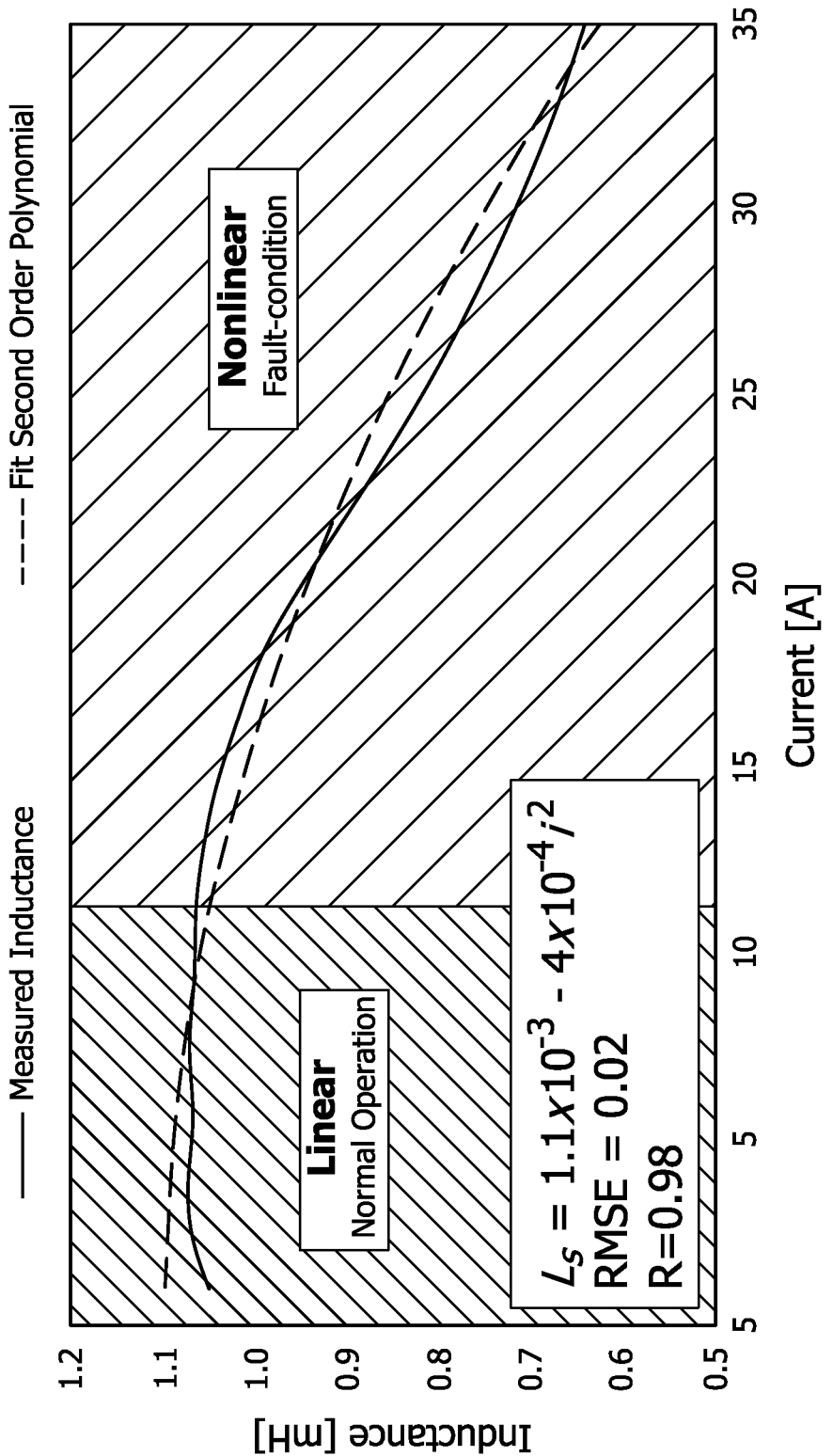
FIG. 17 provides a graph showing experimental characteristics of the nonlinear inductor characterized at room temperature using a power choke tester.

FIG. 17 provides a graph showing experimental inductance-current characteristics of the nonlinear inductor used herein. The inductor is characterized at room temperature using a DPG10 power choke tester. As shown FIG. 17, as the current increases the core saturates, decreasing its inductance. The inductance of the ferrite core decreases until it reaches 0.6 mH at 35 A, which is a reduction of about 45% of the initial inductance of 1.1 mH. For validating the fit equation, the even, second-order polynomial is used for the ferrite core. The parameter of the even order polynomial $L_o$, $L_2$ were specified to fit the measurements presented in FIG. 17. For the ferrite core, the estimated values are: $L_o$=1.1 mH and $L_2$=0.4 mH. With using only a second order polynomial and these values in mathematical equation (1), a good fit was found with a root-mean-square error (RMSE) of 0.02.

Control Stability Analysis with Saturable Inductors

Figure 18:
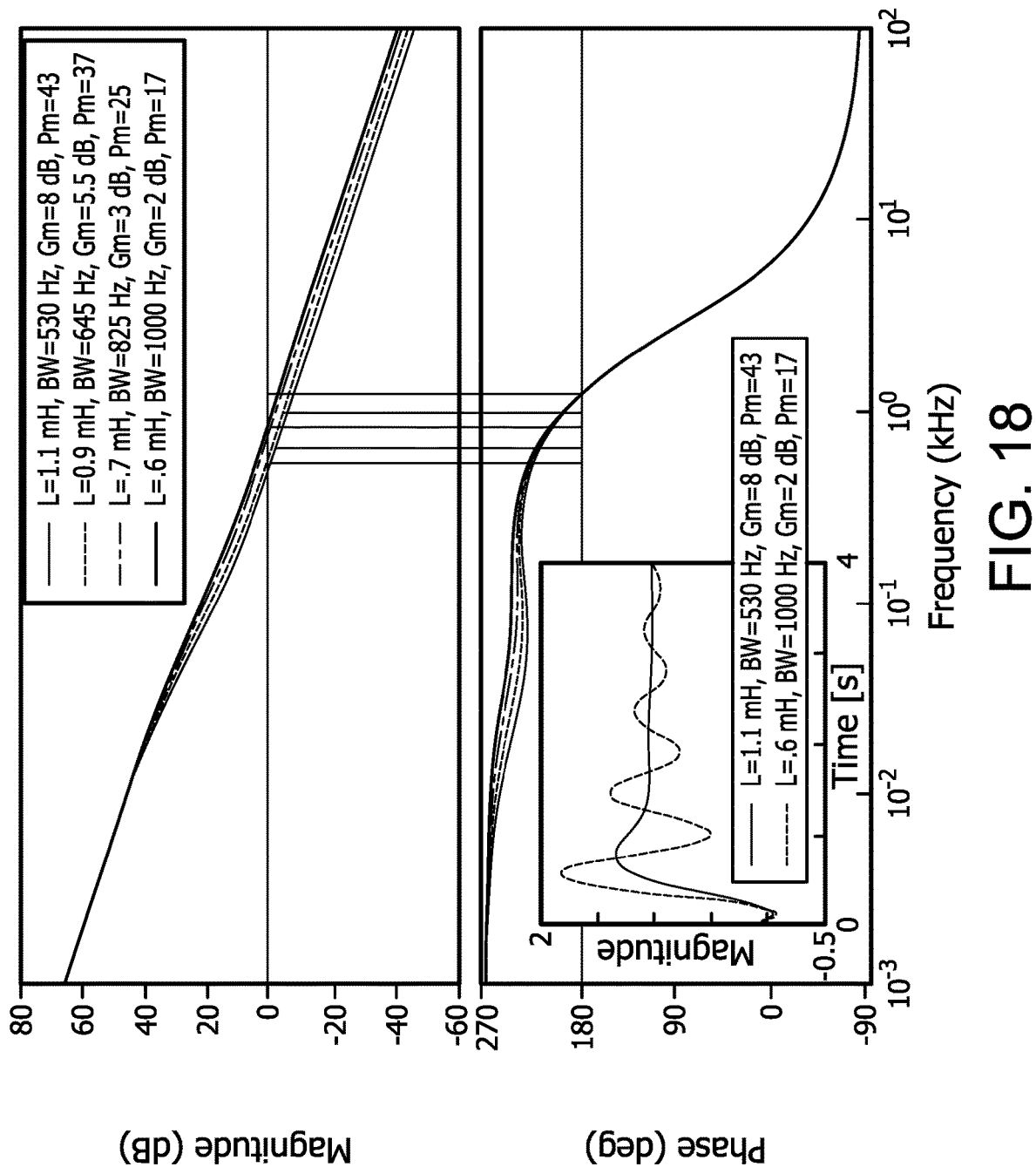
FIG. 18 provides a Bode plot for different inductance values due to core saturation effect of the ferrite core. PI controller gains fixed, traditional vector control (Kp=0.8, Ki=7.6). Notice that stability margins such as the gain margin (GM) and phase margin are reduced due to the reduced inductance and the fixed PI gains.

This section studies the stability of the current control considering the core saturation of the ferrite core. FIG. 18 provides a graph showing a Bode plot for different inductance values due to core saturation effect of the ferrite core. The Bode plot includes the crossover frequency, gain and phase margin of the open loop transfer function.

For this initial analysis, the PI gains are kept constant to reveal the effects of not retuning the controller gains when the inverter operates at high-current causing the grid filter inductors to saturate. The time delay was captured by a first order Padé approximation and set as 200 us to account for the delays of the analog to digital converter (ADC) input, the digital output card, and the FPGA processing time. FIG. 18 shows important information regarding the stability of the current control. As the inductance decreases due to the core saturation, the crossover frequency increases, and because the PI gains are fixed, increasing the bandwidth reduces both the phase and gain margin of the open loop transfer function. The step response, plotted in FIG. 18, shows that the decreased stability margins generate undamped oscillations as the current through the inductor increases. The experimental result section shows that these oscillations would produce severe instabilities during fault conditions.

Design Considering Nonlinear Inductor in the Dq Reference Frame

A small signal model of the three-phase inverter is derived considering the nonlinearities of the inductor. The flux linkage λ in a three-phase converter can be described as mathematical equation (27).

$$\lambda_{abc} = L_{abc} i_{abc} \quad (27)$$

The current controller for the three-phase inverter is implemented in the synchronous reference frame. Then, the inductor matrix in abc-frame needs to be transferred to the dqo-frame. By replacing the inductance estimated by mathematical equation (26) and mathematical equation (27), mathematical equation (28) is obtained.

$$\lambda_{abc} = \begin{bmatrix} L_o + \sum_{n=1}^{\infty} L_{2n} i_a^{2n} & 0 & 0 \\ 0 & L_o + \sum_{n=1}^{\infty} L_{2n} i_a^{2n} & 0 \\ 0 & 0 & L_o + \sum_{n=1}^{\infty} L_{2n} i_a^{2n} i_c^4 \end{bmatrix} \quad (28)$$

where $i_a = I\sin(\theta)$, $i_b = I\sin(\theta - 2/3\pi)$ and $i_c = I\sin(\theta + 2/3\pi)$.

The elements of the abc-frame inductor matrix in mathematical equation (28) are nonlinear and relate to the instantaneous current flowing through the inductor. To linearize the equations, the following assumptions are made. The first assumption is that the three-phase current is balanced without a zero-sequence component. The second assumption is that the currents only contain positive sequence fundamental frequency components. The flux linkage can be expressed in the synchronous reference frame as mathematical equation (29).

$$\lambda_{dq} = T_{abc|dq} L_{abc} T_{dq|abc} i_{dq} \quad (29)$$

Solving mathematical equation (29) for a fourth-order polynomial, the flux linkage equations are given by mathematical equations (30) and (31).

$$\lambda_d = i_d \left( Lo + 3\frac{L_2 I^2}{4} + 5\frac{L_4 I^4}{8} + I^4 L_4 \cos\frac{6\omega t}{16} \right) + i_q I^4 L_4 \sin(6\omega t)/16 \quad (30)$$

-continued $$\lambda_q = i_q\left(Lo + \frac{L_2I^2}{4} + \frac{L_4I^4}{8} - I^4L_4\cos\frac{6\omega t}{16}\right) - i_d I^4 L_4 \sin(6\omega t)/16 \quad (31)$$

Mathematical equations (30) and (31) are nonlinear coupling terms between the direct and quadrature axis. However, these terms can be linearized on the known current operating point current since the magnitude of the cross-coupling terms are very small comparing with the DC equivalent inductance. With this approximation, the flux linkage equations are given by mathematical equations (32) and (33).

$$\lambda_d = i_d\left(Lo + 3\frac{L_2I^2}{4} + 5\frac{L_4I^4}{8} + I^4L_4\cos\frac{6\omega t}{16}\right) \quad (32)$$

$$\lambda_q = i_q\left(Lo + \frac{L_2I^2}{4} + \frac{L_4I^4}{8} - I^4L_4\cos\frac{6\omega t}{16}\right) \quad (33)$$

The equivalent flux linkage can be further simplified by adopting a second-order polynomial. The second order polynomial also provides a very good approximation as was shown in FIG. 17.

$$\lambda_d = i_d(L_0 + 3*L_2I^2/4) \quad (34)$$

$$\lambda_q = i_q(L_0 + 3*L_2I^2/4) \quad (35)$$

These equations show that there are no coupling terms between the direct and quadrature axis components. The equivalent d-axis inductance is only related to $3L_2I^2/4+L_o$ and the q-axis equivalent inductance to $L_o+L_2I^2/4$. The next section applies this approximated inductance in the dq synchronous reverence control of a three-phase power converter.

Small Signal Modelling of Inverter Considering Inductor Saturation

This section derives the small signal model of the inverter of FIG. 4, which consider the saturation of the grid filter inductors. The mathematical equations of the three-phase inverter with connection to the grid, with the average state model and the external elements of the circuit are given by equations (36) and (37).

$$\begin{bmatrix} v_a \\ v_b \\ v_c \end{bmatrix} = L\frac{d}{dt}\begin{bmatrix} i_a \\ i_b \\ i_c \end{bmatrix} + R\begin{bmatrix} i_a \\ i_b \\ i_c \end{bmatrix} + \begin{bmatrix} d_a \\ d_b \\ d_c \end{bmatrix}v_{dc} - \begin{bmatrix} v_N \\ v_N \\ v_N \end{bmatrix} \quad (36)$$

$$\frac{d}{dt}v_{dc} = \frac{1}{C}(I_{DCBATT} - I_{DCf}) \quad (37)$$

The inductor voltage is related to flux linkage for a three-phase inductor as:

$$\vec{v}_{abc} = \frac{d}{dt}\vec{\lambda}_{abc} = L\frac{d}{dt}\vec{i}_{abc} \quad (38)$$

Based on the circuit of FIG. 4, the following mathematical equation (39) can be written.

$$L\frac{d}{dt}\vec{i}_{abc} = \frac{d}{dt}\vec{\lambda}_{abc} = \vec{v}_{abc} - r\vec{i}_{abc} - \vec{d}_{abc}v_{dc} + \vec{v}_N \quad (39)$$

Assuming a perfect balanced system, the zero sequence can be neglected.

$$\begin{bmatrix} 0 & -\omega \\ \omega & 0 \end{bmatrix}\vec{\lambda}_{dq} + \frac{d}{dt}\vec{\lambda}_{dq} = v_{dq} - r\vec{i}_{dq} - \vec{d}_{dq}v_{dc} \quad (40)$$

The current loop transfer function is derived by the small signal model, which applies small variations around the operation point. Considering a second order polynomial for the nonlinear inductor $$\tilde{i}_d = \frac{-\tilde{d}_d V_{dc} + \omega \tilde{i}_q L_q}{(sL_d + r)} \quad (41)$$

$$\tilde{i}_q = \frac{-\tilde{d}_q V_{dc} + \omega \tilde{i}_d L_d}{(sL_q + r)} \quad (42)$$

where the q and d axis inductances are defined as:

$$Ld = Lo + 3\frac{L_2I^2}{4} \quad (43)$$

$$Lq = Lo + \frac{L_2I^2}{4} \quad (44)$$

Figure 5:
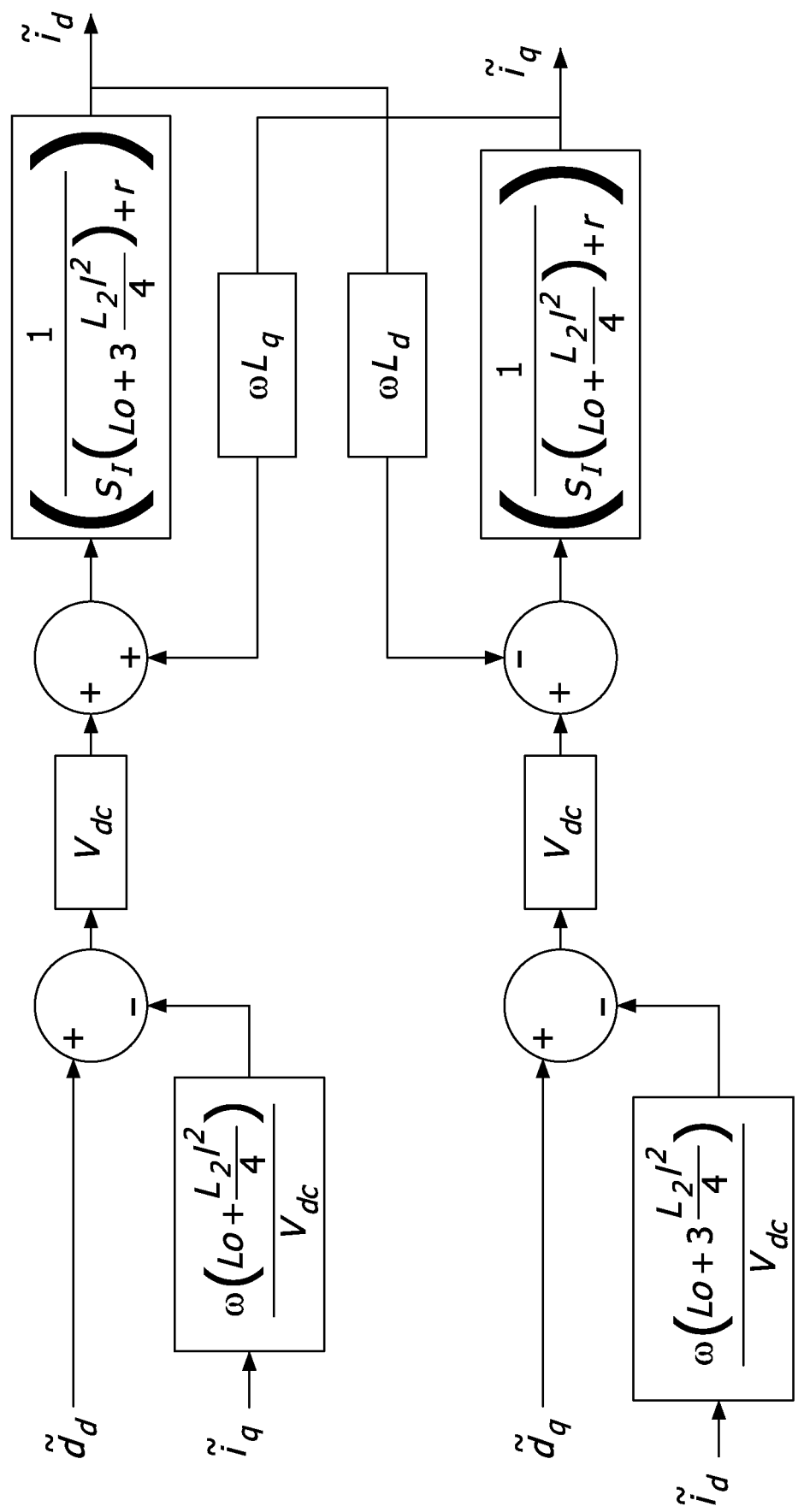
FIG. 5 provides a circuit diagram for a small signal model block diagram with decoupling terms that include the saturation of the grid filter.

Mathematical equations (41) and (42) show that the d and q channels are coupled by the terms $\omega\tilde{i}_q L_q$ and $\omega\tilde{i}_d L_d$. These terms are inconvenient to independently control the d and q channels. A way to simplify this is to introduce decoupling terms. The decoupling terms are shown in FIG. 5 to eliminate the coupling between channels, and this results in a first order transfer function with a pole defined by the point of operation and the passive elements of the grid filter.

Mathematical equations (43) and (44) show the current to duty cycle transfer function considering the effects of the saturation of the grid filter.

$$\frac{\tilde{i}_d}{\tilde{d}_d} = \frac{V_{dc}}{(sL_d + r)} = \frac{V_{dc}}{\left(s\left(Lo + 3\frac{L_2I^2}{4}\right) + r\right)} \quad (45)$$

$$\frac{\tilde{i}_q}{\tilde{d}_q} = \frac{V_{dc}}{(sL_d + r)} = \frac{V_{dc}}{\left(s\left(Lo + 3\frac{L_2I^2}{4}\right) + r\right)} \quad (46)$$

Control Method Considering Grid Filter Saturation

This section describes the method to calculate the control gains considering the core saturation. The disclosed method includes tuning the integral and proportional gains considering the available inductance in the grid filter. This method first estimates the grid filter inductance for the d-channel and q-channel for the given operating point using mathematical equations (43) and (44). Then, the Butterworth polynomial is adopted to optimize the closed loop eigenvalue locations. This Butterworth polynomial locates the eigenvalues uniformly in the left-half s-plane on a circle with radius $\omega_o$, with its center at the origin. The Butterworth polynomial receives as inputs the inductance value $L_{dq}$, the system delay $\alpha$, and the desired bandwidth for the current controller $\omega$, which is typically 8 to 10 times smaller than the switching frequency. The third order Butterworth polynomial can be expressed as mathematical equation (47).

$$s^3 + (1+2\zeta)\omega s^2 + (1+2\zeta)\omega^2 s + \omega^3 \quad (47)$$

where $w_o$ is the bandwidth of the current controller (which is set ten times lower than the switching frequency), and $\zeta$ is a constant that influences the damping response. The time delay is captured by a first order Padé approximation, where $\alpha=0.5$ Ts and Ts is the maximum delay time.

$$e^{-s(D)T_s} \approx \frac{1-\alpha s}{1+\alpha s} \quad (48)$$

The open loop transfer function of the current loop can be expressed as:

$$T_{idq} = \beta\left(\frac{1-\alpha s}{1+\alpha s}\right)\left(K_p + \frac{K_i}{s}\right)\left(\frac{V_{dc}}{sL_{dq}+R}\right) \quad (49)$$

$$G_{id} = \frac{(V_{dc}(\alpha-s)*(K_i+K_p s))}{s^3 L_{dq} + s^2 r + s\alpha r - s\beta K_i V_{dc} + s^2 L_{dq}\alpha - s^2\beta K_p V_{dc} + s\beta K_p\alpha V_{dc} + K_i\beta\alpha V_{dc}} \quad (50)$$

where $\beta$ is the gain for the current sensor, $K_p$ the proportional gain, $K_i$ the integral gain, R the inductor resistance and $L_{dq}$ are the d-axis and q-axis inductances defined in mathematical equations (43) and (44). The closed loop transfer function for the current control of mathematical equation (50) is obtained using the current open loop transfer function of equation (49). The controller gains $K_{pi}$ are obtained by comparing the coefficients in the Butterworth polynomial of equation (47) with the denominator of the closed-loop transfer function of equation (50).

$$K_i = \frac{\omega^3 L_{dq}}{\beta\alpha V_{dc}} \quad (51)$$

$$K_p = \frac{\omega^2 L_{dq}(1+2\varsigma) + \beta K_i V_{dc} - \alpha r}{\beta a V_{dc}} \quad (52)$$

Figure 19:
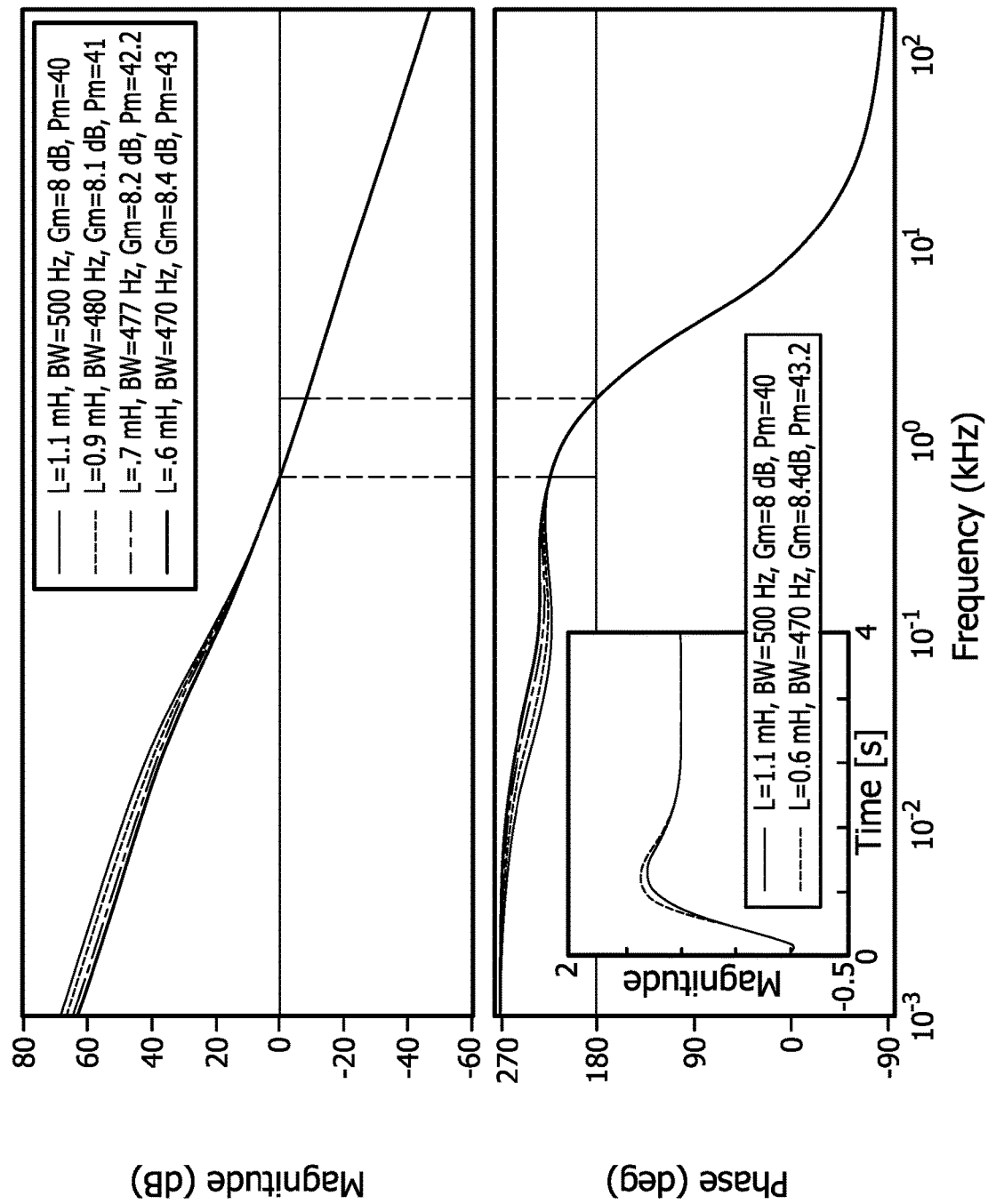
FIG. 19 provides a Bode plot for different inductance values due to core saturation effect of the ferrite core. L=1.0 p.u.=1.3 mH. PI gains calculated using disclosed controller based on the a Butterworth polynomial. Notice stability margins are preserved (GM>8 db and PM>40) by adapting the gains of the PI controller.

FIG. 19 shows the Bode plot of the current open loop transfer function of equation (46).

The constant $\zeta$ in is set to one, and the bandwidth of the controller is set to $\omega=2\pi 600$ rad/s. The Bode plot shows the efficacy of the disclosed technologies, which guarantees the phase margin greater than 40 degrees, the gain margin above 8 dB for the nominal inductance and for the minimum available inductance. Mathematical equations (51) (52) are computationally lightweight and can be easily implemented on a digital processor for an online calculation of the controller gains.

Experimental Results

The experimental results are divided into three sections. The first section describes the limitation of inverters with normal rated semiconductors to provide high short-circuit current. Then, the overrated semiconductor is tested to show that it can safely provide high short circuit current. For this first section the interest in on the hardware. The close-loop control is disabled so that the inverter operates in open loop control. The second section addresses a comparison between the disclosed current closed loop control and a fixed PI controller during fault conditions. In the last section, the disclosed energy storage inverter is used. The fuse-relay coordination was divided in i) a fuse-blowing scheme, ii) a primary backup coordination and iii) a backup relay coordination.

Rated Device Under Three-phase Faults

Figure 20A:
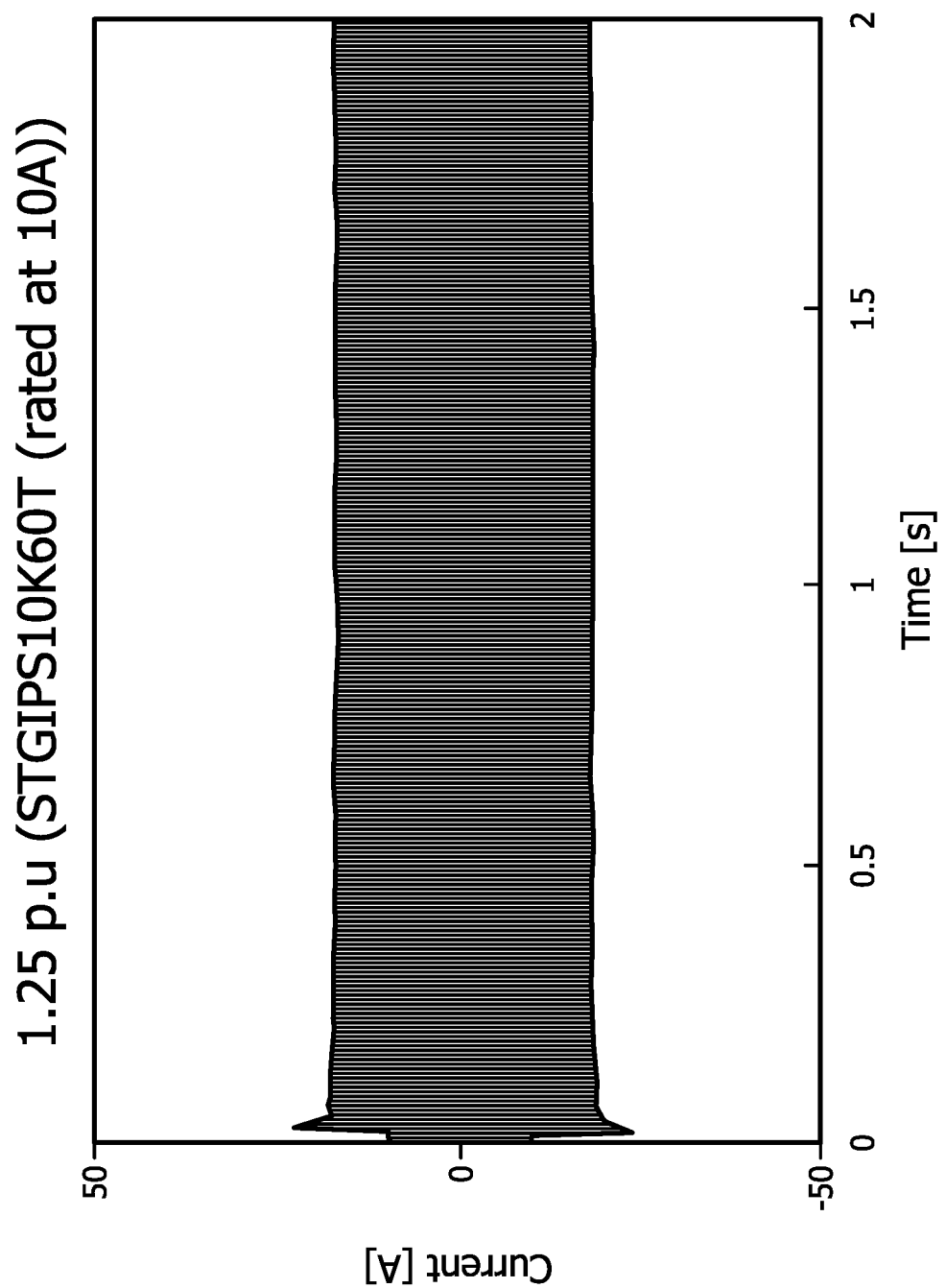
FIGS. 20A-20F (collectively referred to herein as "FIG. 20") provides graphs for experimental results showing inverter currents during three-phase faults. Normally rated device providing the following fault currents: (A) 1.25 p.u., (B) 1.5 p.u., (C) 2.0 p.u., and (D) 3.0 p.u. Overrated device providing the following fault current: (E) 2.5 p.u. and (F) 3.0 p.u.
Figure 20B:
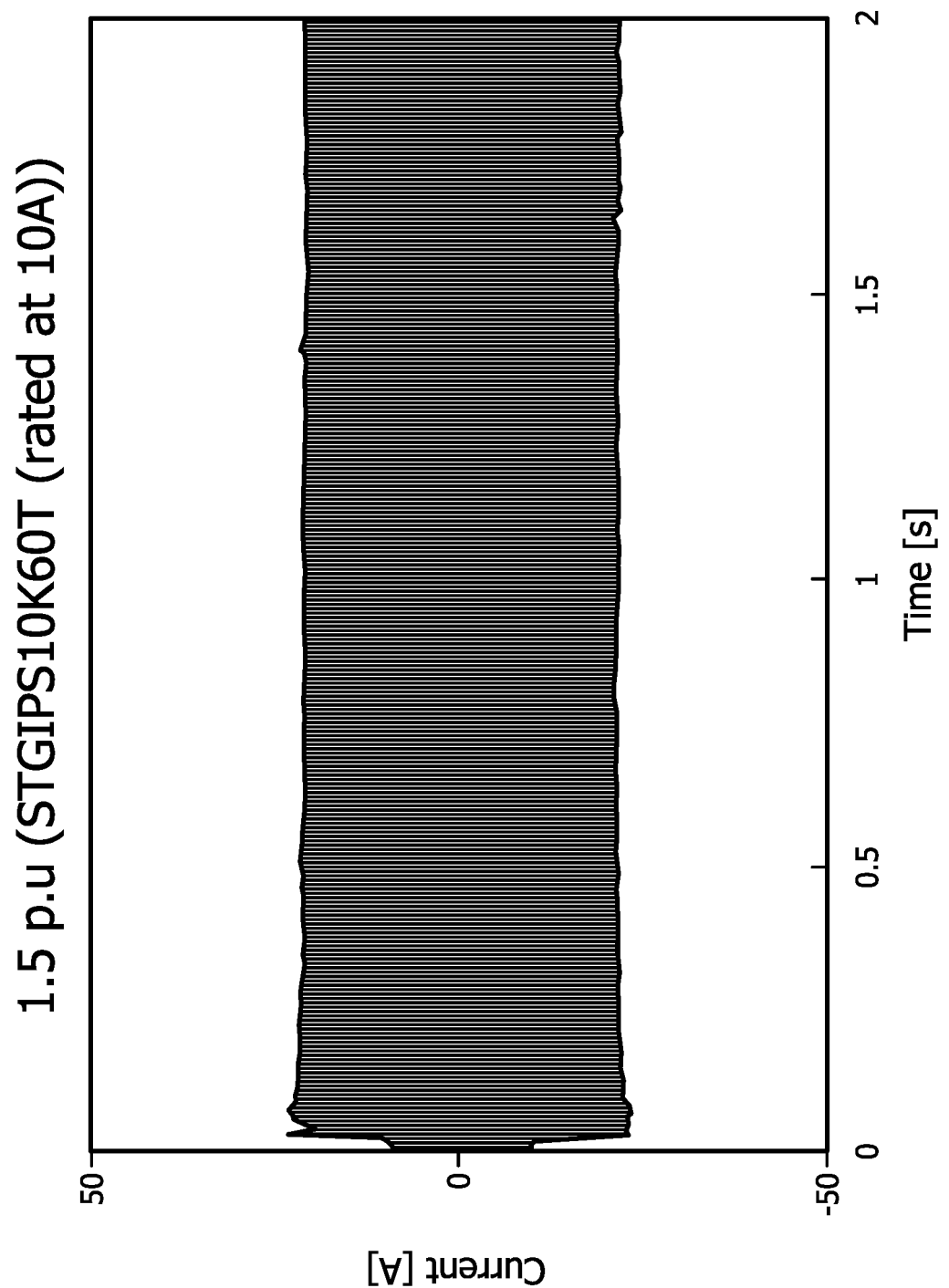
Figure 20C:
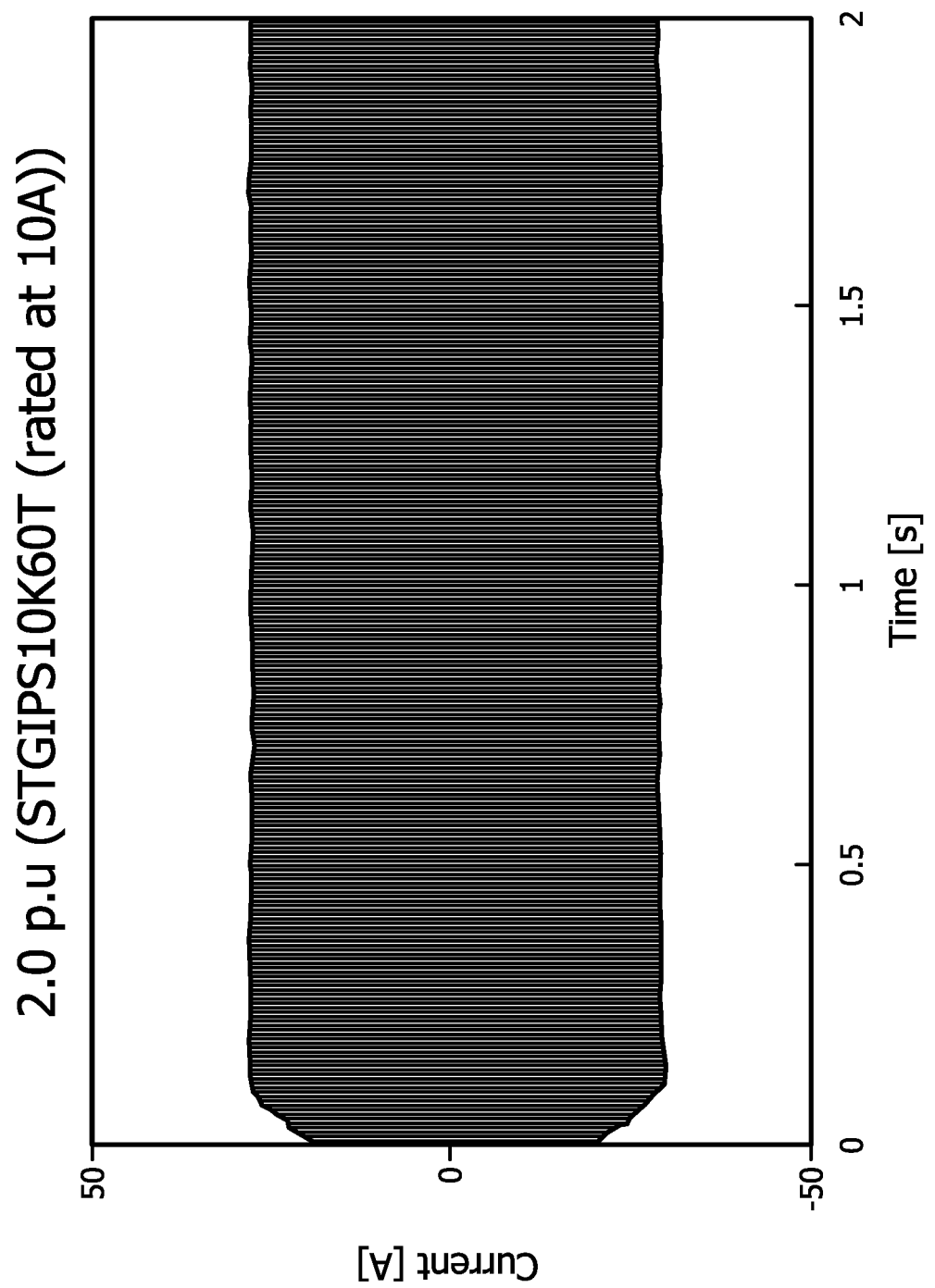
Figure 20D:
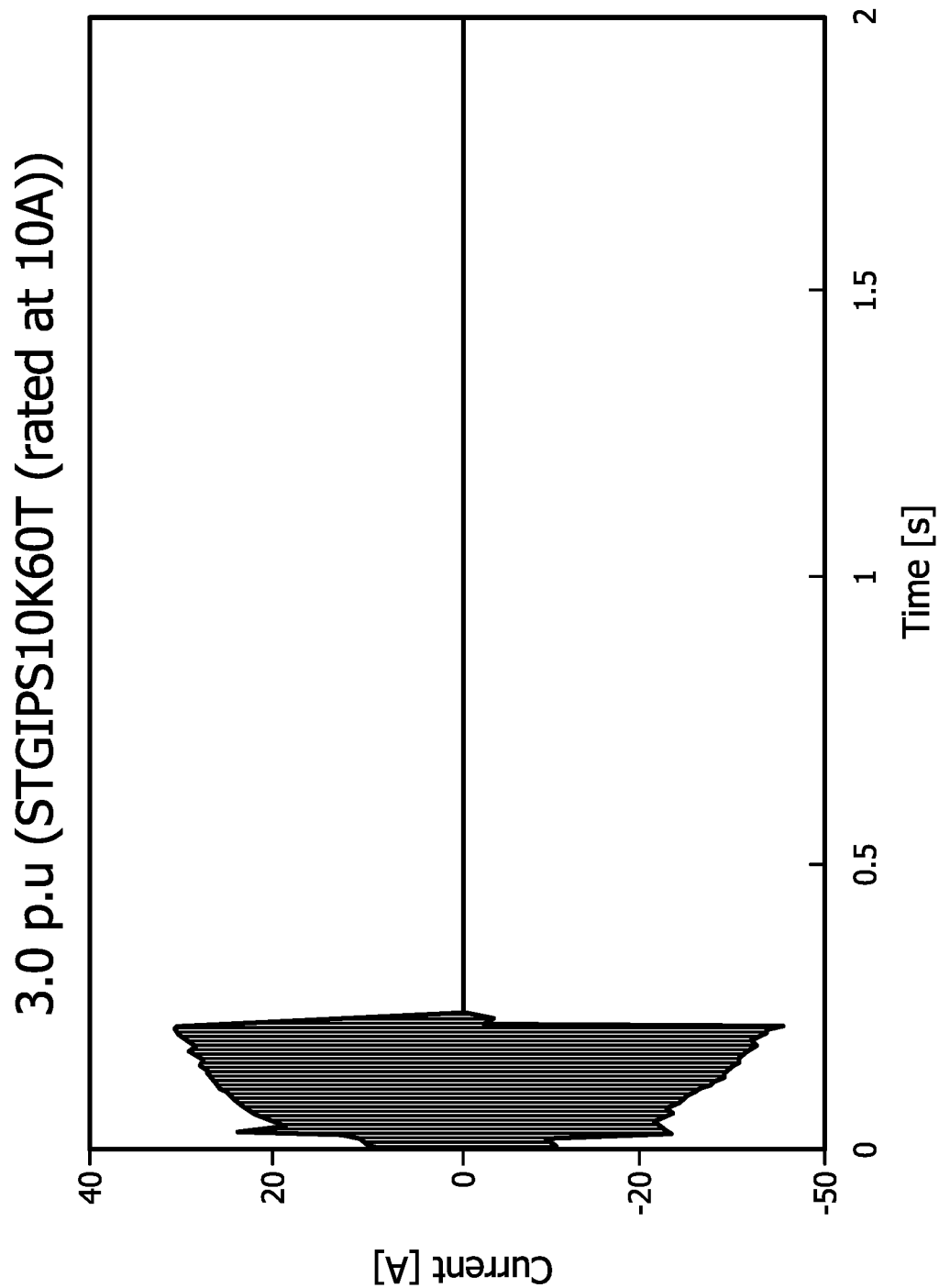
Figure 21A:
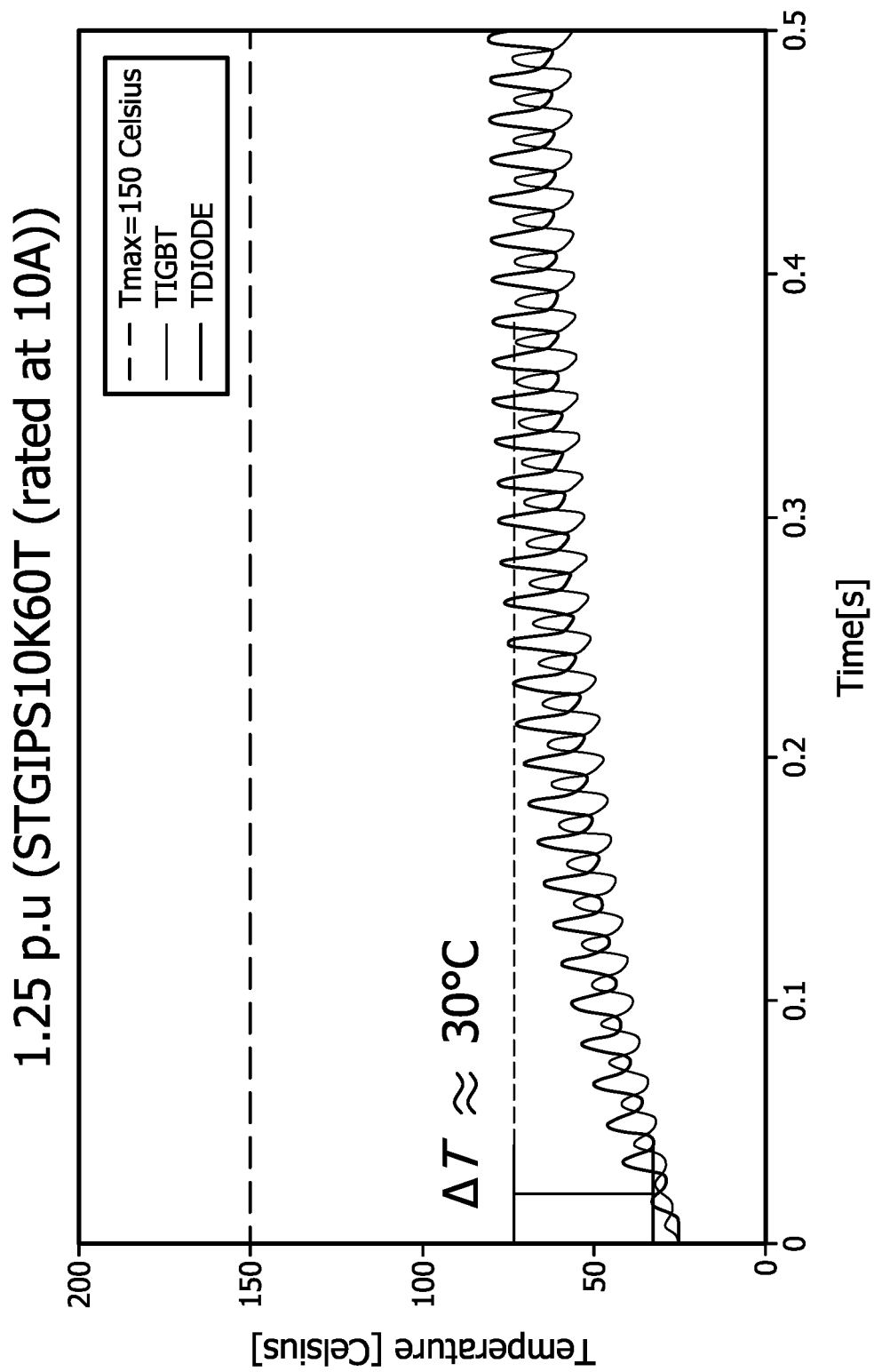
FIGS. 21A-21F (collectively referred to herein as "FIG. 21") provides graphs for simulated temperature response using 4-layer Foster network for the following cases: normally rated device providing the following fault current: (A) 1.25 p.u., (B) 1.5 p.u., (C) 2.0 p.u., (D) 3.0 p.u. Overrated device providing the following fault current: (E) 2.5 p.u. and (F) 3.0 p.u.
Figure 21B:
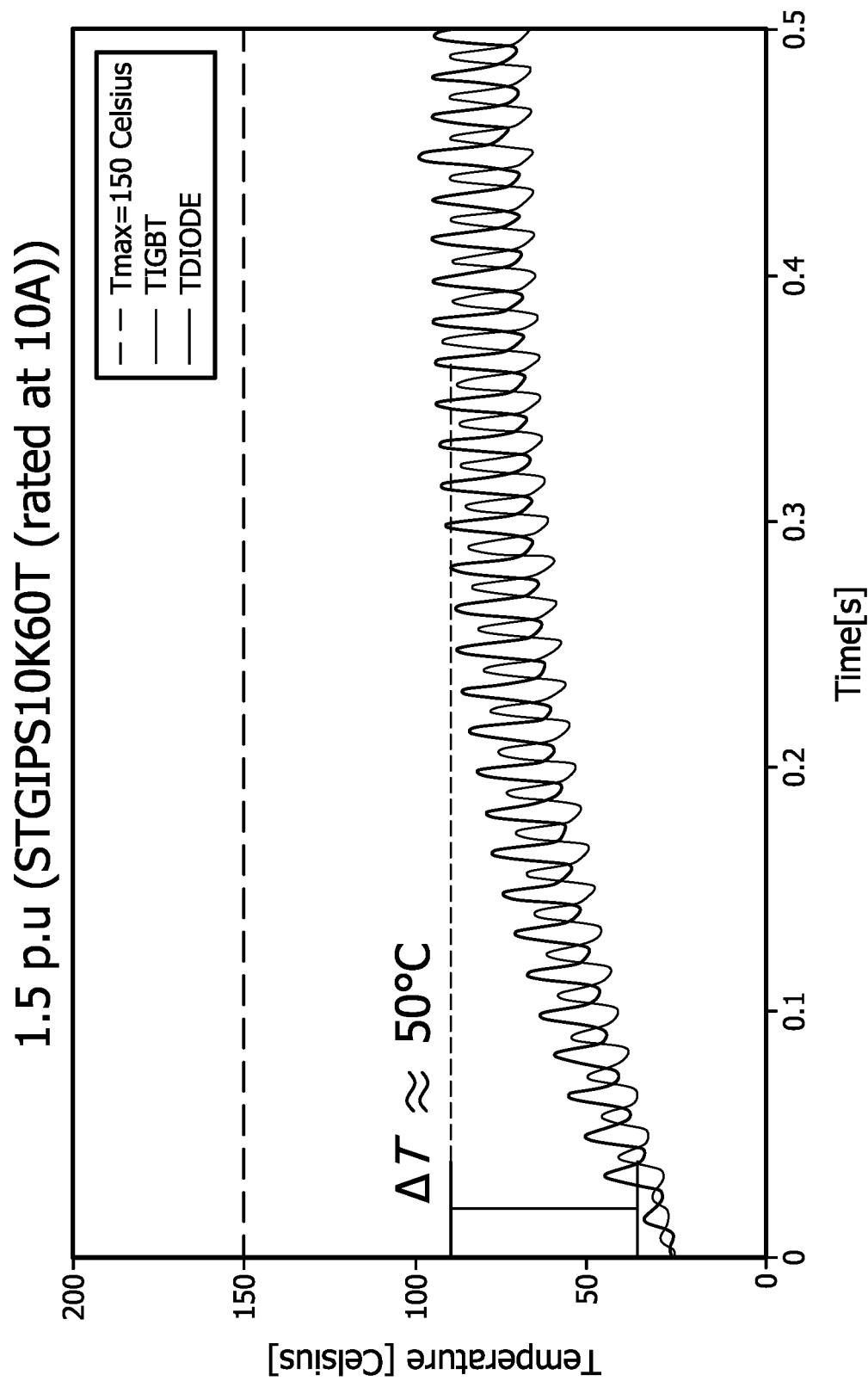
Figure 21C:
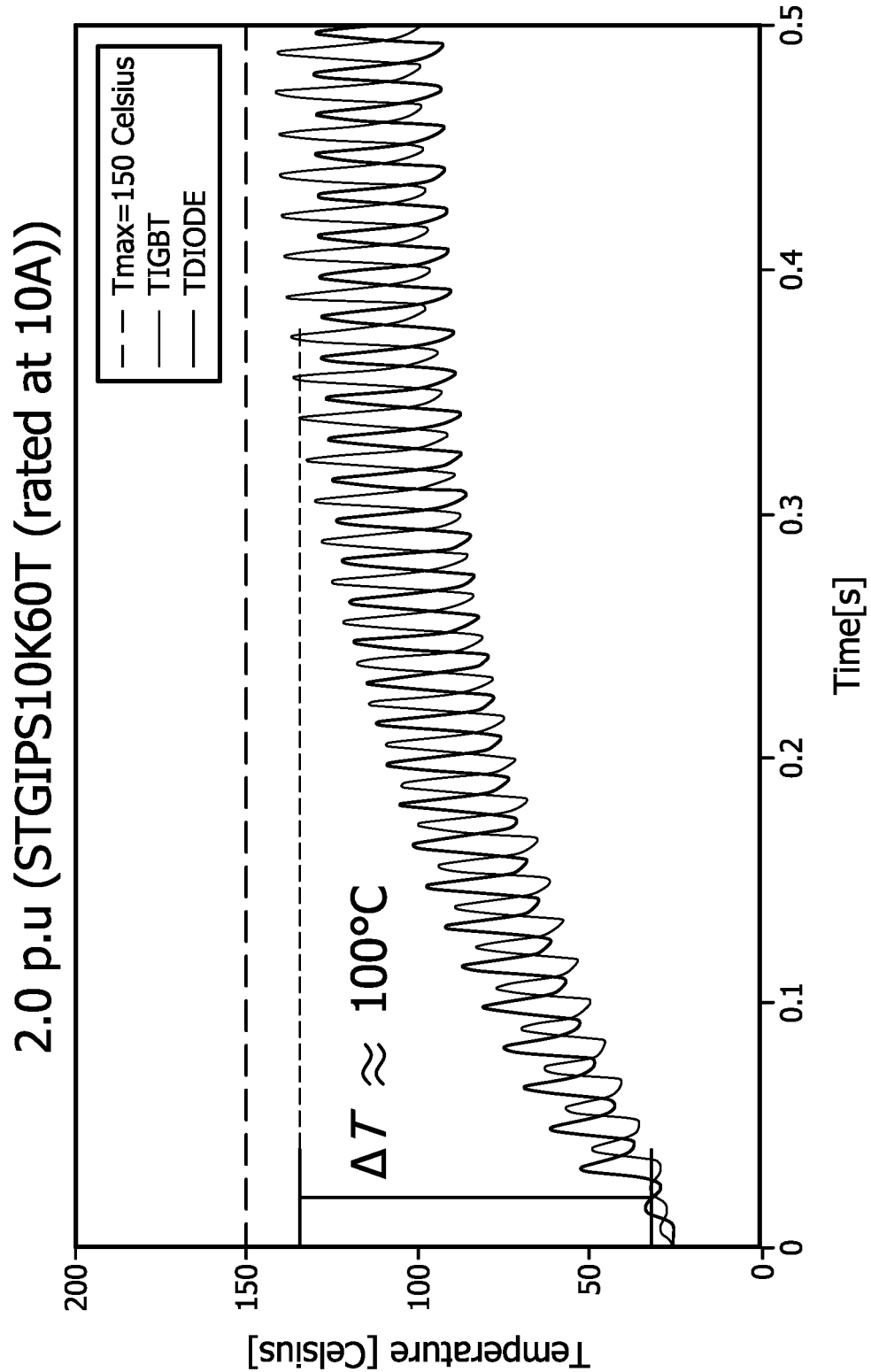
Figure 21D:
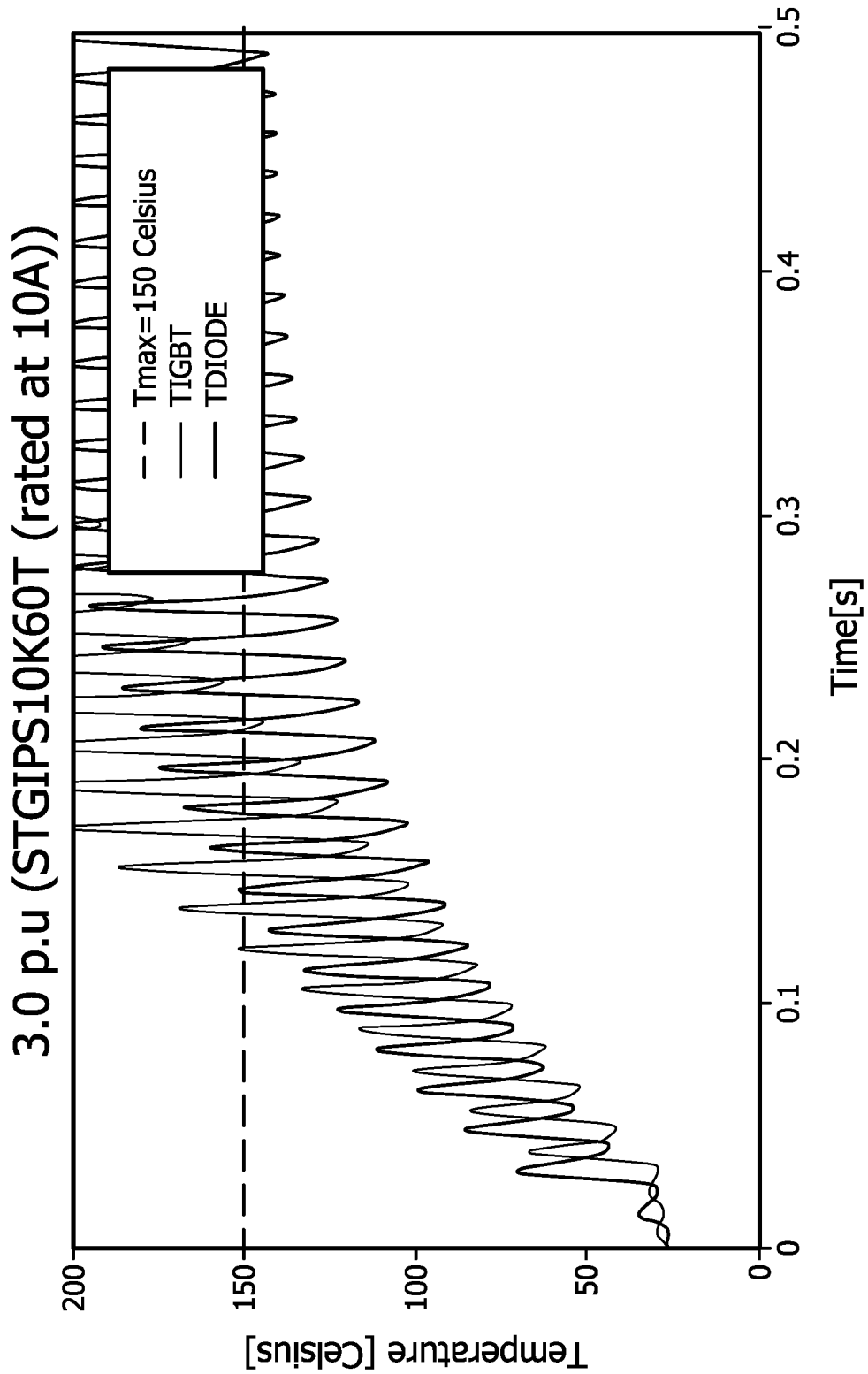

As shown in FIG. 20(a) and FIG. 21(a), the rated device can withstand faults of amplitudes 1.25 p.u., which is typical for PV inverters. For this fault, the increase in temperature in the IGBT junction compared to pre-fault state is small (e.g., $\Delta T=30°$ C.). In other words, this device can provide this fault current even if the device operates at high temperatures. FIG. 20(c) and FIG. 21(c) show that the normal rated device can provide 2.0 p.u. of fault current. However, at this elevated current the temperature swing is 100° C. With this temperature swing, the device would exceed maximum operating temperature (150° C.) if the initial temperature of the junction is greater than 50° C. Finally, the inverter with rated device programmed to provide 3.0 p.u. of fault-current but had a catastrophic failure after 0.25 seconds. FIG. 20(d) and FIG. 21(d) show that the device rapidly surpasses the maximum junction temperature (t=0.15 s) after which the device is permanently damaged.

The tests with the rated device show that it can provide 2.0 p.u. of short-circuit current. However, due to the temperature swing, the initial junction temperature must be close to ambient, which is not a realistic constraint for real applications. To increase the fault contribution of the inverter, the rated semiconductor is replaced with an overrated one than can provide three times the inverter nominal current. As mentioned, the other components, including the grid filter were kept at rated power.

Overrated Device Three-Phase Faults

Figure 20E:
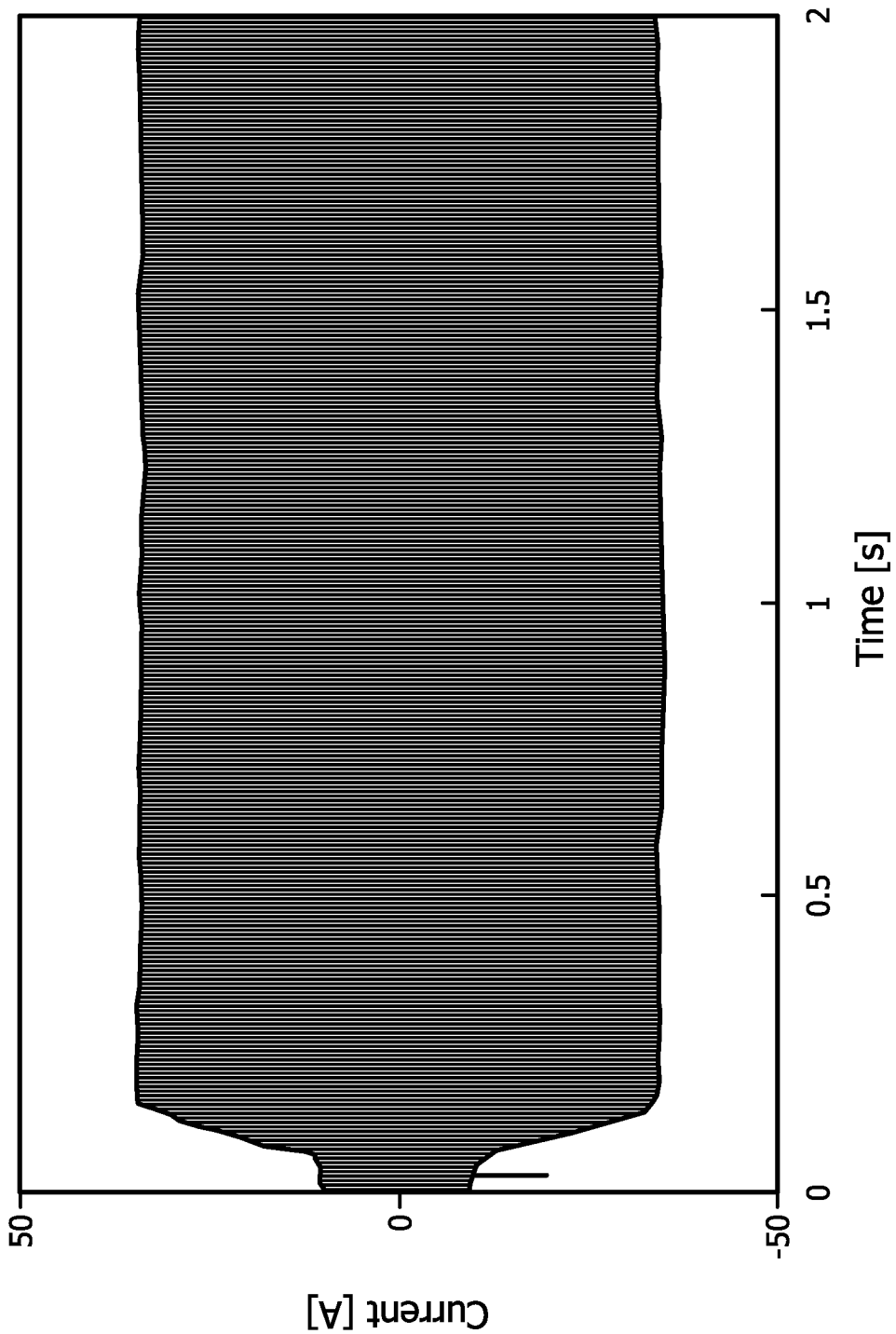
Figure 20F:
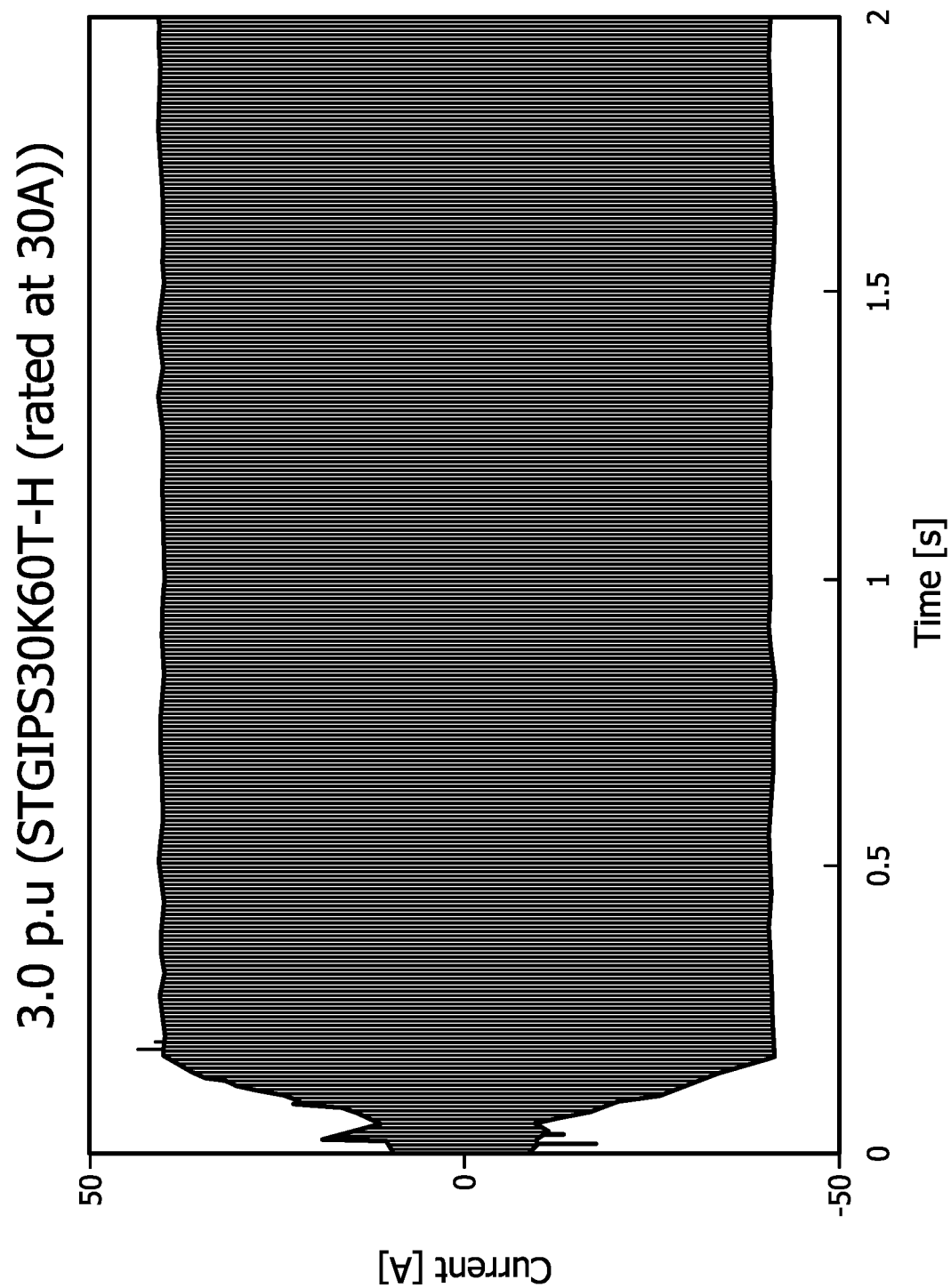
Figure 21E:
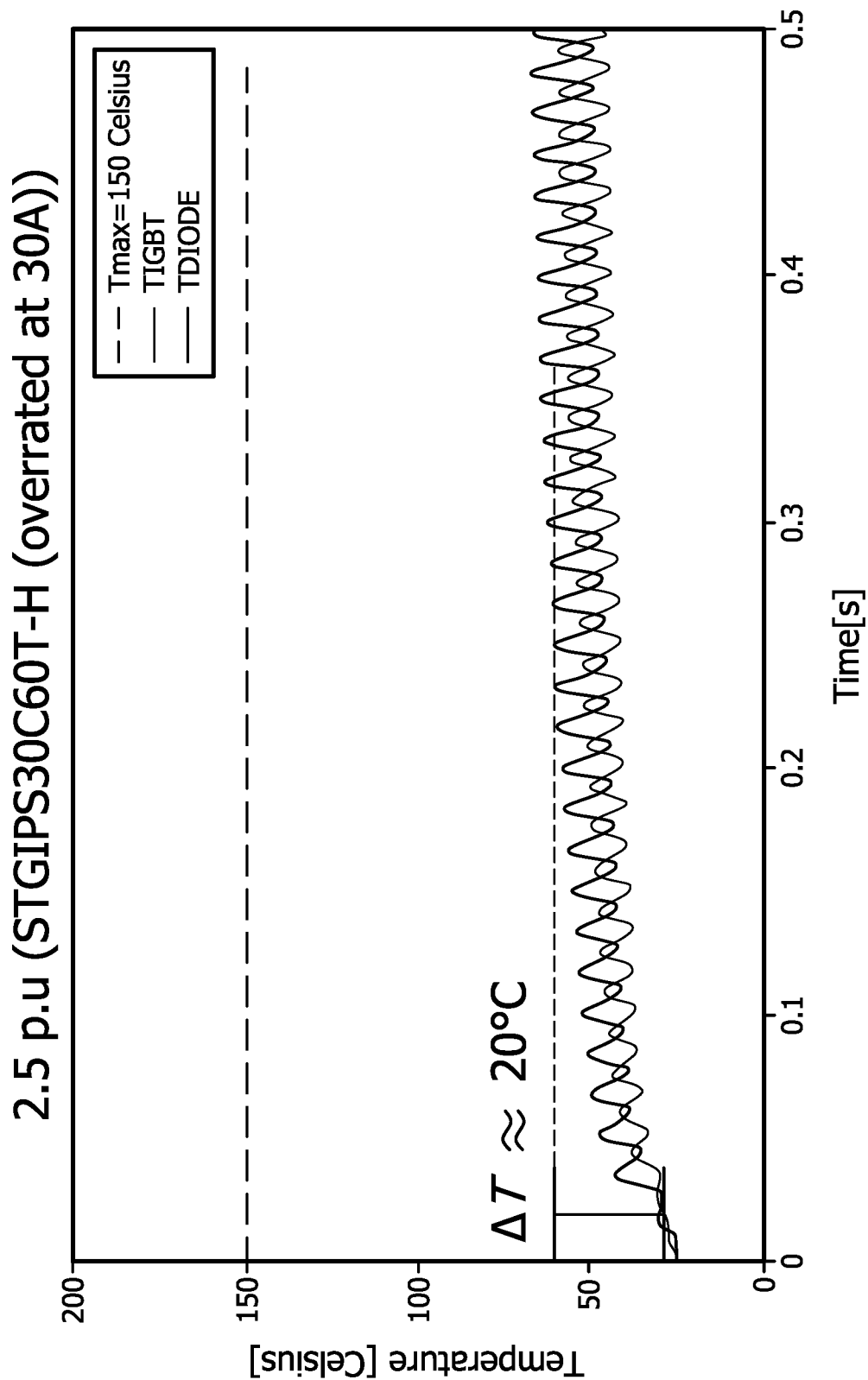
Figure 21F:
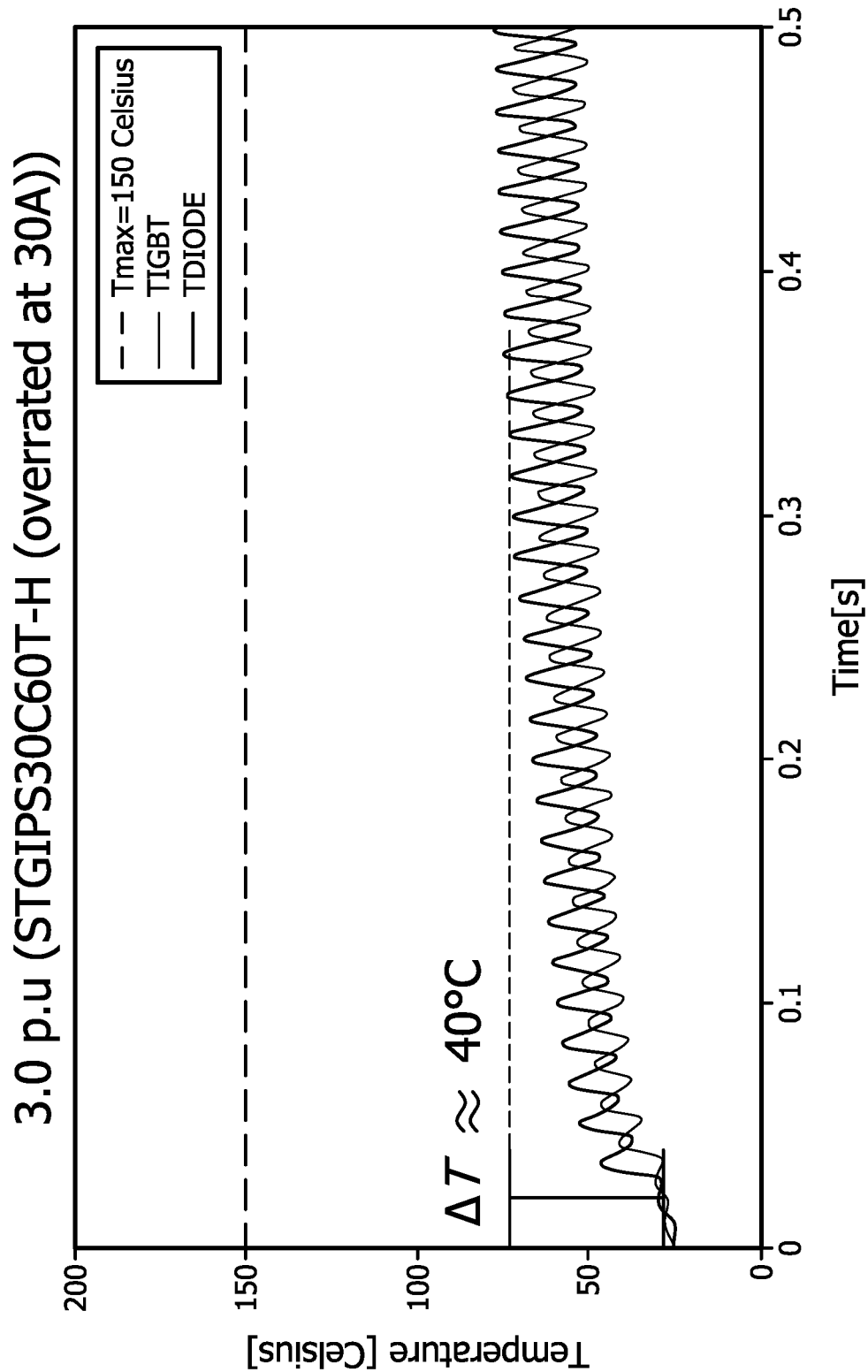

FIGS. 20(e)-(f) show the experimental results with the overrated semiconductor when the inverter provides 2.5 p.u. and 3.0 p.u. of fault current. FIGS. 21(e)-(f) shows the corresponding simulated thermal response. As seen in FIGS. 20-21, the better electrical and thermal characteristics of this device allow it to provide higher fault currents while keeping the device under a safety margin. This overrated device can withstand 2.5 p.u. of fault current with a maximum $\Delta T=20°$ C., and 3.0 p.u. with a maximum $\Delta T=40°$ C. This means that the inverter with the higher current rated semiconductor can provide high fault current even when the initial junction temperature is elevated.

Controller Comparison During Faults

This section presents a comparison between the dynamic response of a three-phase inverter under faults using the disclosed control and a conventional control with fixed gains. This section utilizes the inverter with an overrated semiconductor to provide high current contribution during short-circuit faults, as mentioned, the other components of the inverter remained at rated power.

Fixed PI: Controller During Faults

Figure 22A:
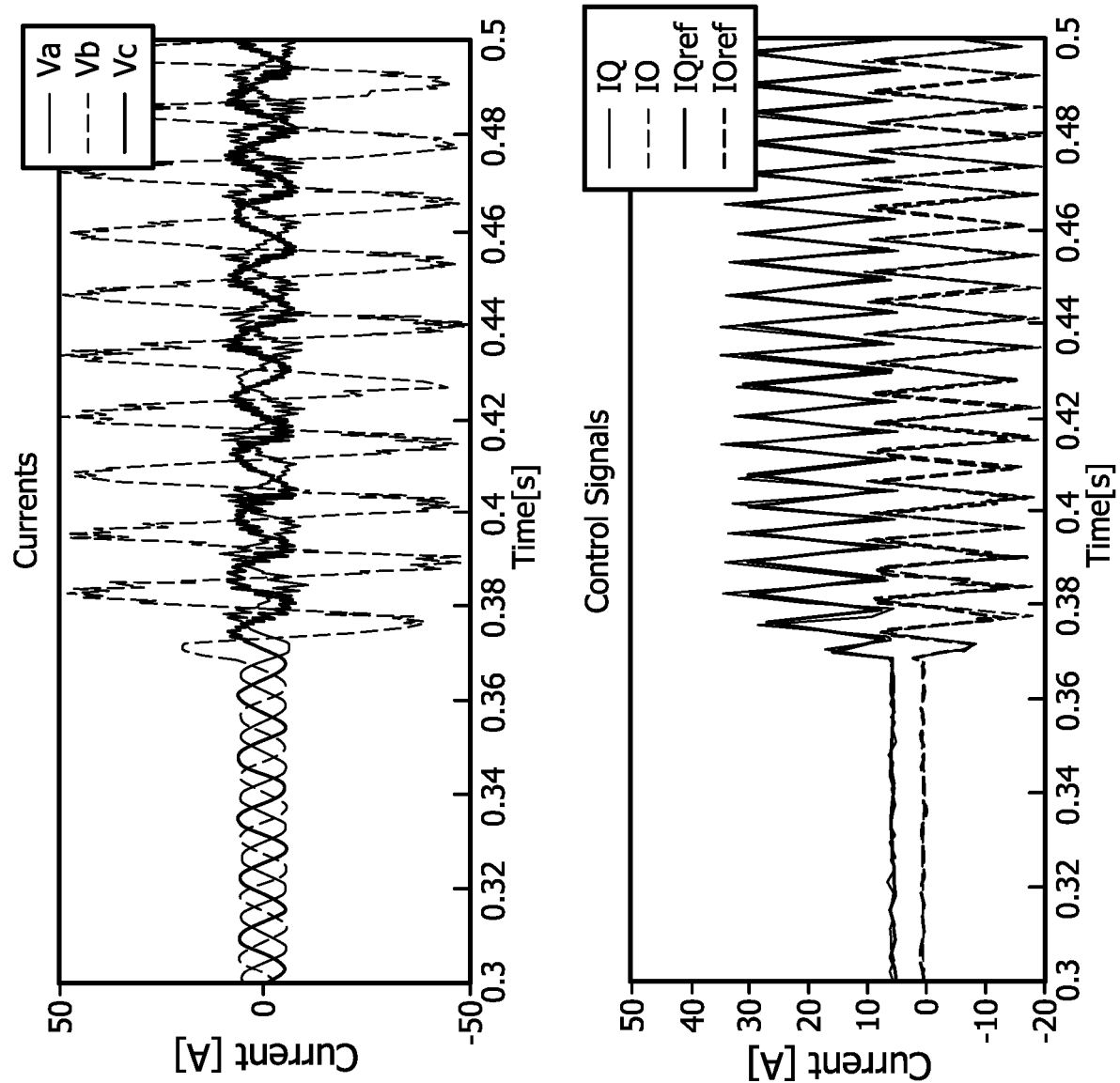
FIGS. 22A-22C (collectively referred to herein as "FIG. 22") provides graphs for experimental results of inverter under faults using conventional controller with fixed PI gains: (A) line to ground faults; (B) line to line faults; and (C) three-phase faults.
Figure 22B:
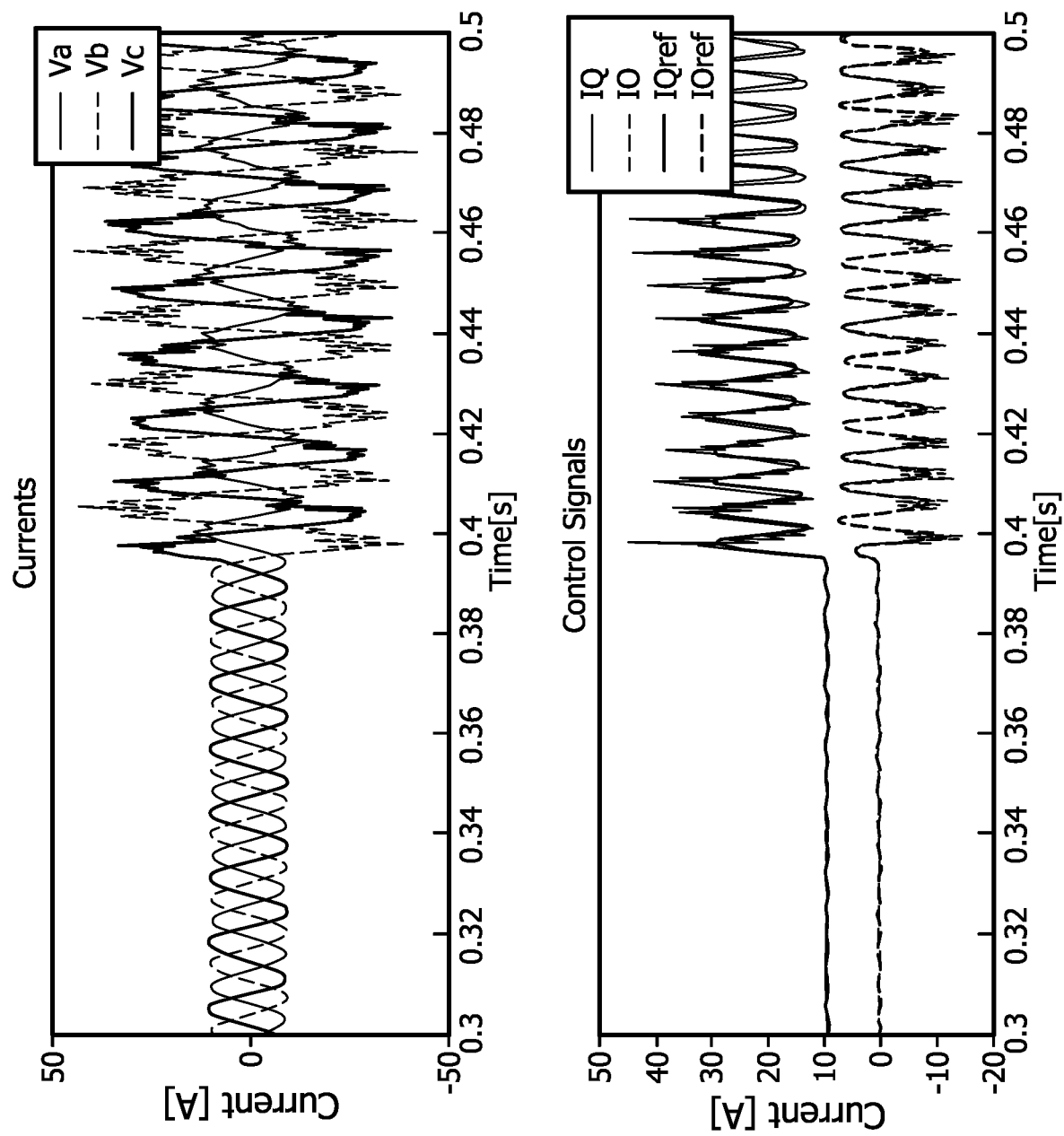
Figure 22C:
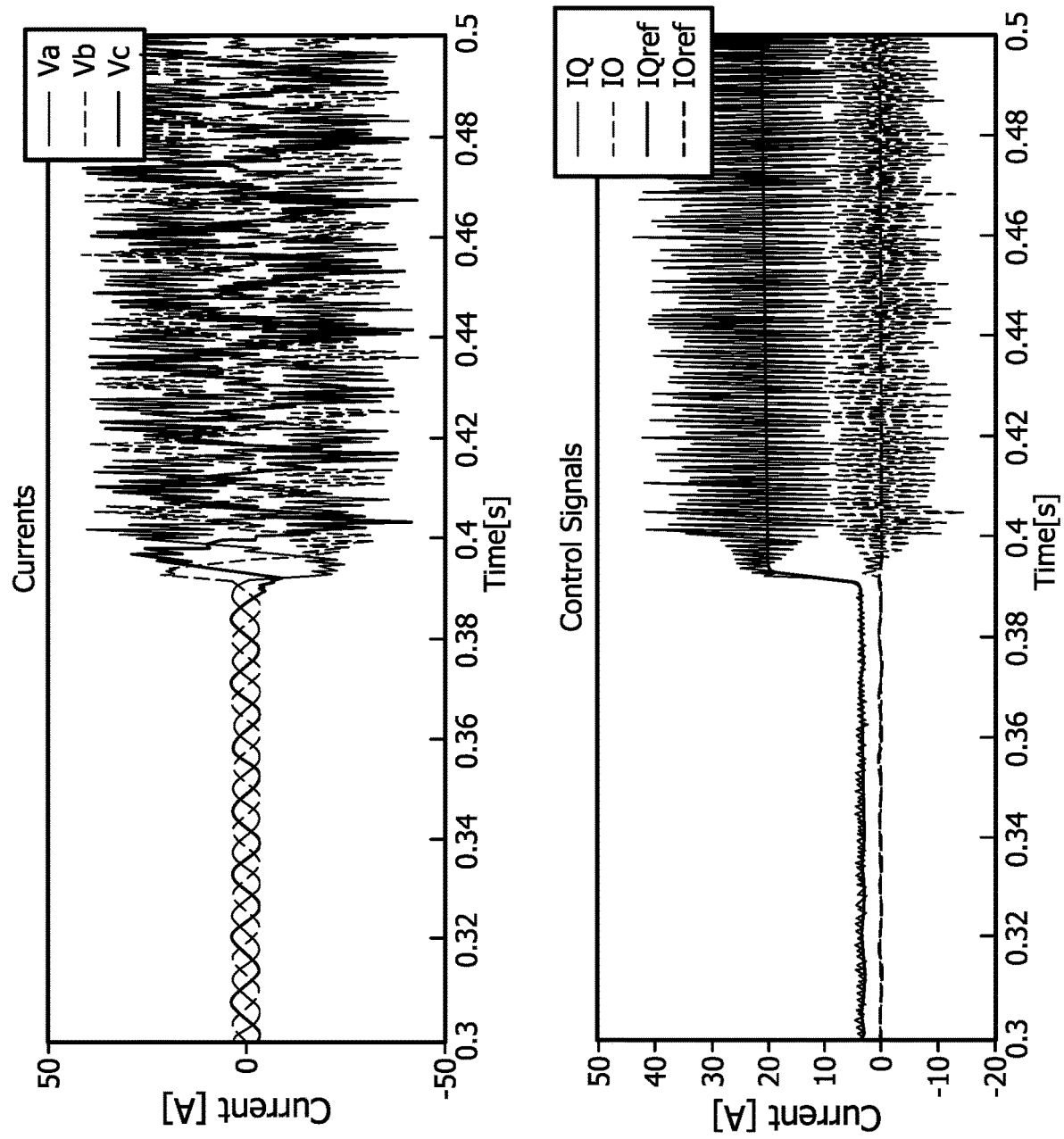
Figure 23A:
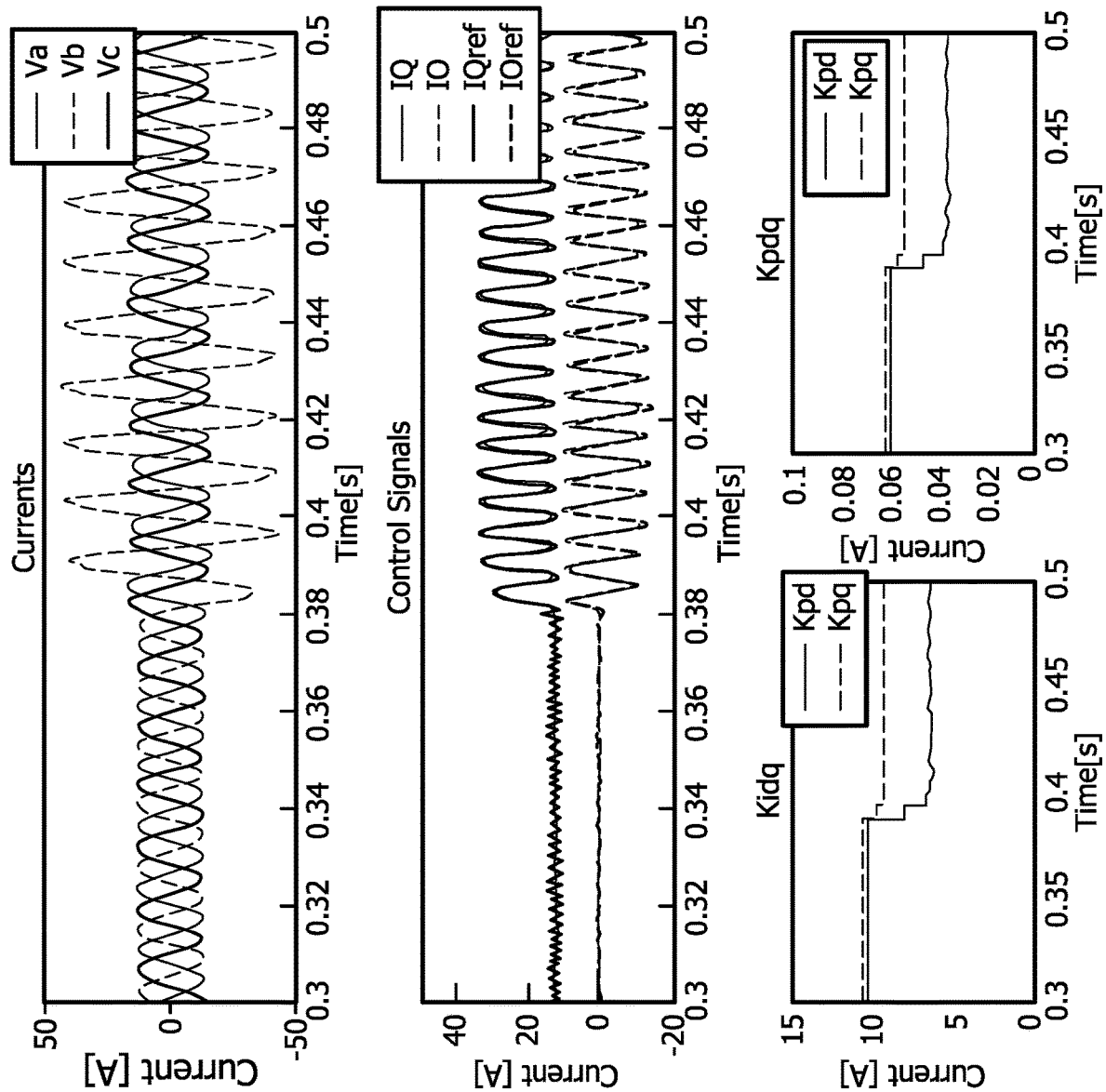
FIGS. 23A-23C (collectively referred to herein as "FIG. 23") provides graphs for experimental results of inverter under faults using disclosed controller: (A) line to ground faults; (B) line to line faults; and (C) three-phase faults.
Figure 23B:
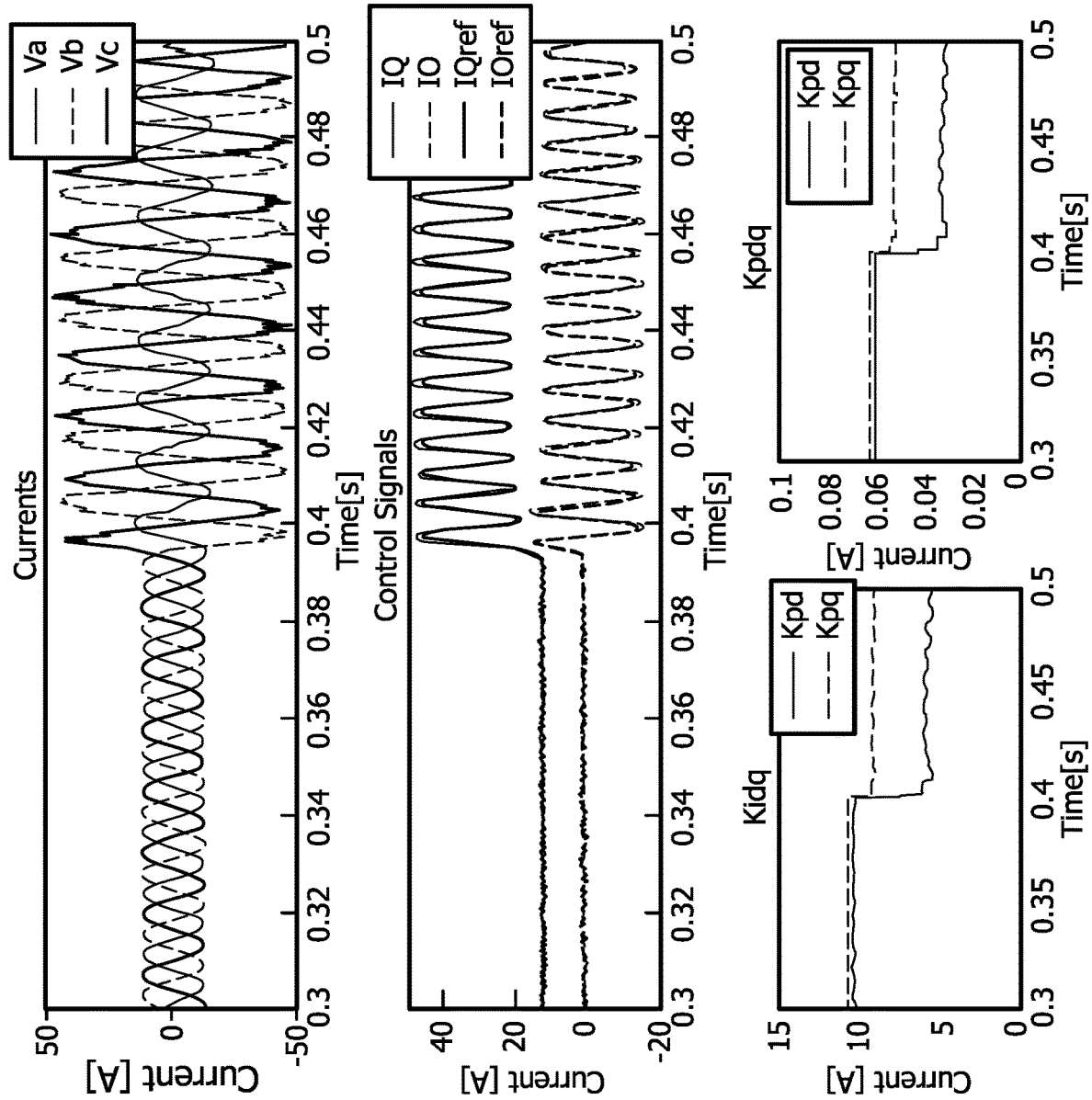
Figure 23C:
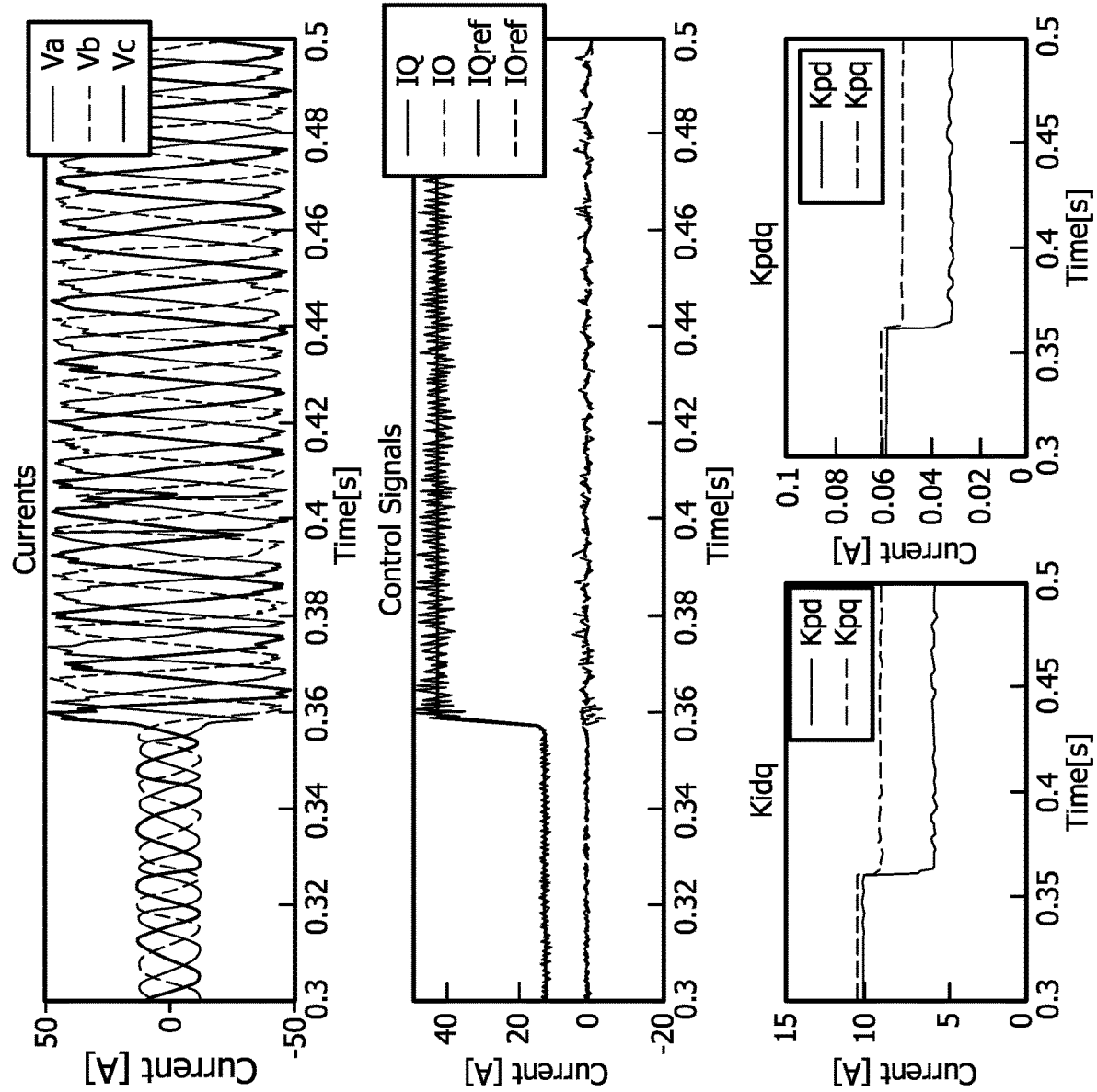

FIG. 22 presents experimental results for the inverter with a current controller with fixed PI gains. FIG. 23 shows experimental results for the inverter with the disclosed controller that takes grid filter saturation into account. Three types of faults were evaluated to validate the stability of the controls: symmetrical three-phase faults, line to line and line to ground faults.

FIG. 23 plots the output current and the control signals of the current control in dq. The current reference signal comes from the voltage regulator. As shown, a controller with fixed PI gains presents oscillations when the fault is applied. As previously discussed, the inductor saturation reduces the phase and gain margin of the current control. The reduced stability margin causes overshoots and oscillations when the inverter operates at high current. FIG. 22C shows that the currents present severe oscillations when three-phase faults are applied. Similarly, for line to line and line to ground faults (FIG. 22A, FIG. 22B), the control cannot properly regulate the currents as the available inductance decreases due to the core saturation. The control signals of FIG. 22A and FIG. 22B show an oscillation at 120 Hz caused by the negative sequence. This negative sequence is introduced as a reference by the voltage controller during asymmetrical faults such as LL and LG. Herein, a resonant controller tuned at 120 Hz is used to regulate this component.

Disclosed Method: Controller During Faults

FIG. 23 shows the results for the same test using the disclosed controller that considers the grid-filter saturation for the controller gains calculation. At the bottom of FIG. 23, it is included the controller gains calculated through the disclosed method. As shown, the proportional and integral gains of the current controller are adjusted to maintain the stability criteria during high current and normal operation. As a result, the inverter can then provide stable fault current for both symmetrical and asymmetrical faults, and during normal operating conditions.

Fuse-Relay Coordination Islanded Microgrid

This section evaluates if the disclosed inverter design can provide sufficient fault current for a long duration to maintain the fuse-relay, and relay-relay coordination in islanded system. The coordination evaluates coordination for low impedance three-phase, line to line and line to ground faults (3-ph, LL, LG). The time current curves (TCC) for the primary relay, backup relay, and fuses was presented in FIG. 15. To maintain coordination, the fuse-relay grading margin was set to of 0.25 seconds, and the relay-to-relay margin was set to be greater than 0.3 second.

Figure 24A:
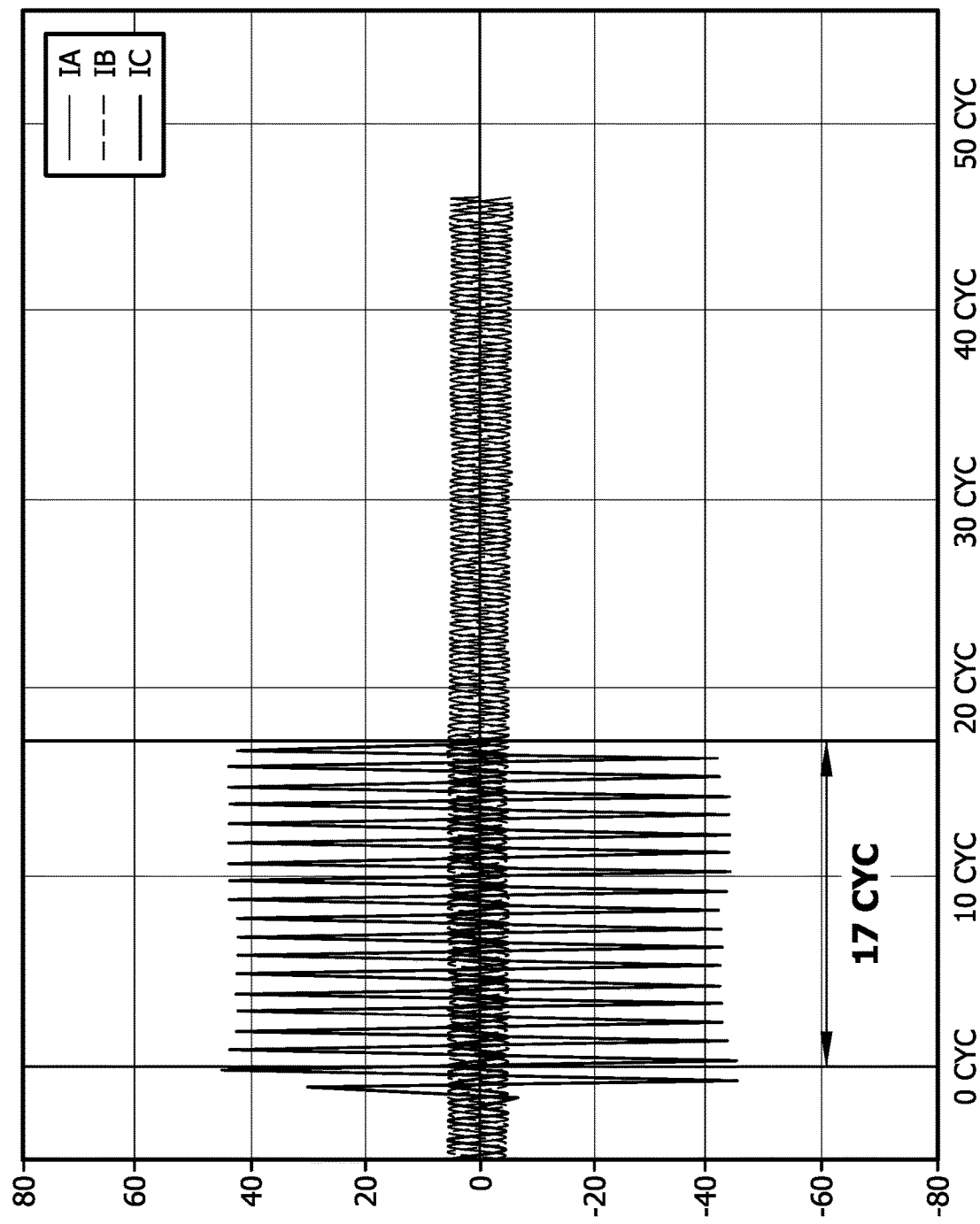
Figure 24C:
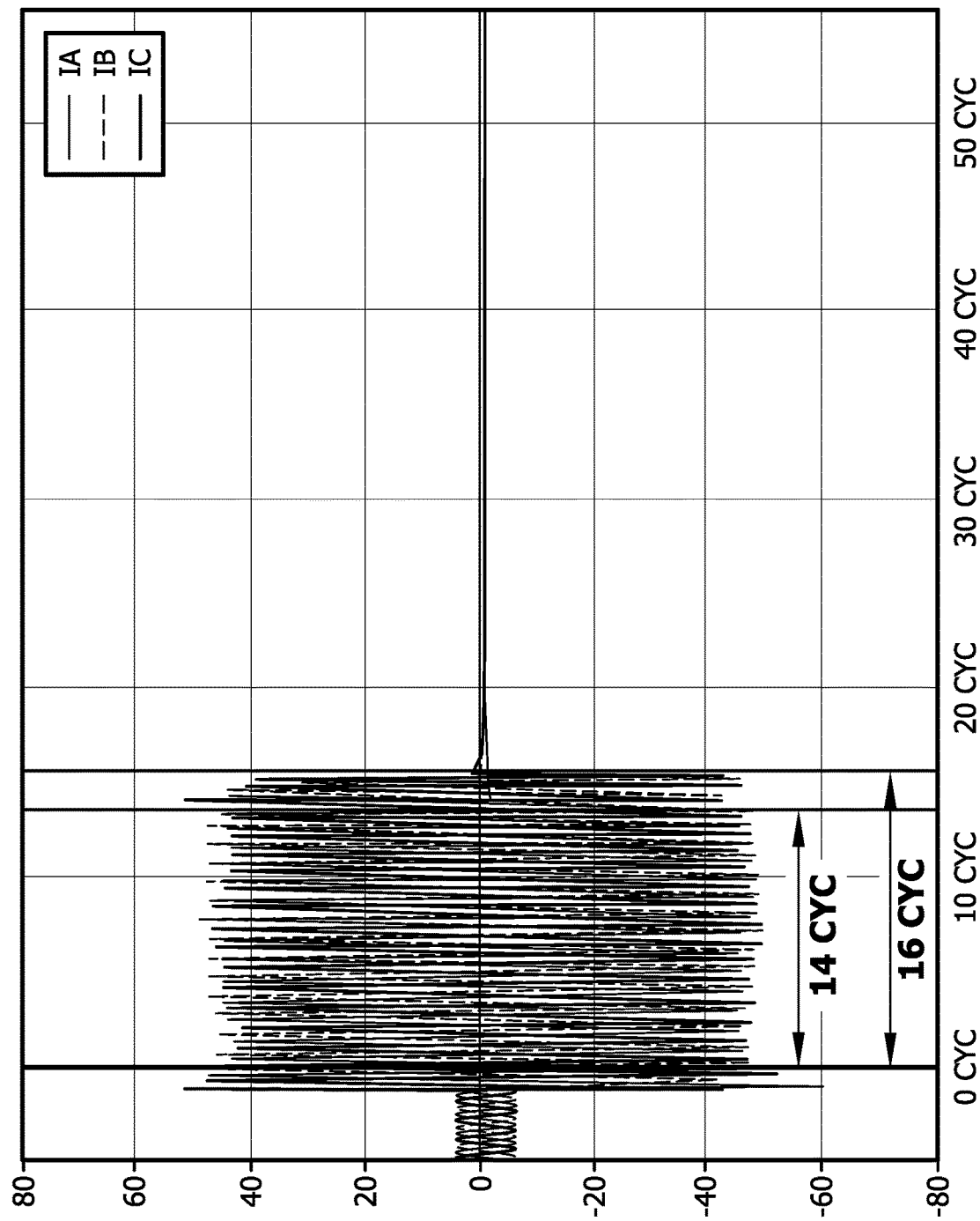
Figure 25A:
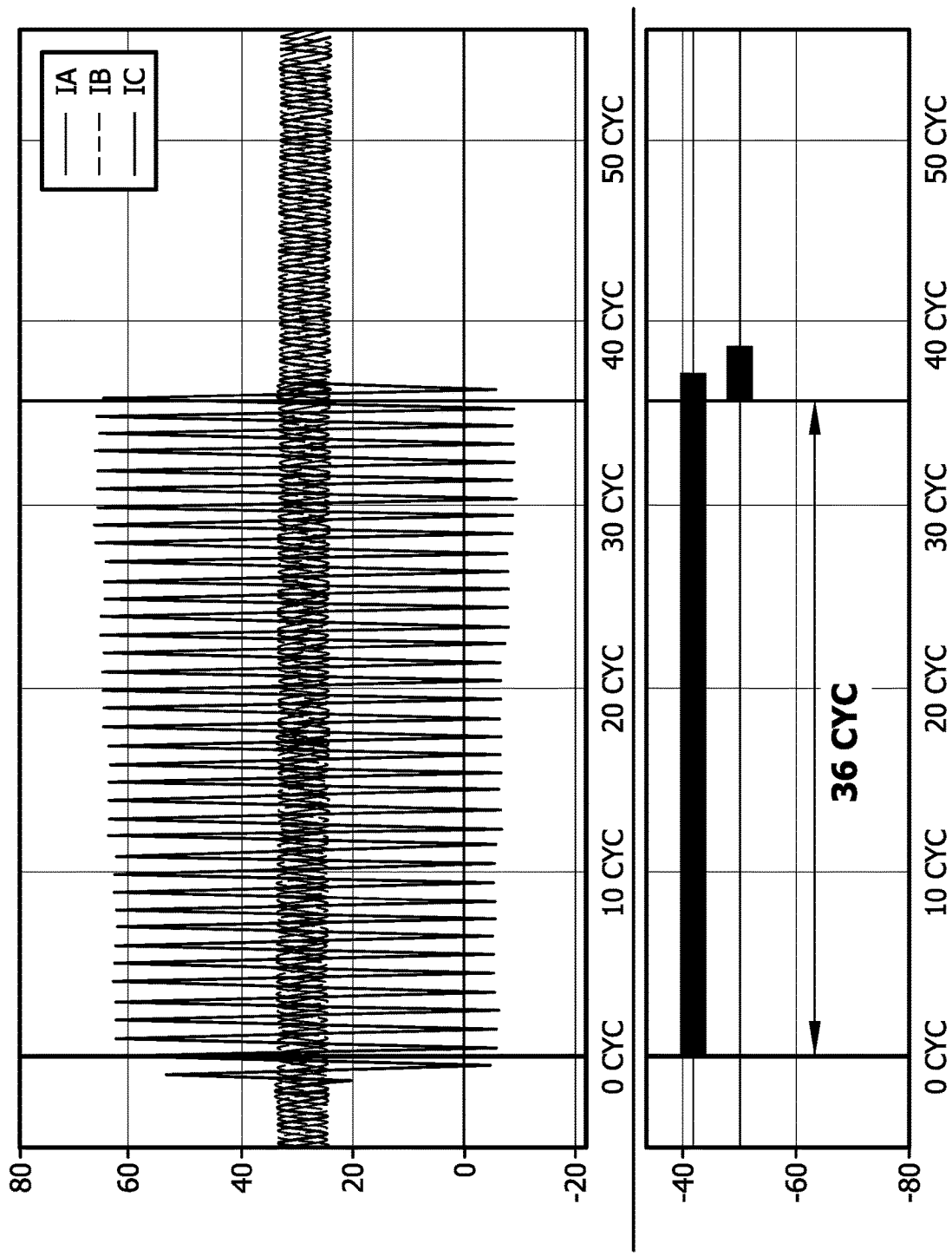
FIGS. 25A-25C (collectively referred to herein as "FIG. 25") provides graphs for event file from SEL 651 (128 samples) which captured the primary relay clearing times for the following faults: (A) line to ground faults; (B) line to line faults; and (C) three-phase faults.
Figure 25B:
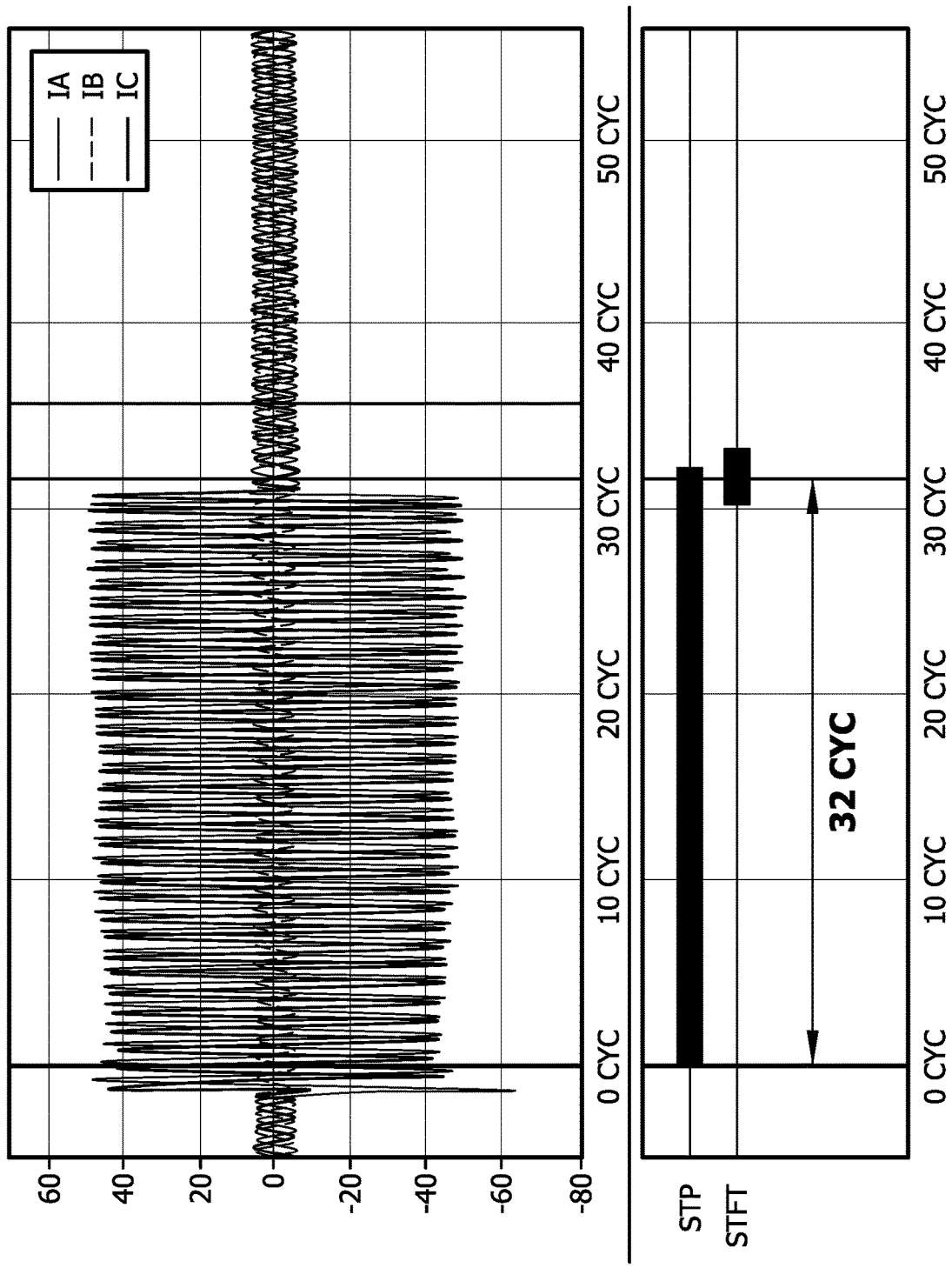
Figure 25C:
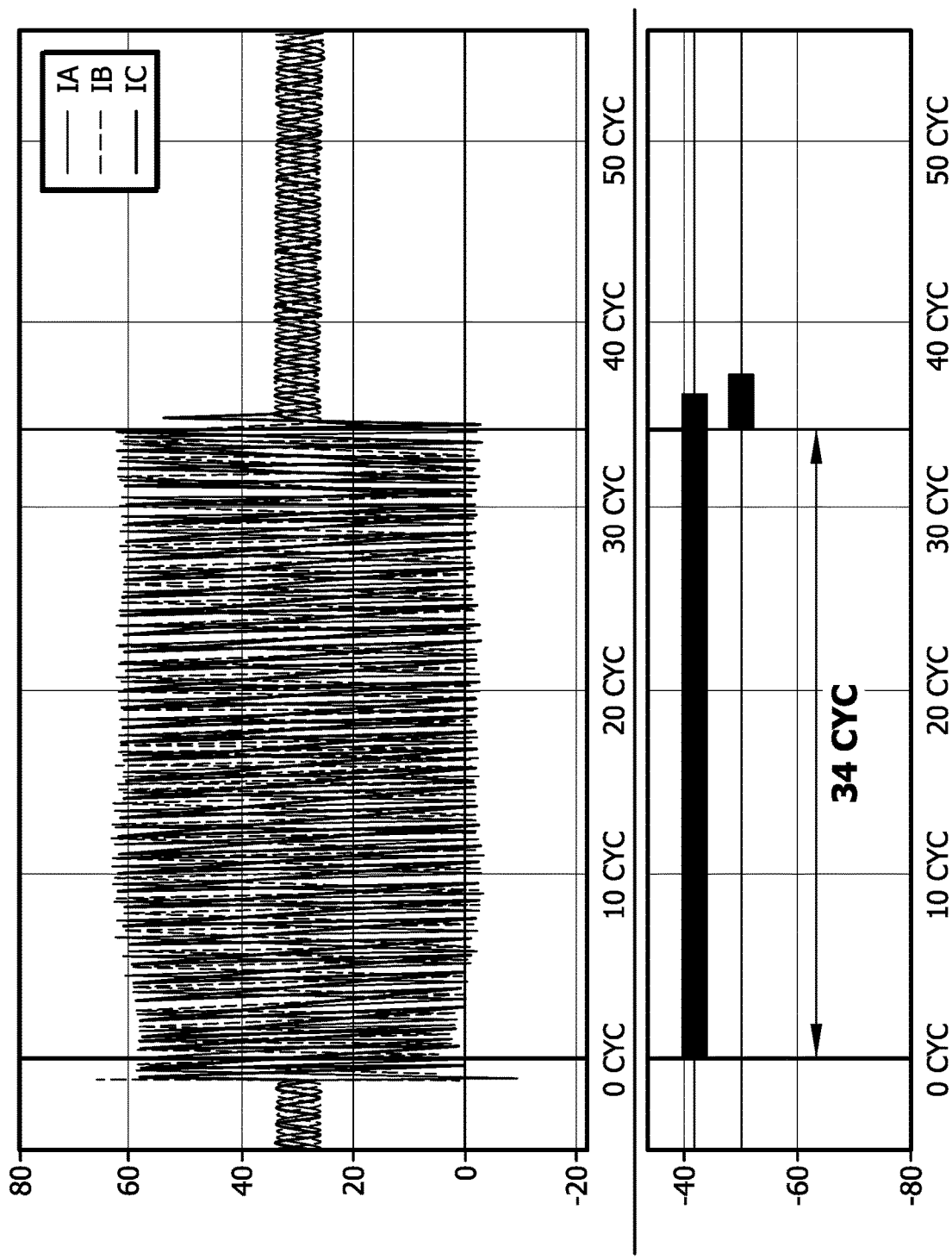

FIG. 24 shows the fault current recorded by the SEL 651 which captured the overcurrent event and the clearing time for the fuses located at the end of the line. FIG. 24A shows the results for a low impedance line to ground fault in phase A. For the LG fault the fuse cleared the faults in 17 cycles. FIG. 24B shows a low impedance LL fault applied at the end of the line. The fault cleared first in phase-C in 14 cycles and then in phase-A at 17 cycles. This difference in time is because of the different melting times of the fuses. Finally, a three-phase fault was applied at the end of the line. Similar as the LL fault, the fuse meting times are different, and the three-phase fault becomes a LL fault after 14 cycles. The fault was finally cleared in all phases after 16 cycles. As shown, the disclosed inverter design effectively provided enough current to clear the fuses for LG, LL and 3-ph faults. FIG. 25 shows the events for the fuse-relay coordination.

Figure 26A:
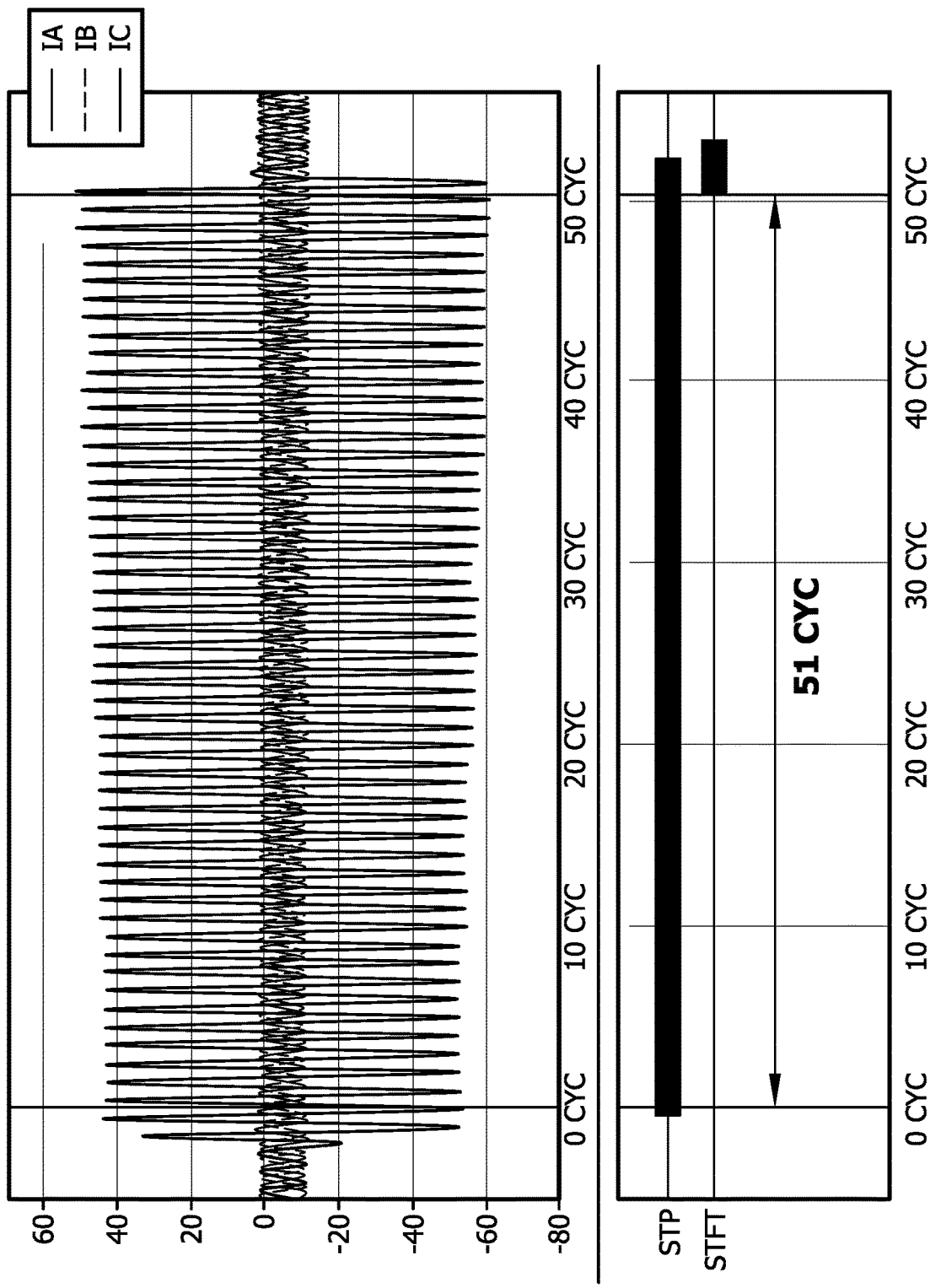
FIGS. 26A-26C (collectively referred to herein as "FIG. 26") provides graphs for event file from SEL 651 (128 samples) which captured the backup relay clearing times for the following faults: (A) line to ground faults; (B) line to line faults; and (C) three-phase faults.
Figure 26B:
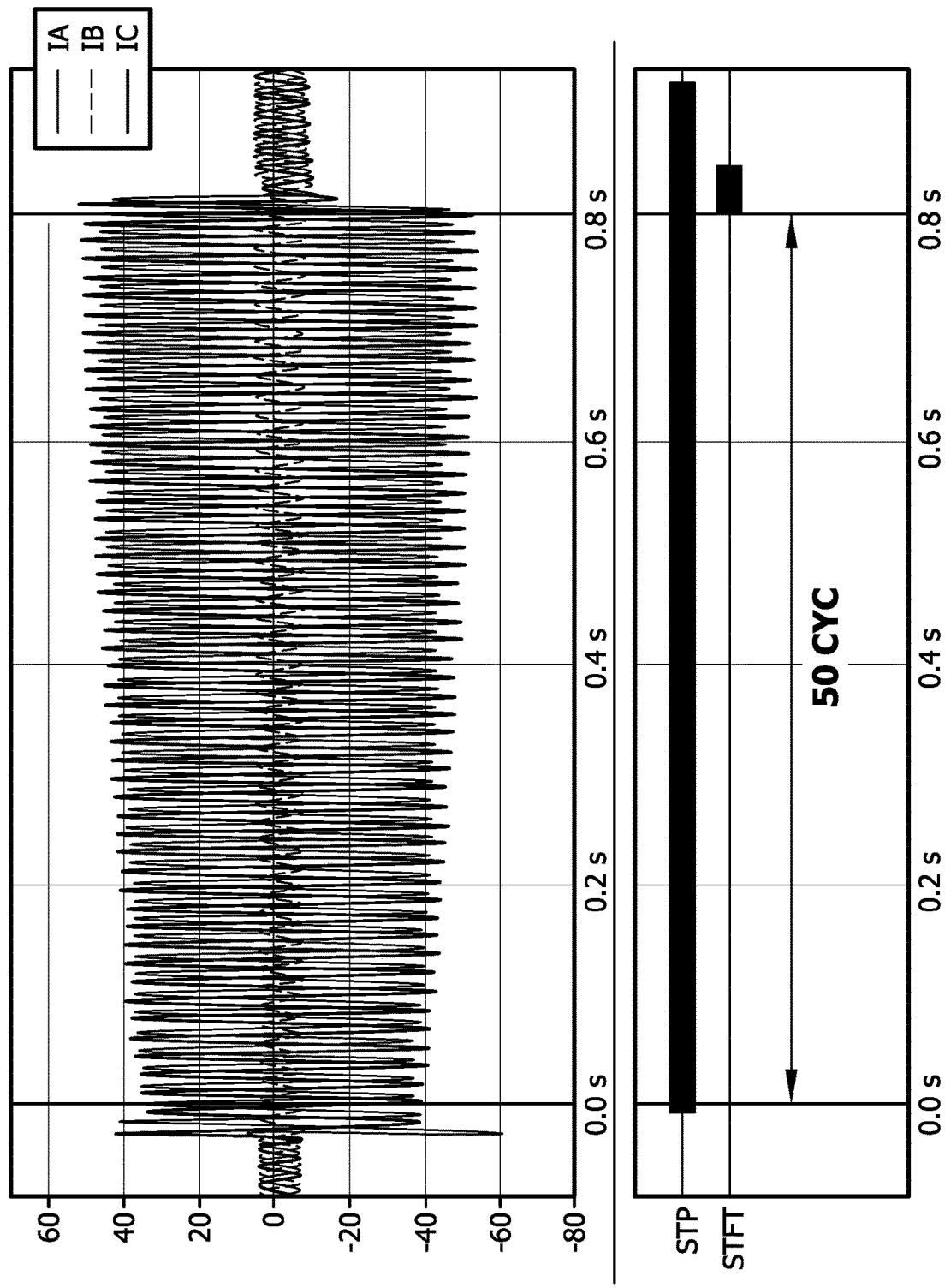
Figure 26C:
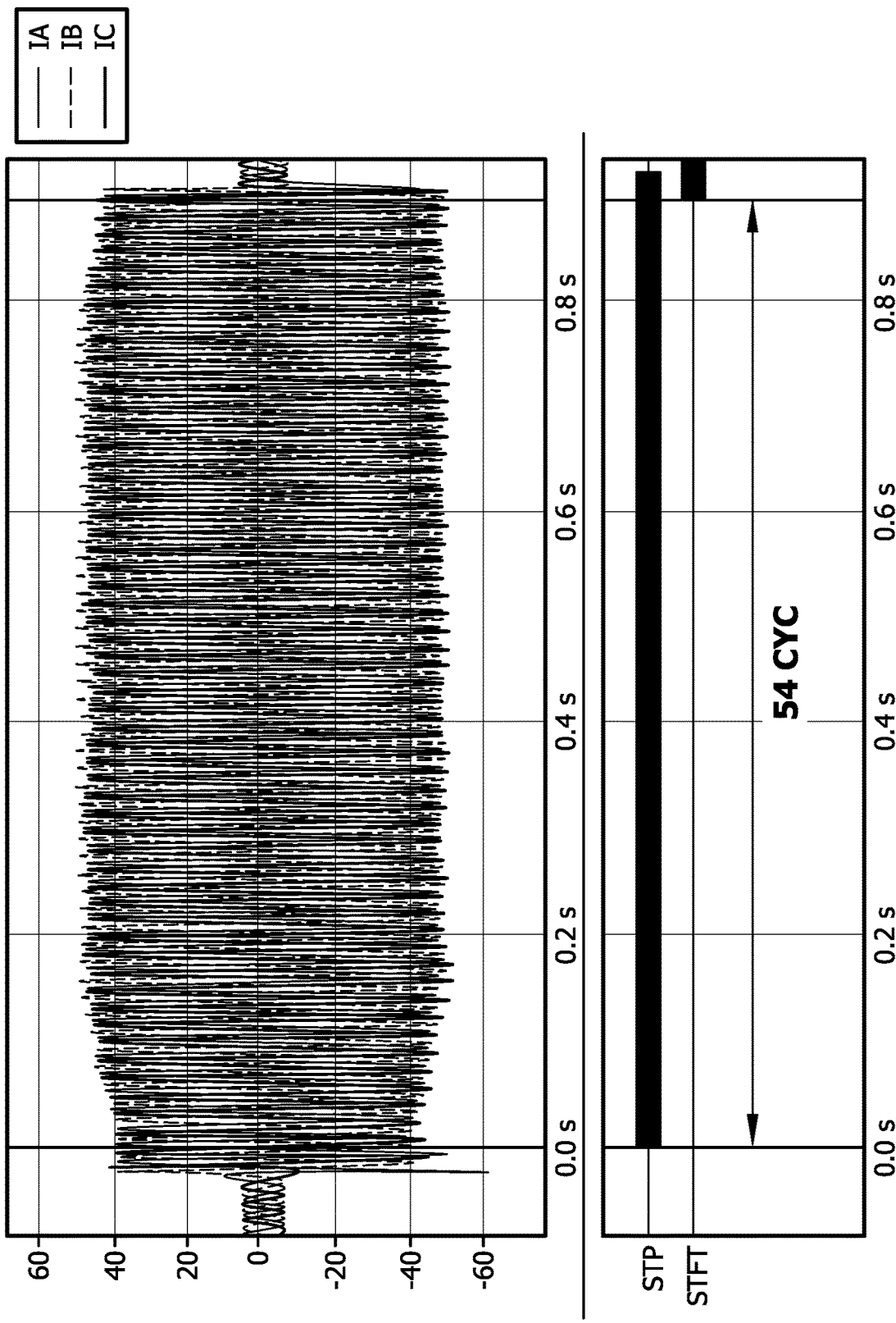

For this test, the fuses fail to clear the fault when the fault is applied, and the primary relay must isolate the event. As shown, the primary relay maintained the coordination and effectively cleared the faults for the LG, LL and 3-phase faults. FIG. 26 shows the results for the primary relay to backup relay coordination. This tests the backup relay when neither the fuse nor the primary relay was able to clear the fault. As shown, the backup relay effectively cleared all faults maintaining the coordination in the test system. TABLE I summarizes the tripping time in cycles for all the tests.

TABLE I

| Overcurrent Coordination (>3.0 p.u. Fault current) | | | |
|---|---|---|---|
| Fault Type | Test I Fust Blow Time (cyc) | Test II Trip Primary Relay Time (cyc) | Test III Trip Backup Relay Time (cyc) |
| LL | 17 | 36 | 51 |
| LG | 17 | 32 | 50 |
| 3-ph | 16 | 34 | 54 |

This tests the backup relay when neither the fuse nor the primary relay was able to clear the fault. As shown, the backup relay effectively cleared all faults maintaining the coordination in the test system. TABLE I summarizes the tripping time in cycles for all the tests.

Above, a two-level, three-phase inverter capable to provide high fault-current contribution during faults was described. It has been demonstrated through experimental results that increasing the current rating of the semiconductor device and the current transducer, while keeping the other inverter components at rated power, is a sufficient measure to enable the inverter to provide more than 3.0 p.u. of short-circuit current. This current was sufficient to enable fuse-relay coordination in microgrids operating in islanded mode. Also described is a method to calculate the control gains considering the core saturation. This method allowed the inverter to provide stable fault current for both symmetrical and asymmetrical faults, and during normal operating conditions. The disclosed technologies are a cost-effective way to increase the fault contribution of IBRs and an effective way to enable the use of more conventional distribution overcurrent protection in islanded microgrids. The disclosed inverter design is a promising step in allowing allow utilities to leverage their overcurrent protection assets to protect microgrids operating in islanded mode.

Figure 27:
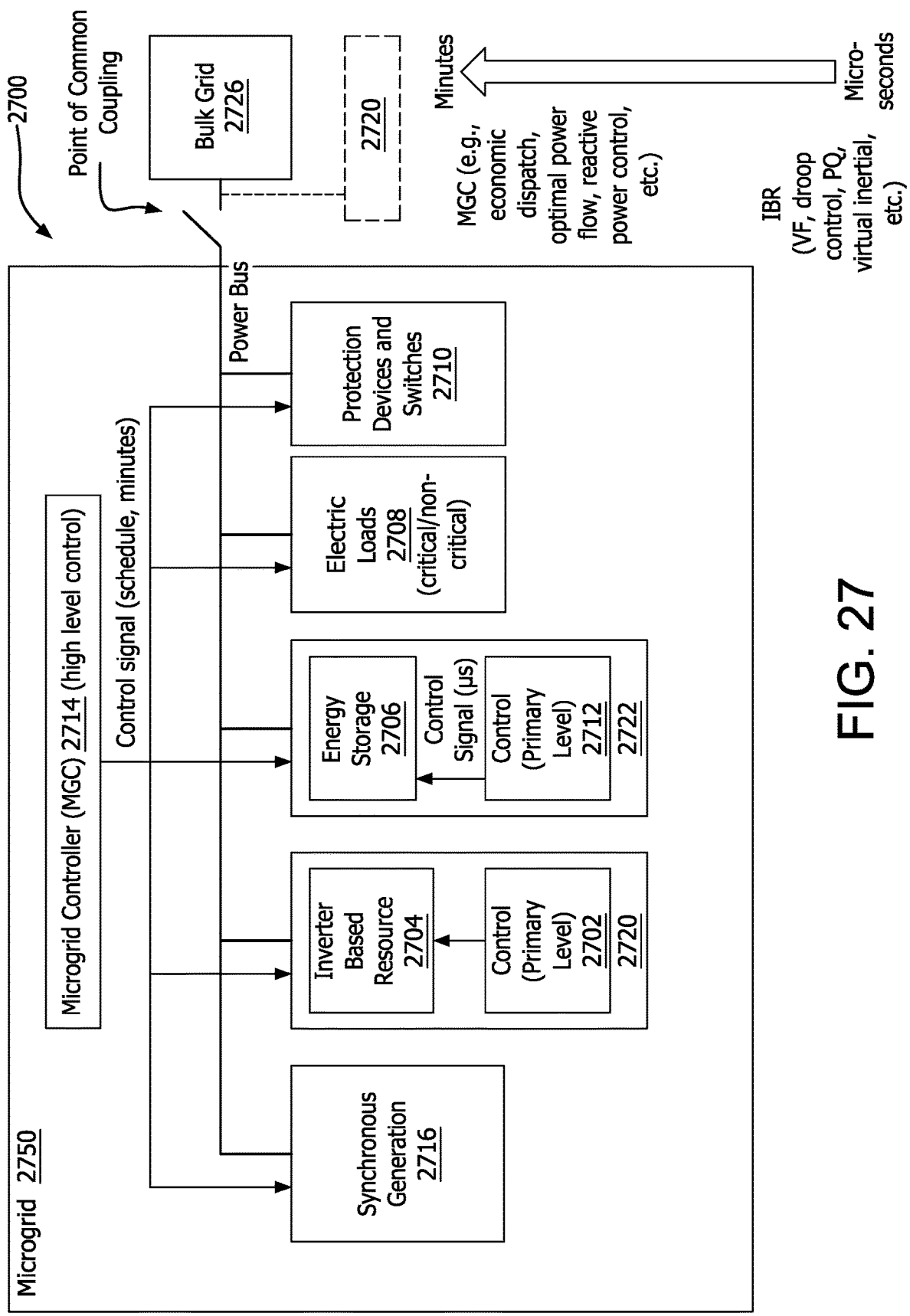
FIG. 27 provides an illustration of a system implementing the present solution.

FIG. 27 provides an illustration of a system 2700 implementing the present solution. System 2700 comprises a microgrid 2750 connected to a bulk grid 2726. The microgrid 2750 comprises electric loads 2708 (critical and non-critical), protection devices and switches 2710, an inverter-based energy resource 2720, and an energy storage resource 2722. The particulars of the inverter-based energy resource 2720 will be described below in detail. Still, it should be noted that the inverter-based energy resource 2720 comprises an inverter-based resource 2704 and a control (primary level) 2702. The inverter-based energy resource 2720 can include, but is not limited to, a DER with a small-scale electricity supply (e.g., solar panels (which may or may not be mounted on rooftops of buildings), windmills, and/or battery storage). Another inverter-based energy resource 2720 may optionally be provided which is connected to the microgrid 2750 and/or the bulk grid 2724 via a point of common coupling.

Components 2708, 2710, 2716, 2720, 2722 of the microgrid 2750 may act as a single controllable entity with respect to the microgrid. Components 2702-2722 can connect and disconnect from the utility electric grid to enable it to operate in both grid-connected mode and an islanded mode. In grid-connected mode, the microgrid 2750 is connected from the bulk grid 2726. In islanded mode, the microgrid 2750 is islanded or disconnected from the bulk grid 2726. A microgrid controller 2714 is provided to control operations of the microgrid 2750. For example, the microgrid controller 2714 can cause the micro-grid to transition between the grid-connected mode and an islanded mode.

As noted above, the inverter-based energy resource 2720 implements the present solution. A more detailed block diagram of the inverter-based energy resource 2720 is provided in FIG. 28. The inverter-based energy resource 2720 is provided for distribution protection purposes. As such, an output of the inverter-based energy resource 2720 is connected to the protection devices and switches 2710. The protection devices and switches 2710 comprise a backup protection module 2806, a primary protection module 2808 and a fuse 2810.

Figure 30:
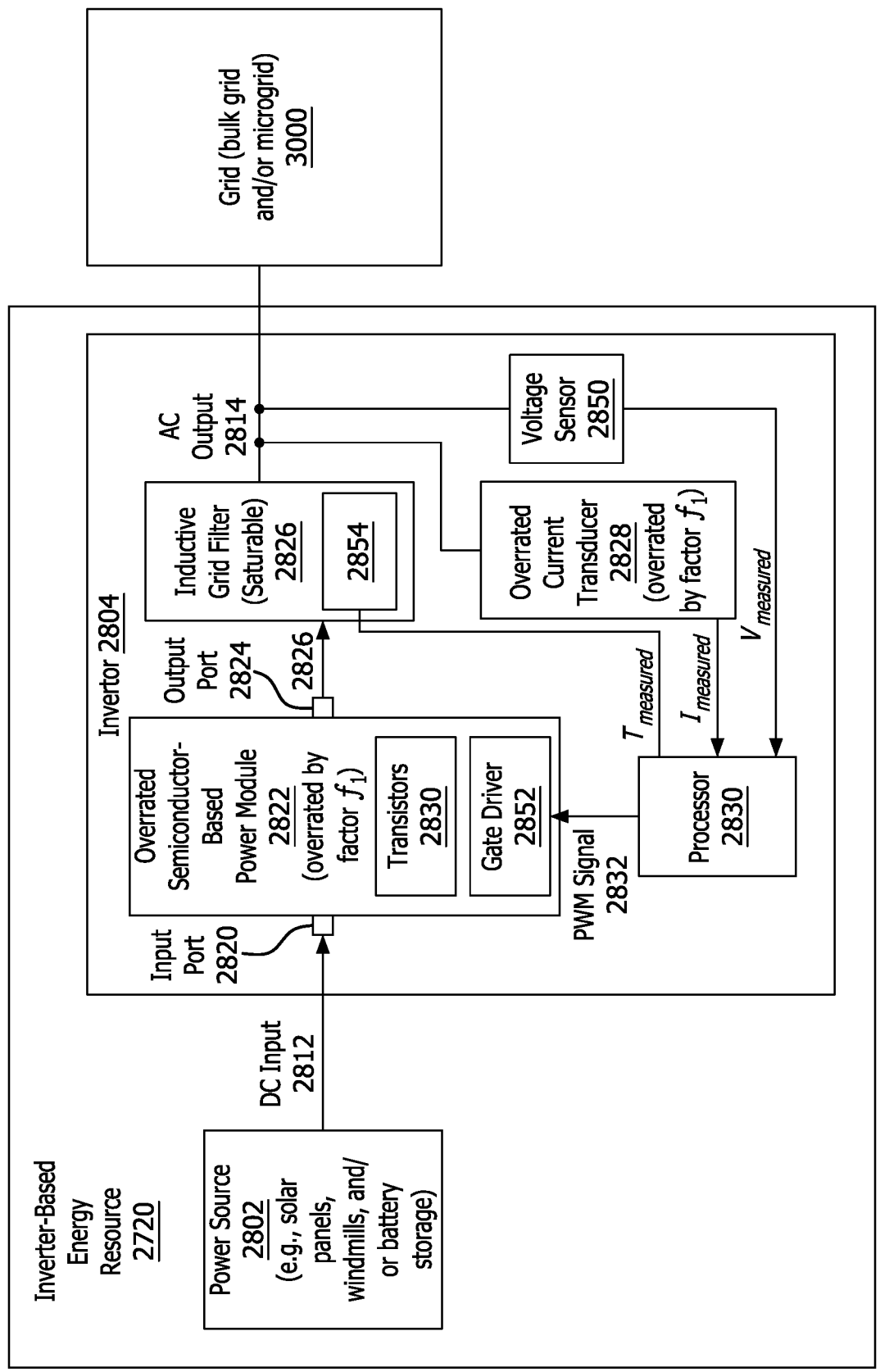
FIG. 30 provides an illustration showing the inverter-based energy resource shown in FIG. 27 connected to a grid.

The inverter-based energy resource 2720 is not limited to distribution protection applications. It can also be used for increasing ancillary services (e.g., voltampere reactive (VAR) support), low-voltage ride through (LVRT), and/or inertial support. In these use cases, the output of the inverter-based energy resource 2720 is connected to a grid 3000 via a point of common coupling as shown in FIG. 30. The grid 3000 may comprise the bulk grid 2726 of FIG. 27 and/or the microgrid 2750 of FIG. 27.

Referring again to FIG. 28, the inverter-based energy resource 2720 comprises a power source 2802, an optional DC-to-DC converter 2890, an inverter 2804, a backup protection module 2806, a primary protection module 2082 and a fuse 2810. The power source 2802 can include, but is not limited to, PV source(s) (e.g., solar panel(s)), windmill(s) and/or battery storage device(s). The solar panel(s) may or may not be mounted on rooftops of buildings (commercial and/or residential). Since the power source 2802 is a renewable power source, the protection components 2806, 2808, 2810 are rendered inoperable for their protection purpose when a conventional inverter 2804 is employed. As such, the inverter 2804 of inverter-based energy resource 2720 has a novel design to address this particular issue and allow protection components 2806, 2808, 2810 to provide the desired protection to downstream devices when used in connection with renewable energy sources. The novel design is configured to cause the inverter to produce an increased output current to leverage the distribution protection of protection components 2806, 2808, 2810. The features of the novel design will become more evident as the discussion progresses.

The inverter 2804 is configured to convert a DC input 2812 to an AC output 2814, and may be single or multiphase. The AC output 2814 is passed to a downstream device via the backup protection module 2806, the primary protection module 2082 and fuse 2810. The primary protection module 2082 and the primary protection module 2082 each comprise an automatic, high-voltage electric switch configured to shut off electric power when a short circuit fault condition exists. The automatic, high-voltage electric switch can include, but is not limited to, a recloser.

The fuse 2810 is configured to blow out when the current is significantly over its current rating, whereby the supply of the AC output power to the external device is cut off. Fuse 2810 is overrated by a factor of $f_2$ of the full load current. Factor $f_2$ is less than a factor $f_1$ by which components 2822, 2828 of the multi-phase inverter 2804 are overrated. Factor $f_2$ can be selected based on the rating of the inductive grid filter 2826 of the multi-phase inverter 2804 and/or the full load. For example, factor $f_2$ is selected so that fuse 2810 is typically overrated up to, for example, 125% of the full load capacity. The fuse 2810 maintains the closed circuit to allow the current to flow beyond the limit permitted by the wiring or other components.

As noted above, the inverter 2804 is generally configured to convert the DC input 2812 to the AC output 2814. Inverter 2804 comprises an overrated semiconductor-based power module 2822, an inductive grid filter 2826 (saturating), an overrated current transducer 2828, a voltage sensor 2850, a temperature sensor 2854, and a processor 2830.

The semiconductor-based power module 2822 has an input port 2820 connected to the power source 2802. As such, the semiconductor-based power module 2822 is configured to receive, as an input, the DC input 2812 from the power source 2802. The semiconductor-based power module 2822 comprises an electronic device that manages power sources for downstream electronic subsystems. The electronic device may comprise transistor(s) 2830 and/or other semiconductor devices. The transistor(s) 2830 can include, but are not limited to, metal oxide semiconductor field-effect transistor(s) (MOSFET(s)) and/or IGBT module(s).

The semiconductor-based power module 2822 is overrated by a factor $f_1$. Factor $f_1$ is selected based on the current needs in the AC output signal 2814 to properly operate protection components 2806, 2808, 2810. For example, factor $f_1$ is selected to have a value, for example, between two and ten or greater than two so that the semiconductor-based power module 2822 provides a multiple (e.g., two, three, four, etc. times) the inverter nominal current (e.g., $2<f_1<10$). The present solution is not limited to the particulars of this example. Other ranges can be used for factor $f_1$ in accordance with a given application. The term "nominal current", as used herein, means the expected output current of the multi-phase inverter 2804 during normal operation and un-faulted conditions.

It should be noted that conventional inverters in IBRs are overrated by a factor of 1.0 to 1.5. The present solution advantageously overrates the semiconductor-based power module 2822 by a factor greater than the 1.5. Such greater overrating of the semiconductor-based power module 2822 keeps the transistor's junction temperature relatively low (e.g., <125°), provides improved inverter operational efficiency, and cause less heat to be produced by the inverter.

The inductive grid filter 2826 is connected to an output port 2824 of the semiconductor-based power module 2822. As such, the inductive grid filter 2826 is configured to receive, as an input, the output from the semiconductor-based power module 2822. The inductive grid filter 2826 is configured to perform signal processing by blocking unwanted signal or noise voltages and passing wanted signals with little or no attenuation. The inductive grid filter 2826 is rated to withstand short circuit conditions when the microgrid 2700 is operated in islanded mode. The output of the inductive grid filter 2826 is AC output 2814. AC output 2814 has a current level allowing for proper operation of protection components 2806-2810.

The overrated current transducer 2828 is connected to the output of the inductive grid filter 2826. As such, the current transducer 2828 is configured to receive, as an input, the output from the inductive grid filter 2826. The current transducer 2828 is overrated by factor $f_1$, which is selected to prevent the current transducer 2828 from saturating. The current transducer 2828 is configured to produce a current in its secondary winding that is proportional to the current of signal 2826 in its primary winding. The current produced in its secondary winding is referred to as $I_{measured}$ which represents a measured current output by the semiconductor-based power module 2822. $I_{measured}$ is passed to processor 2830. $I_{measured}$ may be scaled down from the actual output current of the semiconductor-based power module 2822.

Voltage sensor 2850 is also connected to the output of the inductive grid filter 2826 such that it receives, as an input, the output from the inductive grid filter. Based on received signal, voltage sensor 2850 generates voltage measurement $V_{measured}$. $V_{measured}$ is passed to processor 2830. Temperature sensor 2854 is provided to measure a temperature of the inductive grid filter 2826. The temperature measurement $I_{measured}$ is passed to processor 2830.

Processor 2830 implements the above-described control process (e.g., the process described above in relation to FIG. 6). Processor 2830 can include, but is not limited to, a DSP and/or an FPGA. Processor 2830 is configured to generate a pulse width modulation (PWM) signal 2832 for controlling transistors 2830 of the semiconductor-based power module 2822. The present solution is not limited to PWM based control signals. Other modulation techniques can be used here. The PWM signal 2832 is provided to adjust the gain of the semiconductor-based power module 2822. The gain is a measure of the ability of the semiconductor-based power module 2822 to achieve a desired voltage and/or current in the AC output signal 2814.

Controller gain values $K_i$ and $K_p$ are computed based on $I_{measured}$, $V_{measured}$ and $T_{measured}$ received at the processor 2830. The controller gain values can be updated, adjusted or otherwise modified by the processor 2830 to account for reduced inductance of the inductive grid filter 2826. In this regard, the processor 2830 detects a non-linear response of the inductive grid filter to current caused by a short circuit condition.

Figure 31:
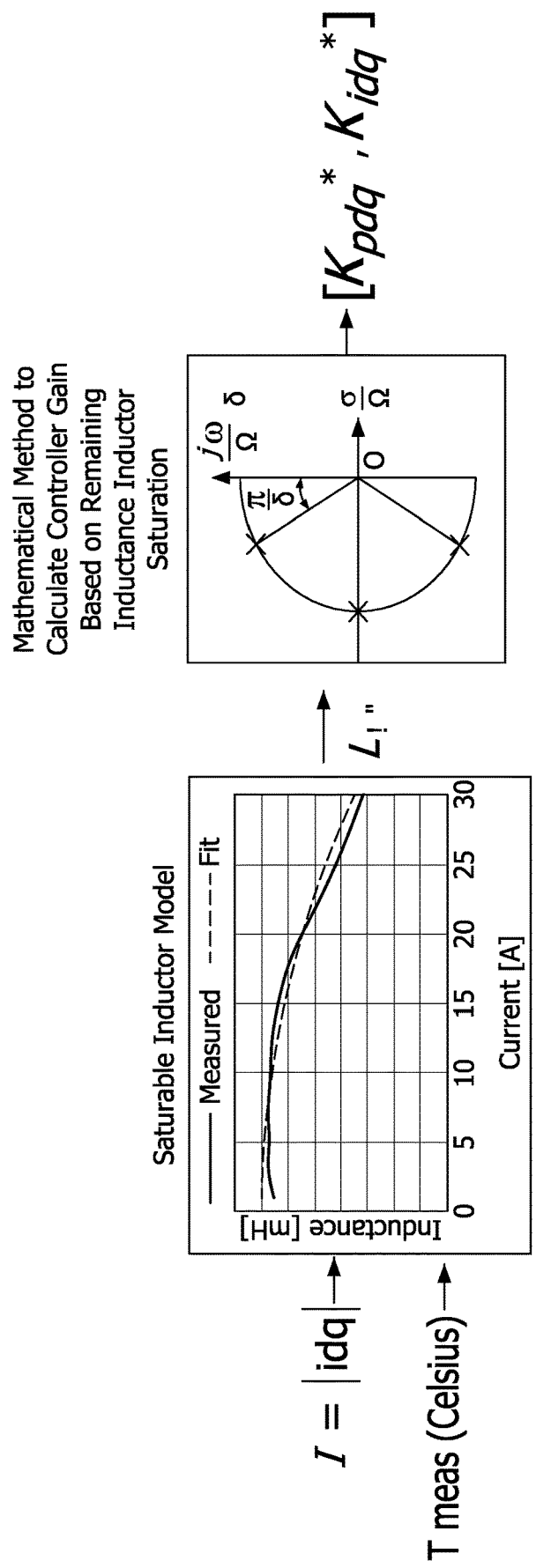
FIG. 31 provides an illustration showing a process for calculating adaptive controller gains in accordance with the present solution.
Figure 32:
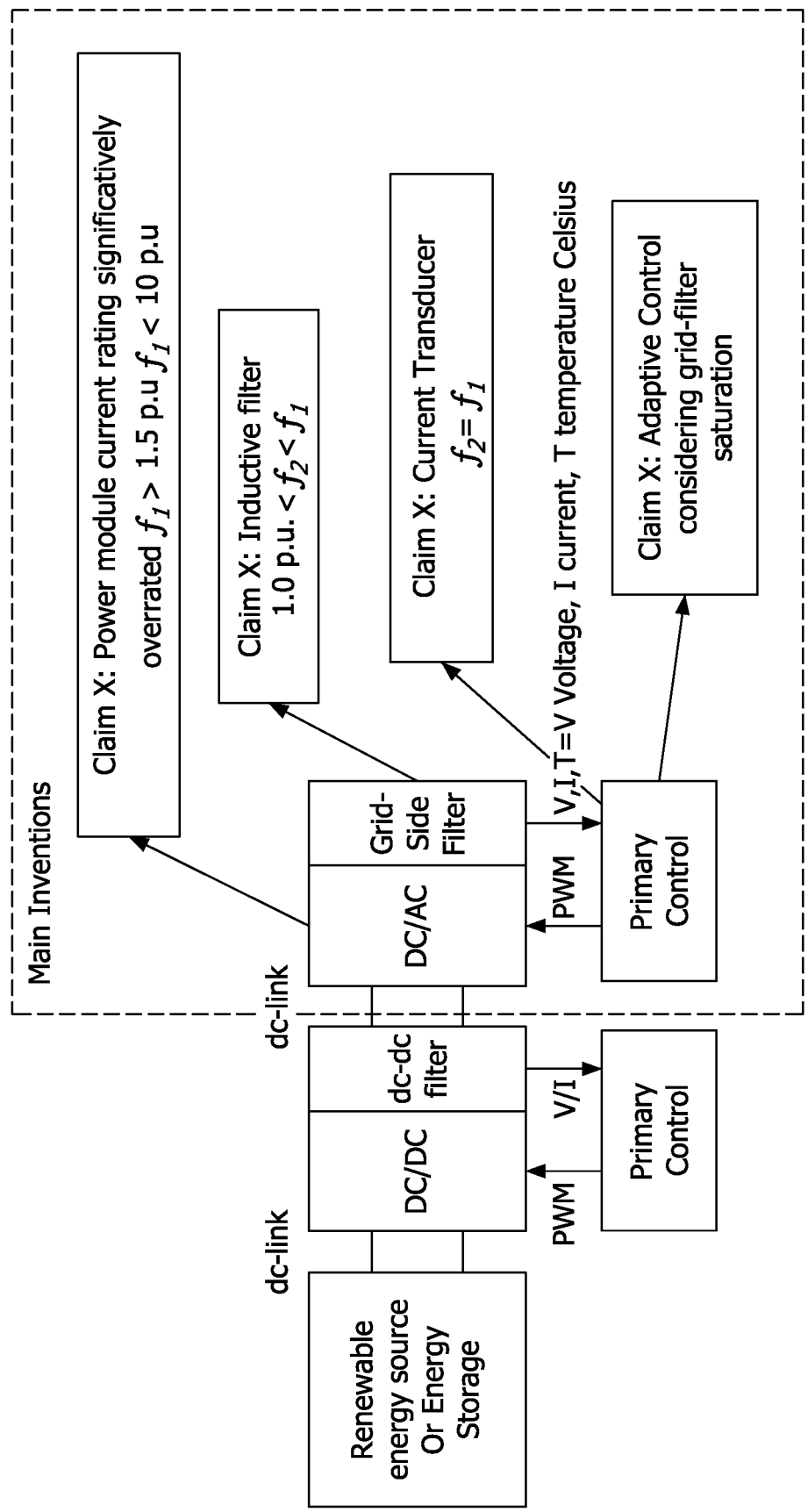
FIG. 32 provides a simplified block diagram of the present solution.

To obtain the controller gain values, the processor 2830 performs operations to: (i) estimate an inductance $L_{dq}$ of the inductive grid filter based on $I_{measured}$ and a temperature $T_{measured}$, (ii) input the inductance $L_{dq}$ and a pre-specified system delay $\alpha$ into mathematical algorithms; and (iii) solve the mathematical algorithms to obtain adaptive controller gain values Ki, Kp to maintain the closed loop stability in normal operation and faulted conditions (e.g., high current operation). The adaptive controller gain values Ki, Kp are then used by gate driver 2852 to control operations of transistors 2830. The gate driver 2852 is also referred to herein as an inverter controller. An illustration is provided in FIG. 31 showing the process for calculating the adaptive controller gains based on the remaining inductance from a saturable grid filter.

The mathematical algorithms used for computing the adaptive controller gains can include, but are not limited to, polynomial based algorithms. The polynomial based algorithms may comprise Butterworth polynomial based algorithm(s). The Butterworth polynomial based algorithms may be defined by mathematical equations (24) and (25) which are reproduced below.

$$K_i = \frac{\omega^3 L_{dq}}{\beta \alpha V_{dc} K^2} \quad (24)$$

$$K_p = \frac{\omega^2 L_{dq}(1 + 2\varsigma) + \beta K_i V_{dc} - \alpha r}{\beta \alpha V_{dc}} \quad (25)$$

where $\omega$ is a desired bandwidth for the current controller, $L_{dq}$ is an inductance of the inductive grid filter, $\beta$ is the current sensor gain, $\alpha$ is a system delay, $V_{dc}$ is equal to $V_{measured}$, $\varsigma$ and K are both constants, and r is a resistance of the inductive grid filter.

As noted above, the inverter-based energy resource 2720 may include a DC-to-DC converter 2890 between the power source 2802 and the inverter 2804. The DC-to-DC converter 2890 may be overrated by a factor $f_3$ that is less than factor $f_1$. For example, factor $f_3$ may be equal to or greater than 1.0 p.u., and equal to or less than factor $f_1$. The present solution is not limited in this regard.

The present solution has many advantages as a result of increasing the current capabilities of a grid forming and grid following inverter. These advantages include, for example: (i) protection by leveraging use of legacy distribution protection devices such as fuses, breakers, and/or reclosers; (ii) improved LVRT capabilities and stabile dc-link voltage control at maximum power point during sags via an increase in the current capability of the semiconductor-based power module to allow the inverter to inject surplus power to the grid during voltage sags; (iii) increased voltampere reactive (VAR) support during voltage sags (increasing current rating of semiconductor and its antiparallel diode allows the inverter to significantly increase the reactive power support (VAR) the inverter can provide during voltage sags, helping the bulk grid to maintain stability when high penetration of renewables are present); (iv) increased inertial support (inverters high higher current capability will allow higher inertia in power systems and microgrids with high penetration of inverter based generation and energy storage (renewable energy such as PV and modern wind turbines, such as Type-3 and Type-4, or any wind turbine that is interfaced with the grid with through power electronics)). The present solution is also cost-effective, as only a few components need to be overrated while the rest of the inverter components remain at their normally rated power. The present solution does not require a dedicated or additional unit, as the ESS or PV inverter can be modified to provide higher fault current. Overrating the semiconductor brings the important advantage of reducing the total losses (switching losses+conduction losses) compared with normally-rated semiconductors and allow lower thermal requirements during normal operating conditions. These advantages increase the efficiency of the inverter while reduces its cooling requirements.

Figure 28:
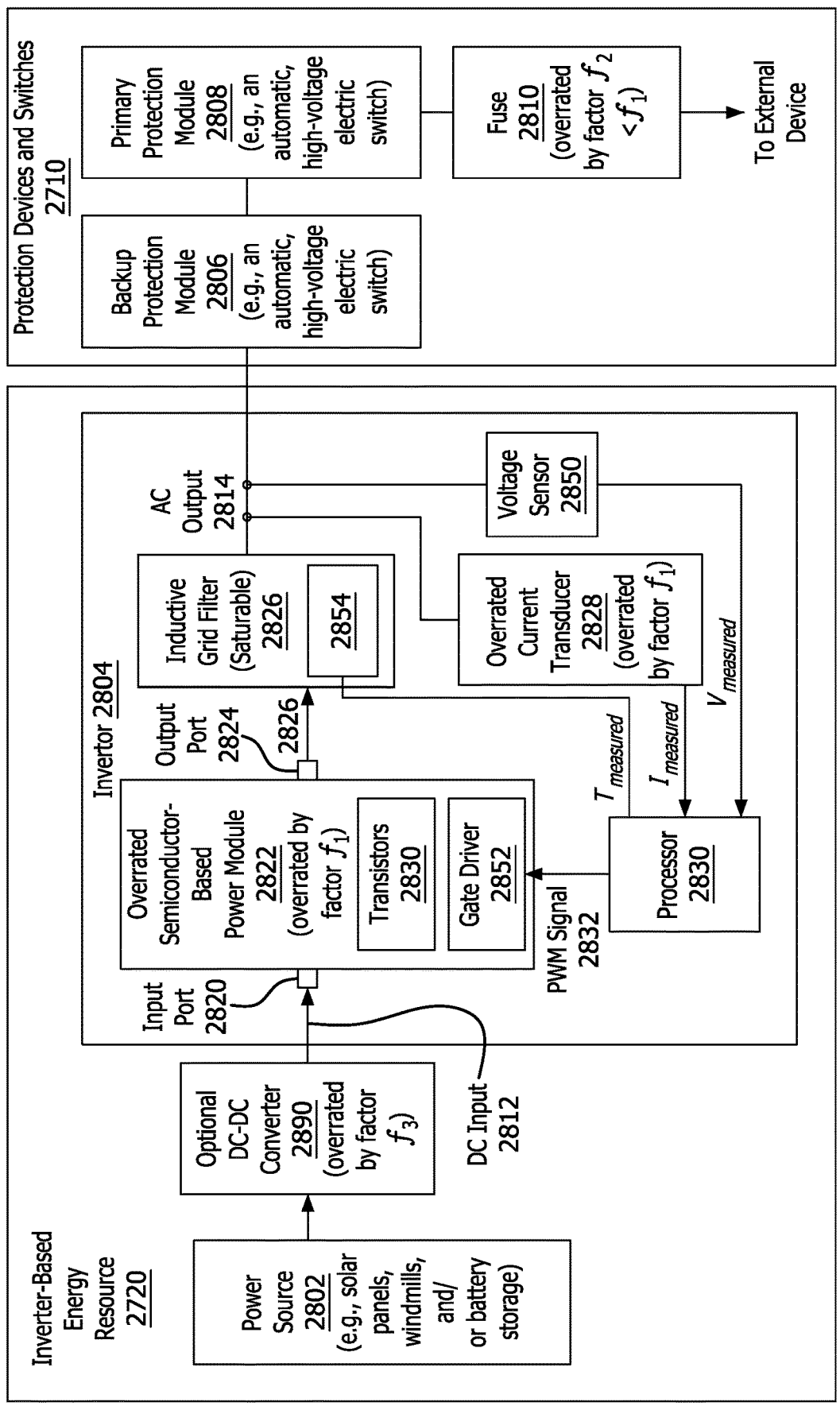
FIG. 28 provides a more detailed block diagram of the inverter-based energy resource shown in FIG. 27.
Figure 29:
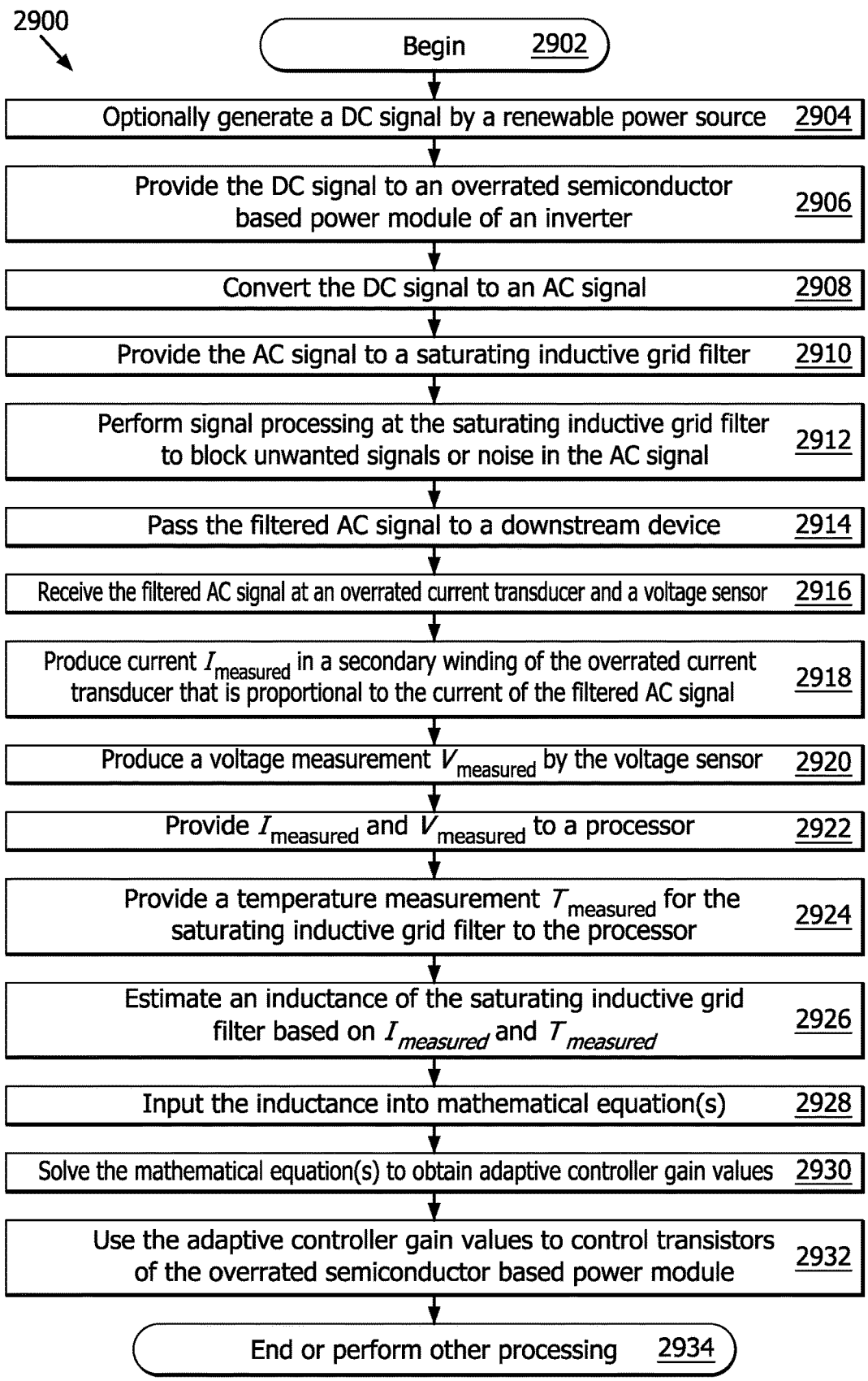
FIG. 29 provides a flow diagram of an illustrative method for operating an inverter.

FIG. 29 provides a flow diagram of an illustrative method 2900 for operating an inverter (e.g., inverter 2804 of FIG. 28). Method 2900 begins with 2902 and continues with 2904 where a DC signal (e.g., DC signal 2812 of FIG. 28) is generated by a renewable power source (e.g., power source 2802 of FIG. 28). The DC signal is provided to an overrated semiconductor-based power module (e.g., module 2822 of FIG. 28) of the inverter, as shown by 2906. The semiconductor-based power module is overrated by a factor of $f_1$ as defined above. The DC signal is converted by the overrated semiconductor-based power module into an AC signal in block 2908. The AC signal is provided to a saturable inductive grid filter in block 2910. At the saturable inductive grid filter, signal processing operations are performed in block 2912 to filter unwanted signals or noise from the AC signal. The filtered AC signal is then passed to a downstream device (e.g., protection module(s) 2806, 2808 and/or 2810 of FIG. 28), as shown by block 2914.

The filtered AC signal is received in 2916 at an overrated current transducer (e.g., overrated current transducer 2828 of FIG. 28) and a voltage sensor (e.g., voltage sensor 2850 of FIG. 28). The overrated current transducer is also overrated by factor $f_1$. In 2918, a current $I_{measured}$ is produced in a secondary winding of the overrated current transducer that is proportional to the current of the filtered AC signal. A voltage measurement $V_{measured}$ is produced by the voltage sensor in 2920. The current and voltage measurements $I_{measured}$, $V_{measured}$ are provided to a processor (e.g., processor 2830 of FIG. 28) in block 2922. A temperature measurement $T_{measured}$ for the saturable inductive grid filter is provided to processor in 2924. An inductance of the saturable inductive grid filter is estimated in 2926 based on $I_{measured}$ and $T_{measured}$. The inductance is input into mathematical equations as shown by block 2928. The mathematical equations are configured to compute adaptive controller gain values to maintain closed loop stability of the inverter in normal operation and faulted conditions (e.g., high current operation). The mathematical equations can include, but are not limited to, mathematical equations (24) and (25) provided above. Accordingly, block 2930 involve solving the mathematical equations to obtain adaptive controller gain values. The adaptive controller gain values are used in 2932 to control transistors of the overrated semiconductor-based power module. Subsequently, method 2900 continues to block 2934 where its ends or other operations are performed (e.g., return to 2902 to repeat the process).

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A system, comprising:
   an inverter controller; and
   an inverter comprising:
   a semiconductor-based power module that is overrated by a factor $f_1$ having a value greater than two and configured to receive a DC signal and convert the DC signal into an AC signal;
   a saturable inductive grid filter configured to filter the AC signal;
   at least one sensor configured to produce a current measurement and a voltage measurement from the AC signal output from the saturable inductive grid filter; and
   a processor configured to compute adaptive controller gain values using at least the current measurement and a temperature, and cause an adjustment to a gain of the inverter controller in accordance with the adaptive controller gain values to maintain stability when the saturable inductive grid filter saturates at high current operations.

2. The system according to claim 1, wherein the at least one sensor comprises a current transducer that is overrated by the factor $f_1$.

3. The system according to claim 1, wherein the factor $f_1$ has a value in a range of two to ten.

4. The system according to claim 1, further comprising a renewable power source configured to generate the DC signal.

5. The system according to claim 4, wherein the system comprises a microgrid with at least one of a fuse and a protection module connected to an AC output of the inverter.

6. The system according to claim 5, wherein the factor $f_1$ is selected based on short-circuit current needed of an AC signal to allow proper operation of the fuse and a legacy protection devices during a short circuit event that requires high-current output of an inverter-based distributed energy resource.

7. The system according to claim 1, further comprising a DC-to-DC converter connected between the inverter and a source of the DC signal, wherein the DC-to-DC converter comprise a semiconductor that is overrated by a factor $f_3$ which is smaller than the factor $f_1$.

8. The system according to claim 1, wherein the inverter is single-phase or multi-phase, and the semiconductor-based power module comprises at least one insulated-gate bipolar transistor or metal oxide semiconductor field-effect transistor.

9. The system according to claim 1, wherein the adaptive controller gain values are computed at the processor by: (i) estimating remaining inductance of the saturable inductive grid filter based on the current measurement and a measured temperature of the saturable inductive grid filter; and (ii) inputting the estimated inductance into at least one mathematical algorithm; and (iii) solving the at least one mathematical equation to obtain the adaptive controller gain values.

10. The system according to claim 1, wherein:
    a first gain value of the adaptive controller gain values is a function of a bandwidth, the estimated inductance of the saturable inductive grid filter, a current sensor gain, a system delay, and the voltage measurement; and
    a second gain value of the adaptive controller gain values is a function of the first gain value, the bandwidth, the estimated inductance of the saturable inductive grid filter, the current sensor gain, the system delay, the voltage measurement, and a resistance of the saturable inductive grid filter.

11. A method for operating an electronic circuit, comprising:
    receiving a DC signal by an overrated semiconductor-based power module of an inverter, the overrated semiconductor-based power module being overrated by a factor $f_1$ having a value greater than two;
    converting the DC signal into an AC signal at the overrated semiconductor-based power module;
    filtering the AC signal by a saturable inductive grid filter to obtain a filtered AC signal;
    receiving the filtered AC signal at a current transducer and a voltage sensor;
    producing a current measurement at the current transducer and a voltage measurement at the voltage sensor;
    performing operations, by a processor, to compute adaptive controller gain values using at least the current measurement and temperature; and
    adjusting a gain of an inverter controller using the adaptive controller gain values to maintain stability when the saturable inductive grid filter saturates at high current operation.

12. The method according to claim 11, wherein the current transducer is overrated by the factor $f_1$.

13. The method according to claim 11, wherein the factor $f_1$ has a value in a range of two to ten.

14. The method according to claim 11, further comprising generating the DC signal by a renewable power source.

15. The method according to claim 14, further comprising passing an AC output of the inverter to a fuse or a protection module of a microgrid.

16. The method according to claim 15, wherein the factor $f_1$ is selected based on short-circuit current needed of the filtered AC signal to allow proper operation of the fuse or a legacy protection module during a short circuit event that requires high-current output of an inverter-based distributed energy resource.

17. The method according to claim 11, further comprising performing DC-to-DC conversion operations using a DC-to-DC converter with a semiconductor that is overrated by a factor $f_3$ which is smaller than or equal to the factor $f_1$.

18. The method according to claim 11, wherein the inverter is single-phase or multi-phase, and the overrated semiconductor-based power module comprises at least one insulated-gate bipolar transistor or metal oxide semiconductor field-effect transistor.

19. The method according to claim 11, wherein the adaptive controller gain values are computed at the processor by: (i) estimating remaining inductance of the saturable inductive grid filter based on the current measurement and a measured temperature of the saturable inductive grid filter; and (ii) inputting the estimated inductance into at least one mathematical algorithm; and (iii) solving the at least one mathematical equation to obtain the adaptive controller gain values.

20. The method according to claim 19, wherein:
- a first gain value of the adaptive controller gain values is a function of a bandwidth, the estimated inductance of the saturable inductive grid filter, a current sensor gain, a system delay, and the voltage measurement; and
- a second gain value of the adaptive controller gain values is a function of the first gain value, the bandwidth, the estimated inductance of the saturable inductive grid filter, the current sensor gain, the system delay, the voltage measurement, and a resistance of the saturable inductive grid filter.

\* \* \* \* \*